United States Patent [19]

Sakai et al.

[11] Patent Number: 6,088,138
[45] Date of Patent: Jul. 11, 2000

[54] IMAGE FORMING APPARATUS CONTAINING A DISPLAY SHOWING AN ADJUSTABLE IMAGE

[75] Inventors: Masanori Sakai, Yokohama; Toshihiro Kadowaki, Kawasaki; Yoshinori Ikeda, Tokyo; Takayuki Komine; Toshio Honma, both of Kawasaki, all of Japan

[73] Assignee: Canon Kabushiki Kaisha, Tokyo, Japan

[21] Appl. No.: 08/314,790

[22] Filed: Sep. 29, 1994

Related U.S. Application Data

[60] Continuation of application No. 07/945,485, Sep. 15, 1992, abandoned, which is a division of application No. 07/385,398, Jul. 26, 1989, Pat. No. 5,166,786.

[30] Foreign Application Priority Data

Jul. 28, 1988 [JP] Japan .................................. 63-187001
Jul. 28, 1988 [JP] Japan .................................. 63-187006

[51] Int. Cl.[7] .............................. H04N 1/46; H04N 1/40
[52] U.S. Cl. ......................... 358/540; 358/448; 358/450; 358/451
[58] Field of Search .................................... 358/500, 501, 358/537, 540, 448, 450, 451, 452

[56] References Cited

U.S. PATENT DOCUMENTS

| | | | |
|---|---|---|---|
| 2,790,844 | 4/1957 | Neugebauer | 358/80 |
| 4,037,249 | 7/1977 | Pugsley | 358/76 |
| 4,598,282 | 7/1986 | Pugsley | 358/76 X |
| 4,638,368 | 1/1987 | Shimizu et al. | 358/256 |
| 4,639,770 | 1/1987 | Jung et al. | 358/76 |
| 4,775,886 | 10/1988 | Hirosawa | 358/75 |
| 4,823,192 | 4/1989 | Shimizu et al. | 358/256 |
| 4,930,009 | 5/1990 | Shiota | 358/80 X |
| 4,942,462 | 7/1990 | Shiota | 358/76 |

*Primary Examiner*—Thomas D Lee
*Attorney, Agent, or Firm*—Fitzpatrick, Cella, Harper & Scinto

[57] ABSTRACT

An image forming apparatus arranged to receive image information from a memory device for storing color image information and then to form an image on an image-forming medium. This apparatus allows an operator to specify the size and the layout of a color image to be formed on the image-forming medium while viewing a display provided on a monitor device. The apparatus can change the size of the color image information read from the memory device to the required magnification in accordance with a command given by the specifying element, thereby producing a printout. In this case, the operator can adjust the image quality of image information to be printed out while visually confirming the quality of the image displayed on the monitor device, whereby no proof printout is needed.

20 Claims, 42 Drawing Sheets

| | MEMORY(R)<br>4060R | MEMORY(G)<br>4060G | MEMORY(B)<br>4060 B |
|---|---|---|---|
| 2 M | IMAGE 15 | IMAGE 15 | IMAGE 15 |
| 1.875M | IMAGE 14 | IMAGE 14 | IMAGE 14 |
| 1.75M | IMAGE 13 | IMAGE 13 | IMAGE 13 |
| 1.625M | IMAGE 12 | IMAGE 12 | IMAGE 12 |
| 1.5M | IMAGE 11 | IMAGE 11 | IMAGE 11 |
| 1.375M | IMAGE 10 | IMAGE 10 | IMAGE 10 |
| 1.25M | IMAGE 9 | IMAGE 9 | IMAGE 9 |
| 1.125M | IMAGE 8 | IMAGE 8 | IMAGE 8 |
| 1 M | IMAGE 7 | IMAGE 7 | IMAGE 7 |
| 0.875M | IMAGE 6 | IMAGE 6 | IMAGE 6 |
| 0.75M | IMAGE 5 | IMAGE 5 | IMAGE 5 |
| 0.625M | IMAGE 4 | IMAGE 4 | IMAGE 4 |
| 0.5M | IMAGE 3 | IMAGE 3 | IMAGE 3 |
| 0.375M | IMAGE 2 | IMAGE 2 | IMAGE 2 |
| 0.25M | IMAGE 1 | IMAGE 1 | IMAGE 1 |
| 0.125M | IMAGE 0 | IMAGE 0 | IMAGE 0 |
| 0 | | | |

Fig.17

IMAGE FORMING APPARATUS CONTAINING A DISPLAY SHOWING AN ADJUSTABLE IMAGE

This application is a continuation of application Ser. No. 07/945,485, filed Sep. 15, 1992, now abandoned, which is a division of application Ser. No. 07/385,398, filed Jul. 26, 1989, now U.S. Pat. No. 5,166,786 issued Nov. 24, 1992.

BACKGROUND OF THE INVENTION

1. Field of the Invention

The present invention relates to an image forming apparatus which makes it possible for an operator to display on a display means image information stored in memory means, to adjust the quality of the displayed image while viewing it and to produce a printout according to the image quality thus adjusted, as well as an image forming apparatus arranged to receive image information from a memory device for storing image information then to form an image on an image-forming medium.

2. Description of the Related Art

In the field of image forming apparatus, video monitors, video printers and the like have recently been provided as apparatus arranged to temporarily store input color image information in a memory means such as a semiconductor memory, to read out the stored image information to form an image, and to produce a display or printout thereof.

In general, conventional types of image forming apparatus simply produce a display or printout of video signals for television and therefore make it difficult to adjust the image quality of an output image of the video signals. Even if such adjustment is possible, the process of adjusting the quality of an image to be displayed on a monitor television utterly differs from the process of adjusting the quality of an image to be printed out from a video printer. Accordingly, even with an apparatus which allows an image to be adjusted to the desired image quality, if an operator is to produce a printout of image information while viewing a video monitor, he must adjust the image quality of the printout after the image quality of the image information has been confirmed in a printed form. This operation is time-consuming, and since a printout is needed for each adjustment, a serious waste of resources will result.

In addition, the conventional image forming apparatus of the type described have limited functions since they have only to produce a hard copy of fixed size from an input image signal. This is because both the conventional image sources of video signals for television and recording paper for printout are of a size which is primarily determined.

However, in recent years, a demand has arisen for apparatus capable of producing a printout from various information sources such as images read through a color scanner or supplied from a personal computer and so on, in addition to the conventional video signals supplied from television receivers.

In general, images supplied from color scanners or personal computers have different sizes. If the size of an input image is larger than the size of the recording paper employed, the output image will be partially cut away and it will be impossible to print out the entire input image perfectly.

In addition, it is desirable that the apparatus be usable with recording paper of various sizes without being limited to a particular size alone. However, if the conventional apparatus is employed to print an input image on recording paper of different sizes, the output image may be partially cut away or difficult to view.

SUMMARY OF THE INVENTION

It is, therefore, an object the present invention to provide an image forming apparatus capable of readily adjusting the image quality of the image information to be printed out on various kinds of recording paper.

To achieve the above object, the image forming apparatus according to the present invention comprises, in one form: memory means for storing image information; supplying means for supplying the image information stored in the memory means to display means; first image-quality adjusting means for adjusting the quality of an image supplied by the supplying means and displayed on the display means; printing means for producing a printout of the image information stored in the memory means; second image-quality adjusting means for adjusting the quality of an image to be printed out by the printing means; specifying means for specifying the quality of the image displayed on the display means; and determining means for determining, according to a command given by the specifying means, the desired quality of the image to be adjusted by the first and second image-quality adjusting means.

With the above arrangement and construction, since an operator can adjust an image to the desired image quality while viewing the quality of the image displayed on the display means, it is possible to automatically produce a printout of the image quality according to the adjusted image quality. Accordingly, adjustment of the quality of an image to be printed out is remarkably facilitated and it is also possible to prevent waste of resources.

In accordance with the present invention, there is further provided an image forming apparatus of the type which is arranged to receive image information from a memory device for storing color image information and then to form an image on an image-forming medium. This image forming apparatus comprises, in one form: specifying means for specifying the size and the layout of a color image to be formed on the image-forming medium; magnification changing means for changing the size of the color image information read from the memory means to the required magnification in accordance with the size specified by the specifying means; and color-image forming means for laying out the color image information which has been changed to the required magnification by the magnification changing means in accordance with a position specified by the specifying means, thereby forming a color image on the image-forming medium.

With the above arrangement and construction, it is possible to provide an image forming apparatus capable of forming an image from color image information in arbitrarily specified size and at an arbitrarily specified position on an image-forming medium.

The above and other objects, features and advantages of the present invention will become apparent from the following description of the preferred embodiments thereof, taken in conjunction with the accompanying drawings.

BRIEF DESCRIPTION OF THE DRAWINGS

FIG. 17 is a view showing the arrangement of image information stored in each image memory in the image storing apparatus according to the embodiment;

DESCRIPTION OF THE PREFERRED EMBODIMENTS

Embodiments of the present invention will be described below in detail with reference to the accompanying drawings.

Figure 1A:
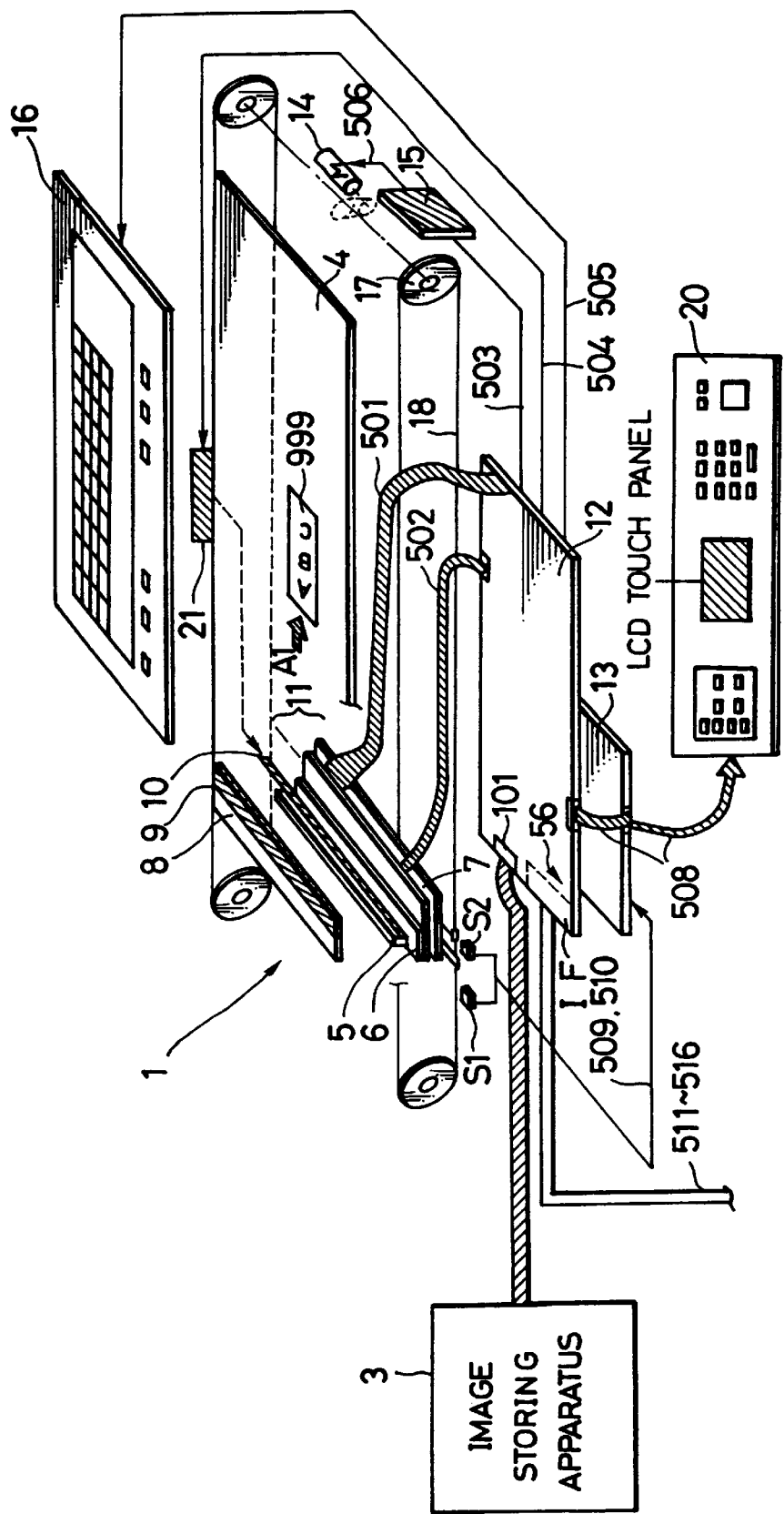
FIGS. 1A and 1B is a system diagrams showing one embodiment of the present invention.
Figure 1B:
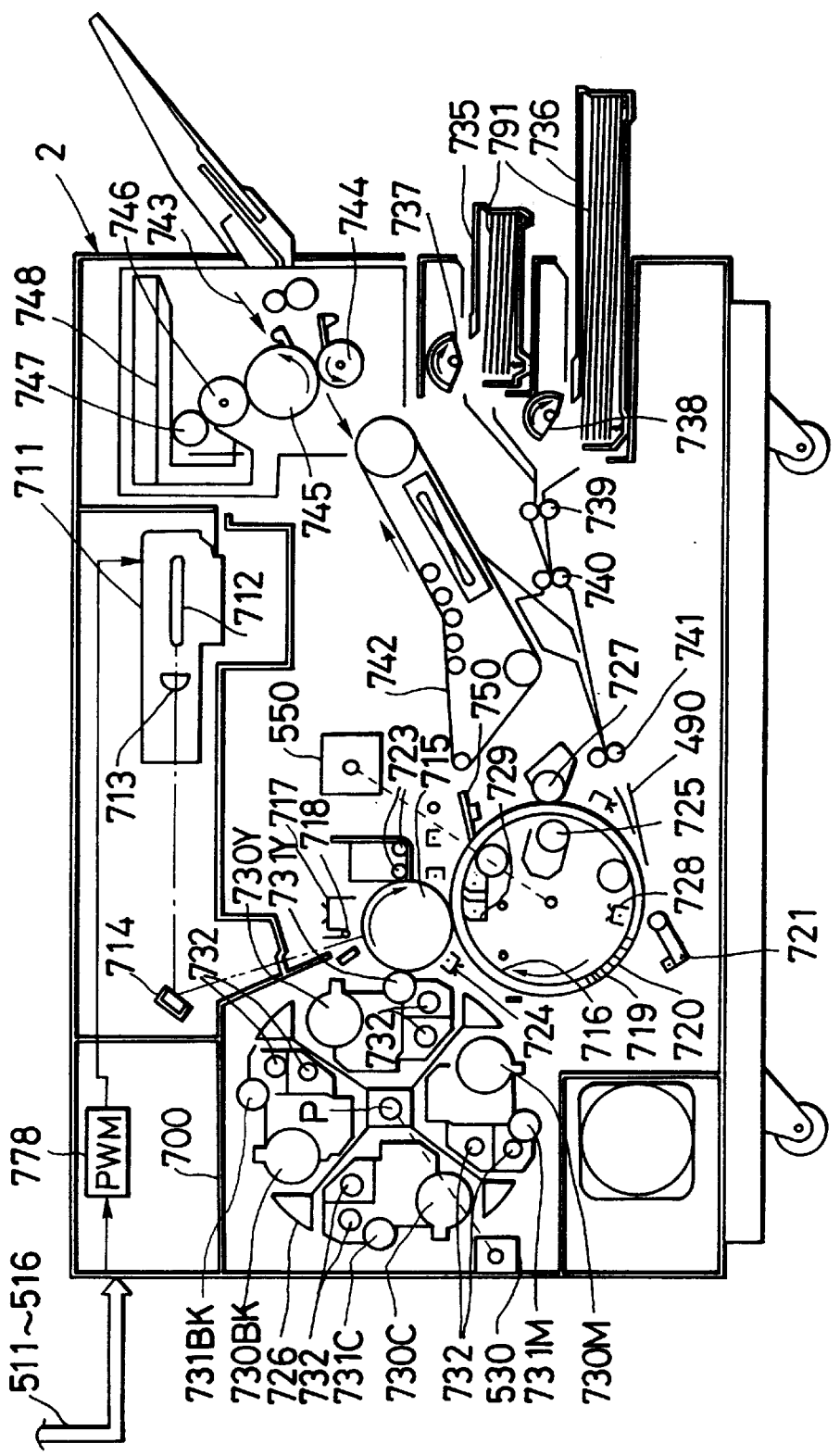

FIGS. 1A and 1B are together a system diagram showing in schematic form one example of the essential inner construction of a color-image forming system according to a first embodiment of the present invention. As shown in FIGS. 1A and 1B, the system according to the first embodiment is essentially composed of a digital color-image reading device (hereinafter referred to as a "color reader") 1, shown in FIG. 1A, for reading an image from an original document and producing a digital color image, a digital color-image printing device (hereinafter referred to as a "color printer") 2, shown in FIG. 1B, for outputting a digital color image in a printed form, and an image storing apparatus 3.

The color reader 1 of the first embodiment is a device arranged to read out color-image information corresponding to each color from an original document and convert the readout information into an electrical digital image signal, by means of color separating means which will be described later and a photoelectric conversion device consisting essentially of a CCD or the like.

The color printer 2 is a laser beam printer of the electro-photographic type which is arranged to convert a color image into sub-images limited to individual colors in accordance with a digital color-image signal to be printed out and then to transfer the sub-images onto recording paper by repeating a transferring operation a plurality of times, thereby recording the color image on the recording paper.

The image storing apparatus 3 is an apparatus for storing the digital image read out through the color reader 1.

Each of the above-mentioned elements will be explained in more detail below.

<Explanation of Color Reader 1>

To begin with, the construction of the color reader 1 will be explained.

Referring to the color reader 1 shown in FIGS. 1A and 1B, an original document is denoted 999, and a platen glas 4 is provided for carrying the original document 999. A rod array lens 5 is arranged to converge a light image reflected from the original document 999 which is being scanned by the exposure light emitted from a halogen exposure lamp 10 and then to make the light image incident on a full-size type full color sensor 6 as an image input. The rod array lens 5, the full-size type full color sensor 6 and the halogen exposure lamp 10 as well as a sensor-output amplifier circuit 7 constitute in combination a document scanning unit 11 which operates to scan the original document 999 in the direction indicated by an arrow Al for the purpose of exposure. Image information on the original document 999 is sequentially read out in line-by-line fashion by scanning the document scanning unit 11 for exposure purposes. The readout image signal to be color-separated is amplified to a predetermined voltage by the sensor-output amplifier circuit 7, and is in turn input to a video processing unit 12 through a signal line 501. The readout image signal is subjected to predetermined signal processing in the video processing unit 12. Incidentally, the signal line 501 consists of a coaxial cable in order to assure a faithful transmission of signals. A signal line 502 serves to supply driving pulses to the full-size type full color sensor 6, and the requisite driving pulses are all generated in the video processing unit 12. Reference numeral 8 denotes a white board used to correct the white level of an image signal, and reference numeral 9 denotes a black board used to correct the black level of the same. When the white and black boards 8 and 9 are illuminated by the halogen exposure lamp 10, signal levels each corresponding to a predetermined density can be obtained from the respective boards 8 and 9. These signal levels are respectively used in correcting the white level and the black level of an image signal.

A control unit 13, which includes a microcomputer, provides control over the entire color reader 1 according to the first embodiment and controls, through a bus 508, a displaying operation on an operation panel 20, key inputs therefrom, the video processing unit 12 and so on. Moreover, the control unit 13 is arranged to detect the position of the document scanning unit 11 by means of position sensors S1 and S2 which are connected to the control unit 13 by signal lines 509 and 510.

In addition, the control unit 13 provides, through a signal line 503, control over a stepping-motor driving circuit 15 for generating pulses to drive a stepping motor 14 via line 506 for causing the document scanning unit 503 to travel (using pulleys 17 and cables 18) provides, through a signal line 504, on/off control and light-quantity control over the halogen exposure lamp 10 by means of an exposure-lamp driver 21, and provides, through a signal line 505, a digitizer 16 and the internal keys and display section of the digitizer 16. In the above-described manner, the control unit 13 provides control over the entire color reader 1 through the respective signal lines.

A color image signal, which is read from the original document 999 through the aforesaid document scanning unit 11 during a scanning operation for exposure purposes, is input to the video processing unit 12 through the sensor-output amplifier circuit 7 and the signal line 501.

The document scanning unit 11 and the video processing unit 12 will be explained below in greater detail with reference to FIGS. 2B and 2C.

A color image signal, which is input to the video processing unit 12, is separated into the three color image signals G (green), B (blue) and R (red) by a sample-and-hold circuit (S/H) 43. The thus-separated color image signals are subjected to analog processing followed by analog-to-digital conversion in an analog-color-signal processing circuit 44. Thus, the analog-color-signal processing circuit 44 provides corresponding digital color image signals.

Figure 2A:
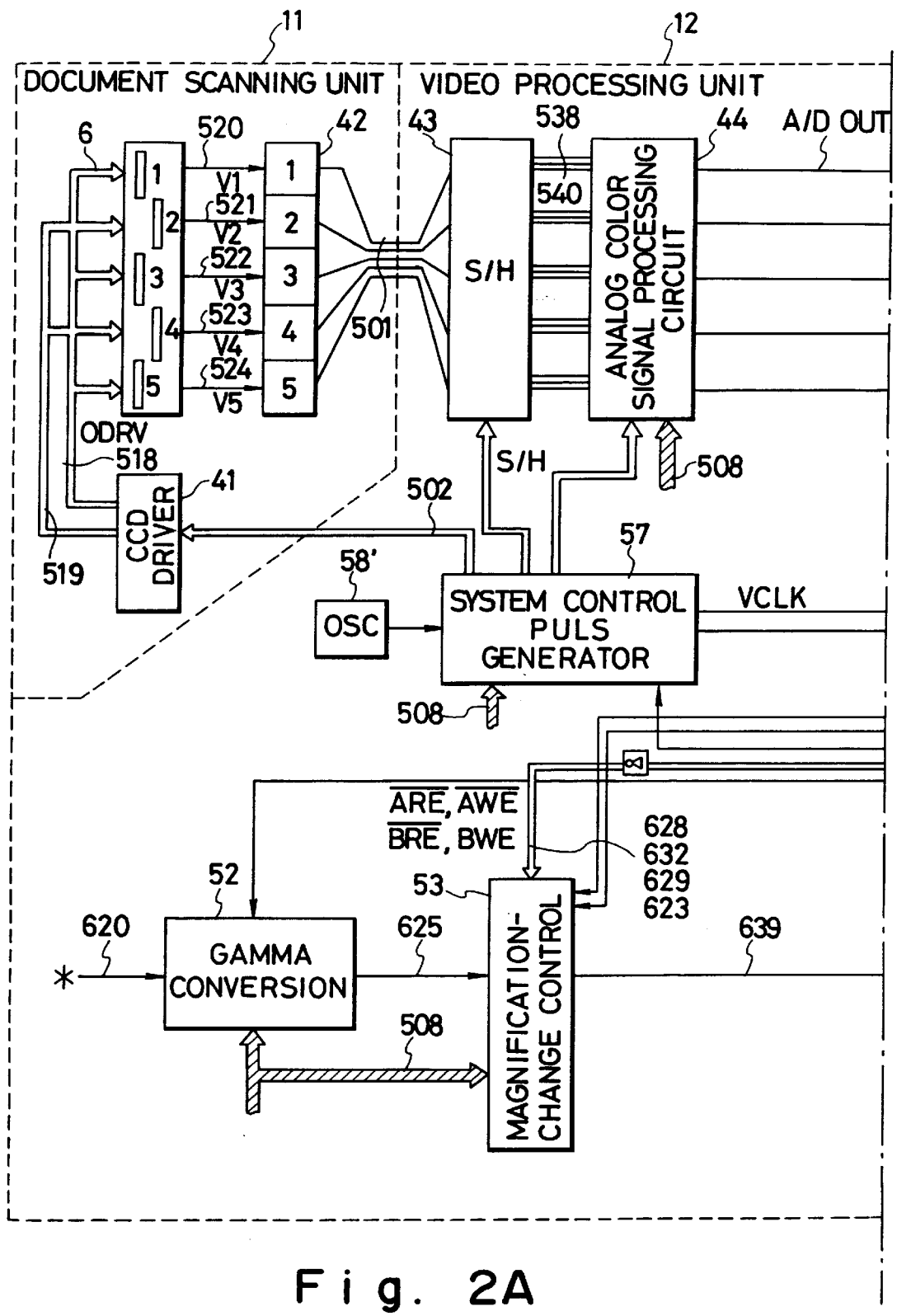
FIGS. 2A to 2C are detailed block diagram of a color reader for use in the embodiment.

In the first embodiment, the full color sensor 6 disposed in the document scanning unit 11 is divided into five areas which are arranged in a staggered manner, as shown in FIG. 2A. This full color sensor 6 as well as a FIFO memory 46 is utilized to correct the difference in readout position between the row of channels 2 and 4 and the row of remaining channels 1, 3, 5. After the difference in readout position has been corrected, the corrected signal is output from the FIFO memory 46 to a black correction/white correction circuit, where signals corresponding to light reflected from the white board 8 and the black board 9 are utilized to correct the uneven readout of a dark portion by the full color sensor 6, the unevenness of the quantity of light emitted by the halogen exposure lamp 10, fluctuations in sensor sensitivity, etc.

The color image data which is proportional to the quantity of light incident on the full color sensor 6 is input to a video interface 101 which is connected to the image storing apparatus 3.

Figure 3:
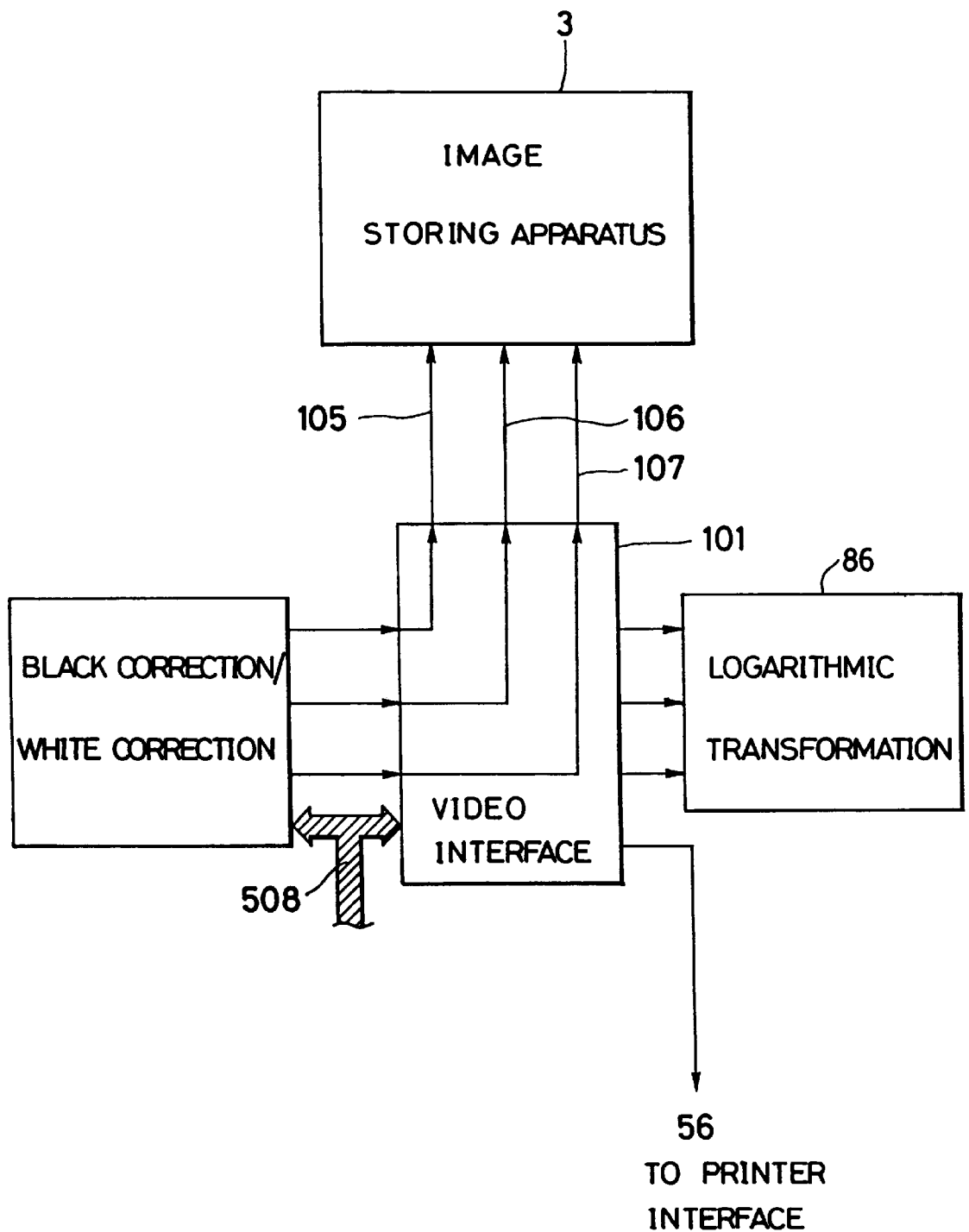
FIGS. 3 to 6 are diagrammatic views which serve to illustrate an example of controlling the switching of a video interface in the color reader used in the embodiment.
Figure 4:
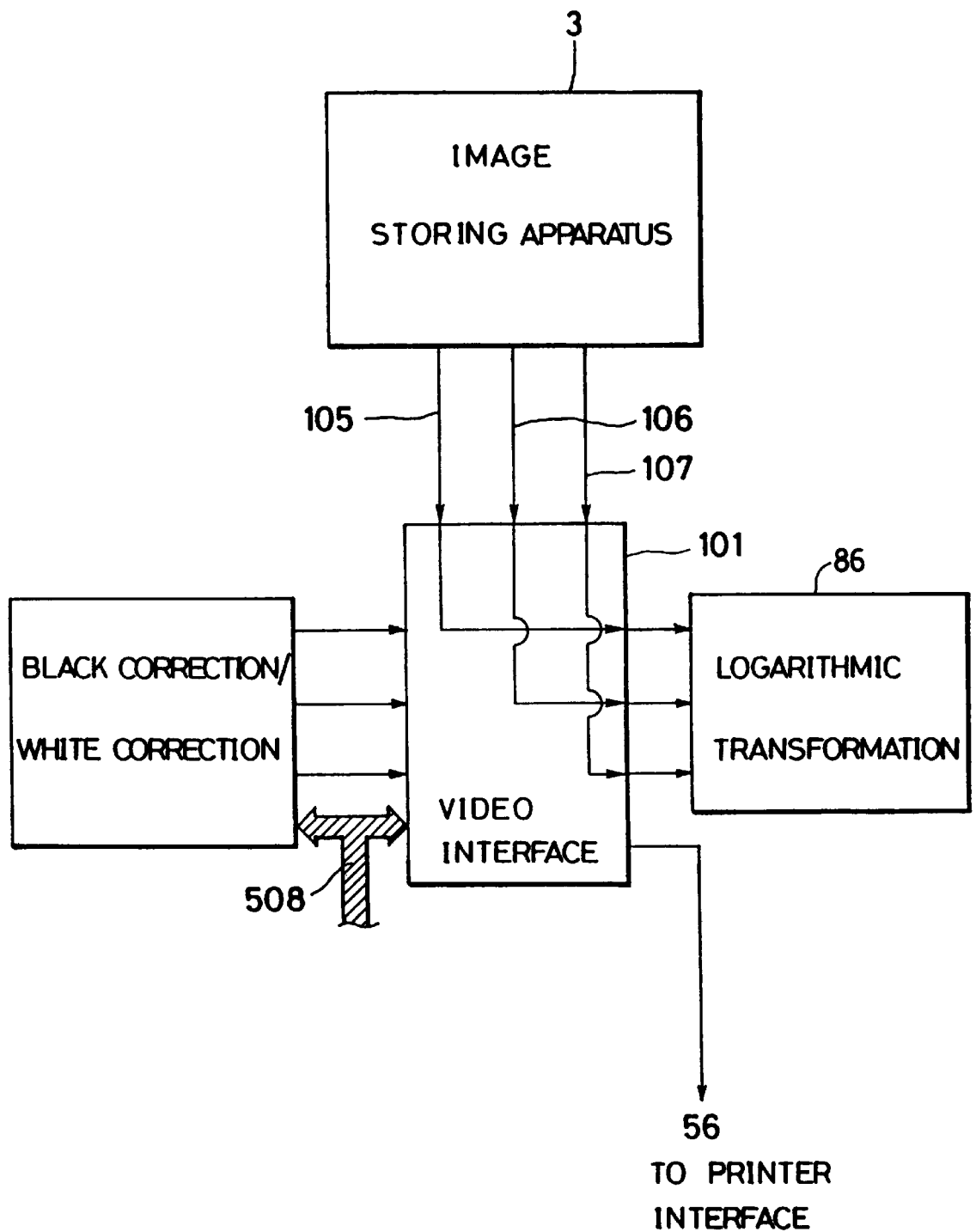
Figure 5:
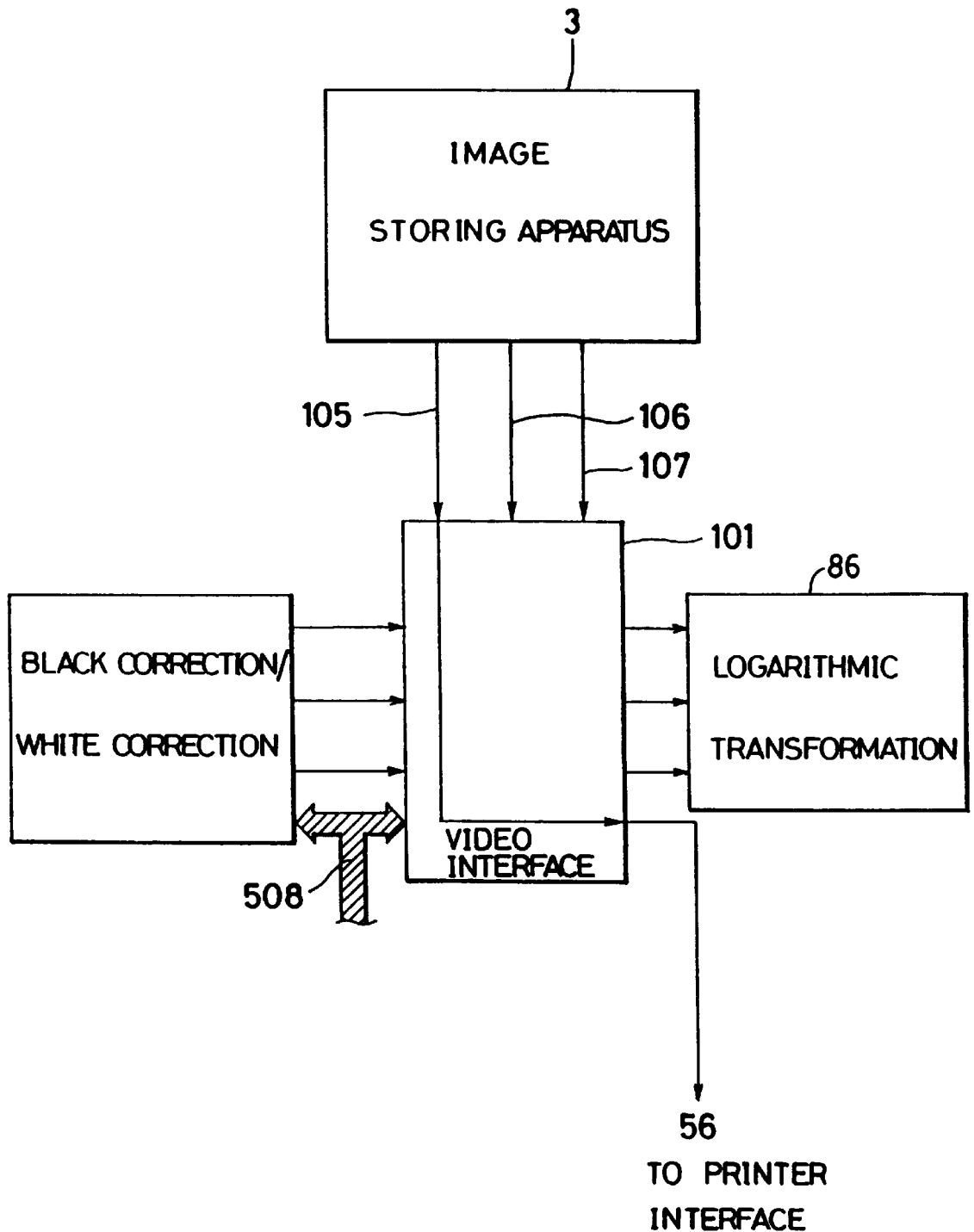
Figure 6:
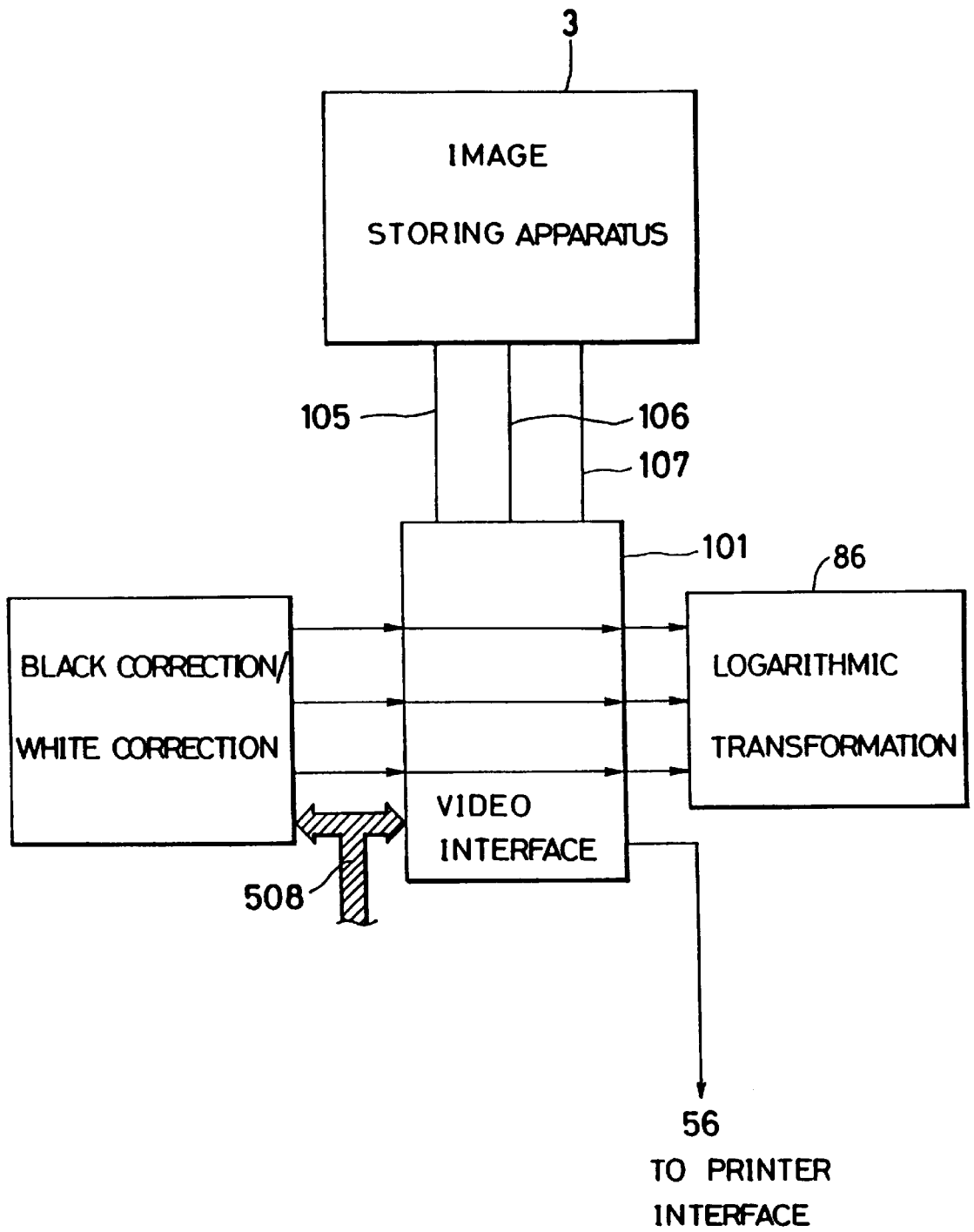

This video interface 101 is provided with the four functions shown in FIGS. 3 to 6: (1) the function of outputting to the image storing apparatus 3 signals 559 supplied from the black correction/white correction circuit (FIG. 3); (2) the function of inputting image information, transferred from the image storing apparatus 3, into a logarithmic transformation circuit 86 (FIG. 4); (3) the function of inputting image information, transferred from the image storing apparatus 3, into a printer interface 56 (FIG. 5); and (4) the function of delivering to the logarithmic transformation circuit 86 the signals 559 supplied from the black correction/white correction circuit (FIG. 6). The electrical connection of the video interface 101 is switched to that shown in any of FIGS. 3 to 6 to select one from the four functions, under the control provided by the control unit 13 through the bus 508 which serves as a CPU control line.

<Explanation of Image Storing Section 3>

The following is an explanation of readout (or fetching) control executed in the color reader 1 as well as memory control executed when readout image information is to be stored in the image storing apparatus 3.

Figure 7:
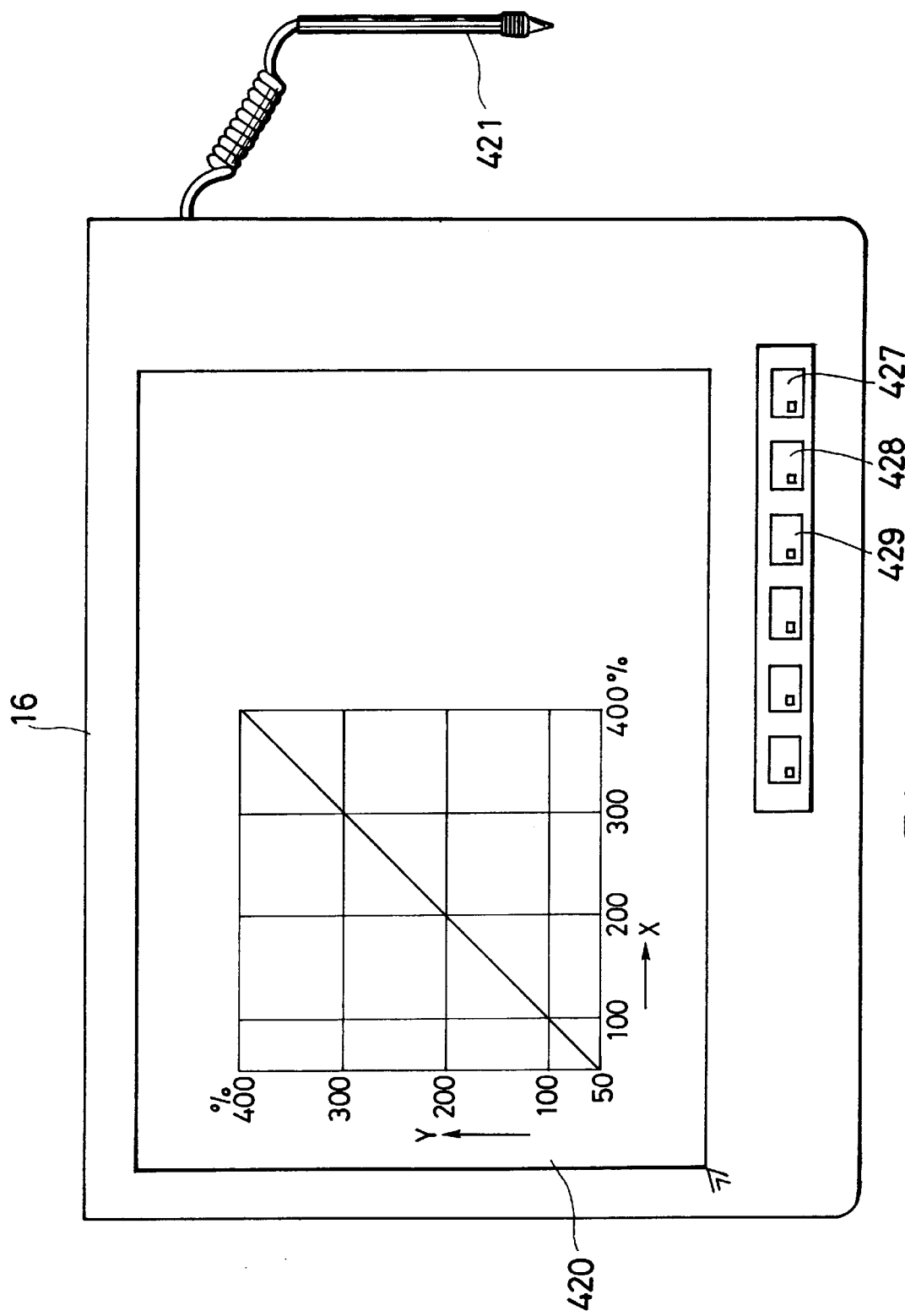
FIG. 7 is a diagrammatic view showing the external appearance of a digitizer for use in the embodiment.

Setting of the readout mode of the color reader 1 is conducted by means of the digitizer 16 which will be described below. FIG. 7 shows the external appearance of this digitizer 16.

As shown in FIG. 7, the digitizer 16 is provided with an entry key 427 used for transferring image data from the color reader 1 to the image storing apparatus 3, a coordinate sensor board 420 used for specifying an arbitrary region on an original document to be read or setting a readout magnification, etc., and a pointing pen 421 used for specifying the desired coordinates.

When image data on the image in an arbitrary region of the original document is to be transferred to the image storing apparatus 3, the entry key 427 is pressed and the position of the region to be read is then specified with the pointing pen 421.

Information on the readout region is transferred to the video processing unit 12 through the signal line 505 of FIGS. 1A and 1B which serves as a communication line. The video processing unit 12 transfers the input signal to the image storing apparatus 3 through the video interface 101 under the control provided through the CPU control line 508.

Figure 8:
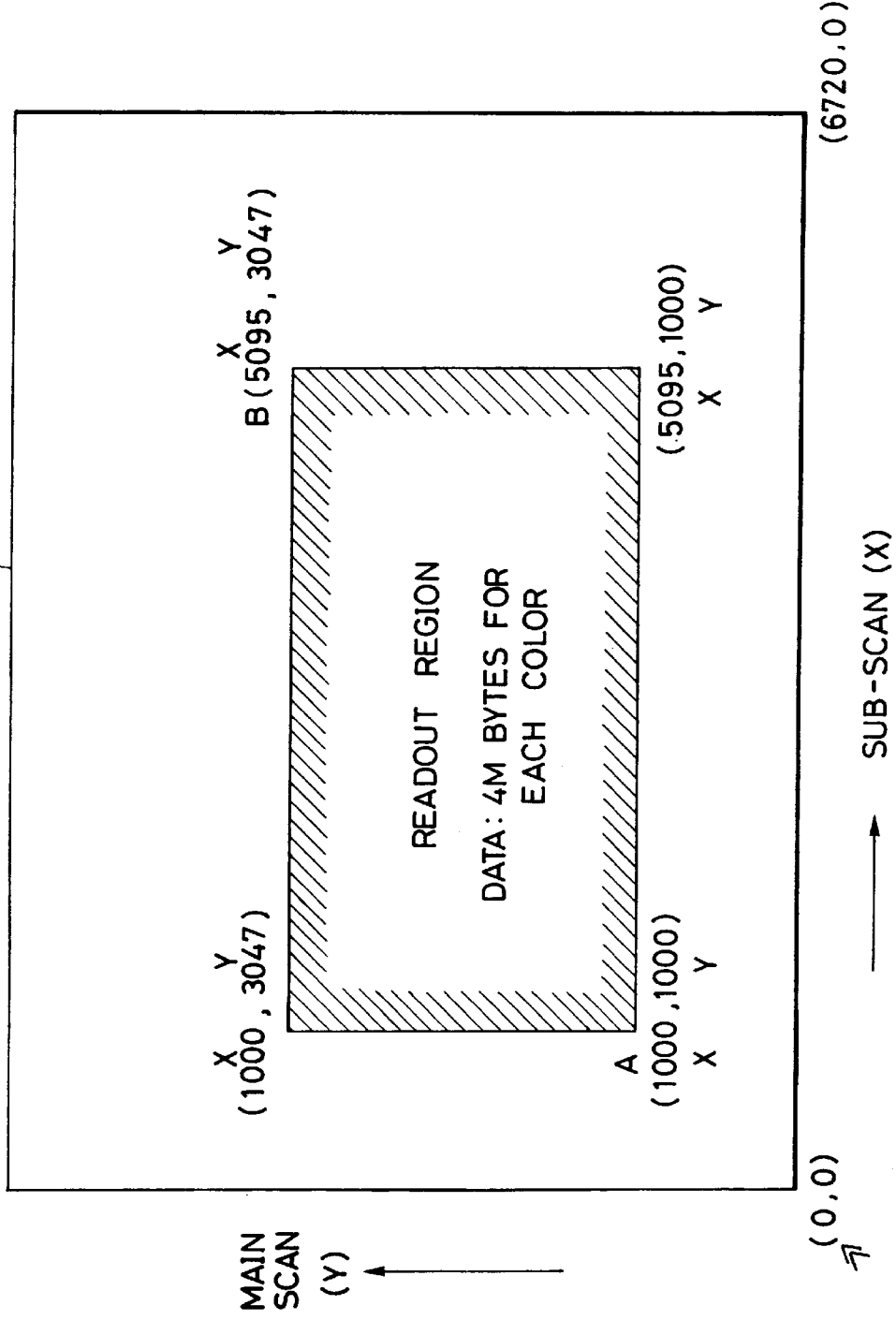
FIG. 8 is a view which serves to illustrate address information on a region specified on the digitizer used in the embodiment.

FIG. 8 shows examples of addresses corresponding to information (points A and B) which represents a region specified with the pointing pen 421.

Figure 9:
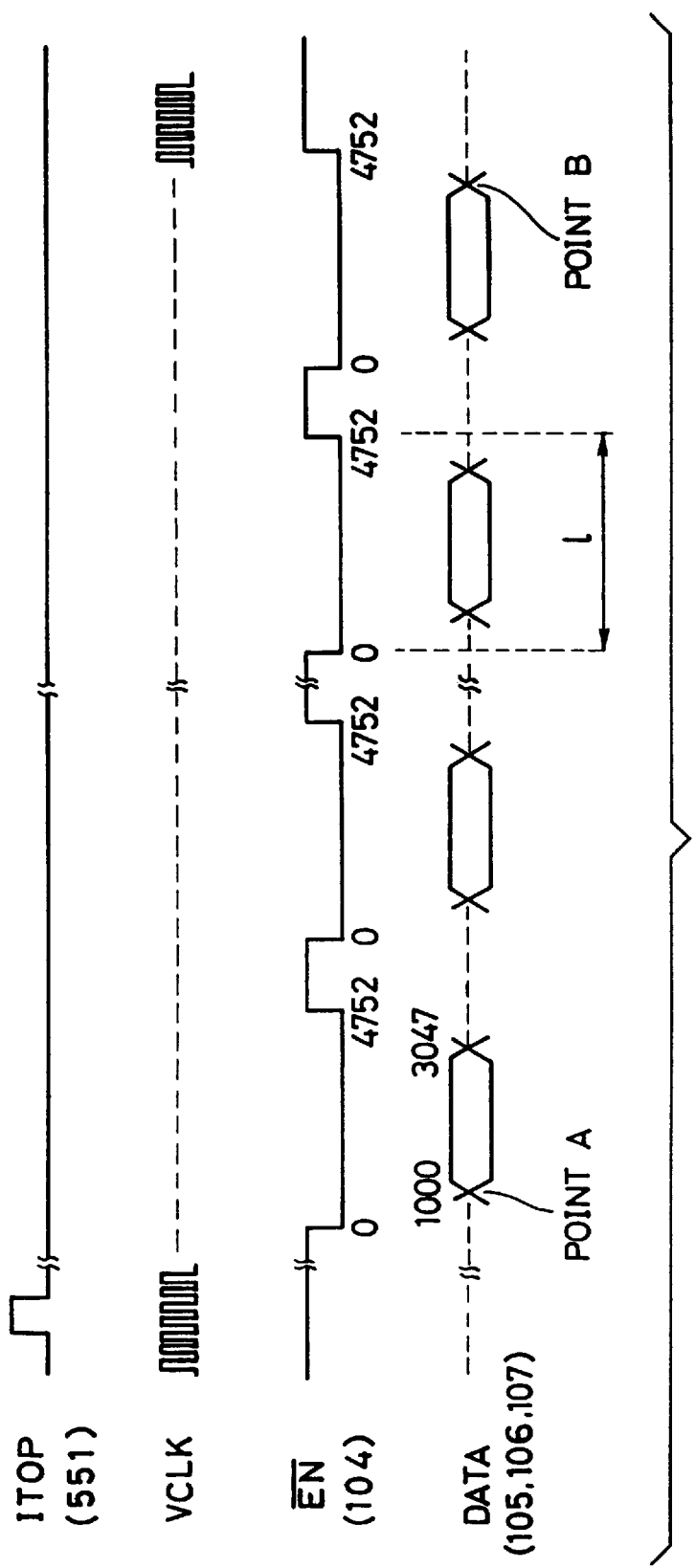
FIG. 9 is a timing chart of signals output from an interface section to an image storing apparatus according to the embodiment.

The video interface 101 outputs to the image storing apparatus 3 not only the above region information but a VCLK signal, an ITOP signal 551, an $\overline{\text{EN}}$ signal 104 supplied from a region-signal generating circuit 51, etc., together with the image data. FIG. 9 is a timing chart of these output signals.

As shown in FIG. 9, when a start button (not shown) of the operating section 20 is pressed, the stepping motor 14 is activated to start scanning of the document scanning unit 11. When the document scanning unit 11 reaches one edge of the original document, the ITOP signal 551 is set to "1". Thereafter, when the document scanning unit 11 reaches the region specified with the digitizer 16, the $\overline{\text{EN}}$ signal 104 is set to "0" and the document scanning unit 11 scans the specified region. Accordingly, if color image information (R data 105, G data 106 and B data 107) is read out as the $\overline{\text{EN}}$ signal 104 is "0", the image information on the specified region can be fetched.

As shown in FIG. 9, the transfer of the image data from the color reader 1 is effected by controlling the video interface 101 in the manner shown in FIG. 3 and transmitting the R data 105, the G data 106 and the B data 107 to the image storing apparatus 3 in real time in synchronization with control signals such as the ITOP signal 551 and the $\overline{\text{EN}}$ signal 104 as well as the VCLK signal.

Figure 10A:
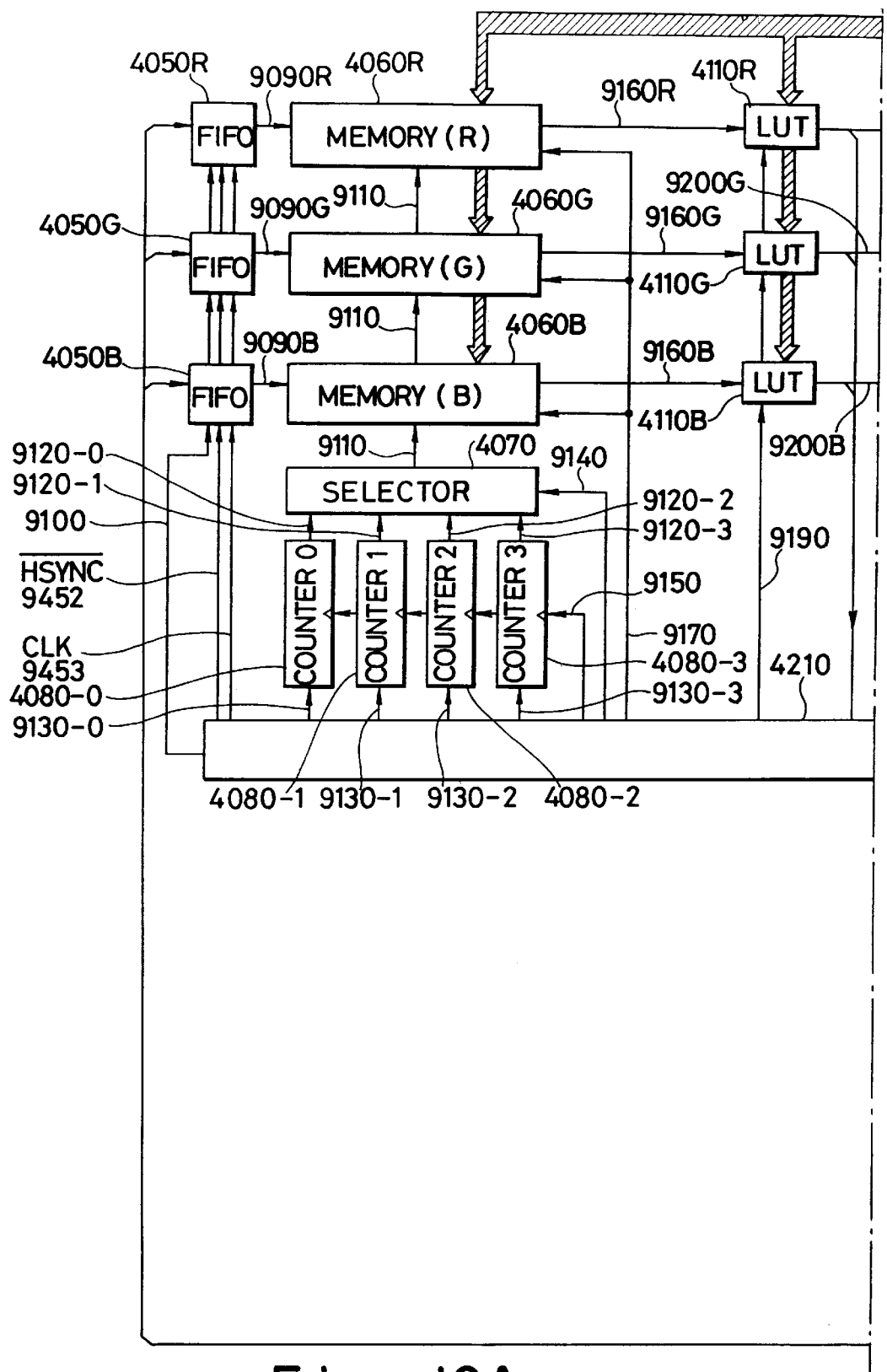
FIGS. 10A to 10C are detailed block diagrams of the image storing apparatus according to the embodiment of the present invention.
Figure 10B:
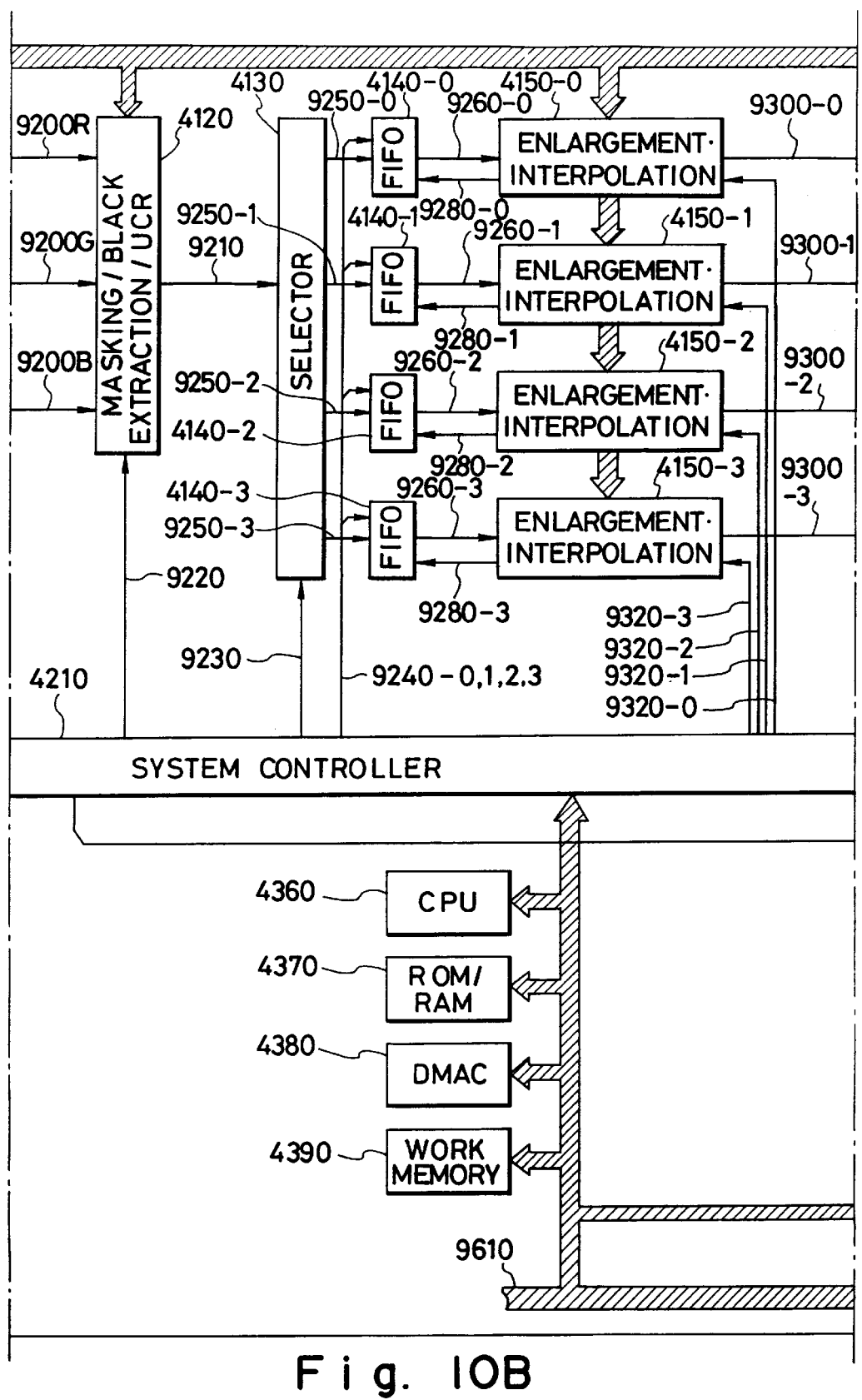
Figure 10C:
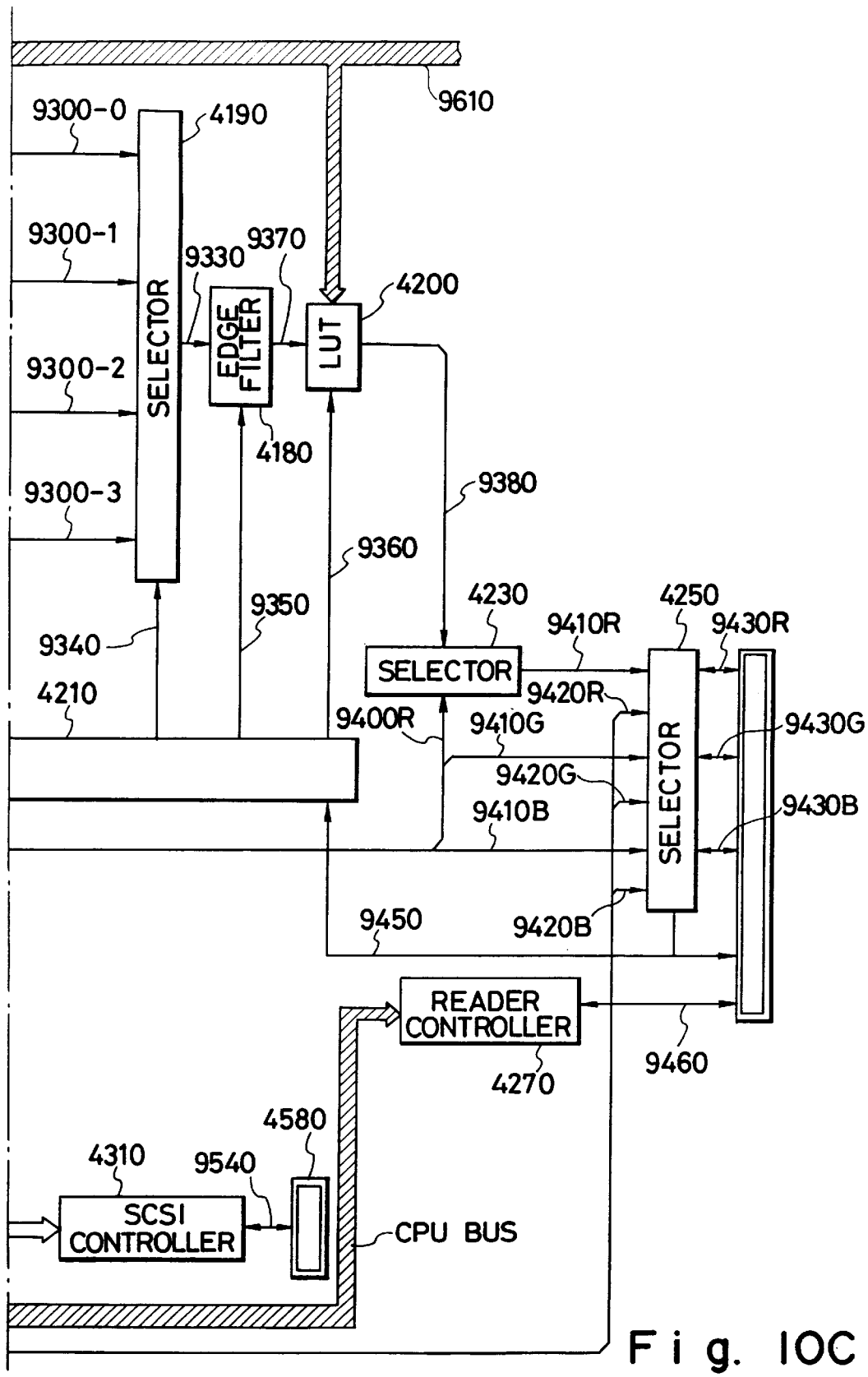

The following is a concrete explanation, referring to FIGS. 10A to 10C, of the way in which the image storing apparatus 3 stores the control signals and the image data which have been transferred from the color reader 1.

A connector 4550 is connected by a cable to the video interface 101 of the color reader 1, and the R data 105, the G data 106 and the B data 107 are fed to a selector 4250 over signal lines 9430R, 9430G and 9430B, respectively. The VCLK signal, the $\overline{\text{EN}}$ signal 104 and the ITOP signal 551, all of which are transferred through the video interface 101, are input directly to a system controller 4210 through a signal line 9450. The information indicative of the region which has been specified with the digitizer 16 prior to the reading of the image is input to a reader controller 4270 through a communication line 9460. A CPU 4360 reads this region information from the reader controller 4270 through a CPU bus 9610.

The R data 105, the G data 106 and the B data 107, which have been input to the selector 4250 over the signal lines 9430R, 9430G and 9430B, respectively, are synchronized with one another in the selector 4250 then output to signal lines 9420R, 9420G and 9420B and then input to corresponding FIFO memories 4050R, 4050G and 4050B.

Figure 11:
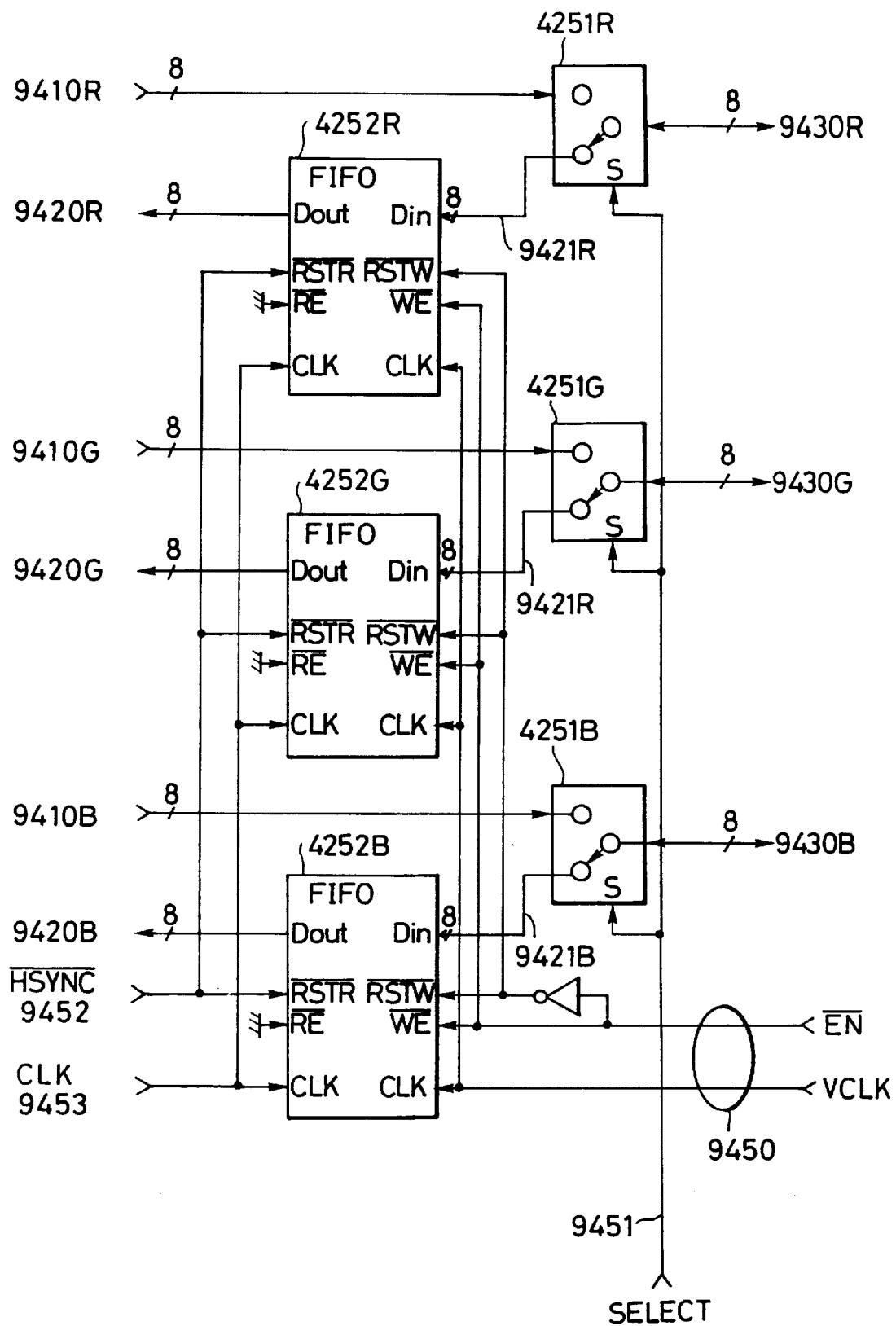
FIG. 11 is a detailed block diagram of a selector section in the image storing apparatus according to the, embodiment of the present invention.

FIG. 11 is a detailed block diagram showing the construction of the selector 4250.

As shown in FIG. 11, the image data 9430R, 9430G and 9430B, which have been transferred from the color reader 1, pass through selectors 4251R, 4251G and 4251B, respectively, and are then input to corresponding FIFO memories 4252R, 4252G and 4252B.

A signal to be input to each of the selectors 4251R, 4251G and 4251B is selected by the application of a select signal 9451.

Image data 9421R, 9421G and 9421B, each for one main-scanning line (width: addresses 0 to 4752) as shown in FIG. 9, are stored in FIFO memories 4252R, 4252G and 4252B, respectively, in accordance with the VCLK and $\overline{\text{EN}}$ signals.

These FIFO memories 4252R, 4252G and 4252B further store signals corresponding to the portion other than the available region specified on the digitizer 16.

The image data stored in the respective FIFO memories 4252R, 4252G and 4252B are read out in synchronization with an $\overline{\text{HSYNC}}$ signal 9452 and a CLK signal 9453 within the image storing apparatus 3. In other words, the difference in clock frequency between the color reader 1 and the image storing apparatus 3 is absorbed by means of the FIFO memories 4252R, 4252G and 4252B.

The system controller 4210 select only the image data on the available region from each of the image data 9420R, 9420G and 9420B supplied from the respective FIFO memories 4252R, 4252G and 4252B and transfer the selected image data to corresponding FIFO memories 4050R, 4050G and 4050B. At the same time, the system controller 4210 carries out trimming and a change in magnification.

The above process in the first embodiment will be described below with reference to the circuit diagram of FIG. 12 and the timing chart of FIG. 13.

To begin with, prior to the data transfer from the FIFO memories 4252R, 4252G and 4252B to the respective FIFO memories 4050R, 4050G and 4050B, image data on the available region in the main-scan direction within the region specified on the digitizer 16 is written into a RAM 4212 through a CPU bus 9610.

The memory capacity of RAM 4212 is larger (8 Kbits) than the number of picture elements of 4752 in the main-scan direction and each bit of the RAM corresponds to the main-scan direction.

A selector 4213 is controlled to select the CPU bus 9610 and make it usable so that data "0" is written into the area of the RAM 4212 which corresponds to the specified available region, while data "1" is written into the area of the RAM 4212 which corresponds to the remaining, unavailable region.

Then, the selector 4213 is controlled to select a counter 4212 and make it usable so that a write-enable signal 9100 synchronized with the $\overline{\text{HSYNC}}$ signal 9452 and the CLK signal 9453 is output from the RAM 4212 through a latch 4211 to each of the FIFO memories 4050R, 4050G and 4050B. In response to this write-enable signal 9100 of R, G and B color image information (A), only the R, G and B color image information (A') corresponding to the available region is written into the respective FIFO memories 4050R, 4050G and 4050B. The image data thus written are each delayed by a period corresponding to one main scan, and are sequentially output from addresses 0 of the respective FIFO memories 4050R, 4050G and 4050B in synchronization with the $\overline{\text{HSYNC}}$ signal 9452 (as shown at 9090 R, G, B in FIG. 13).

The foregoing explanation has been given with reference to the example of transferring the image data of the FIFO memories 4252R, 4252G and 4252B to the respective FIFO memories 4050R, 4050G and 4050B in the original form (as a full-size image). However, the control of the first embodiment is not limited to the above-described one, and a change in magnification or trimming is enabled in accordance with the type of data to be written into the RAM 4214.

Figure 14:
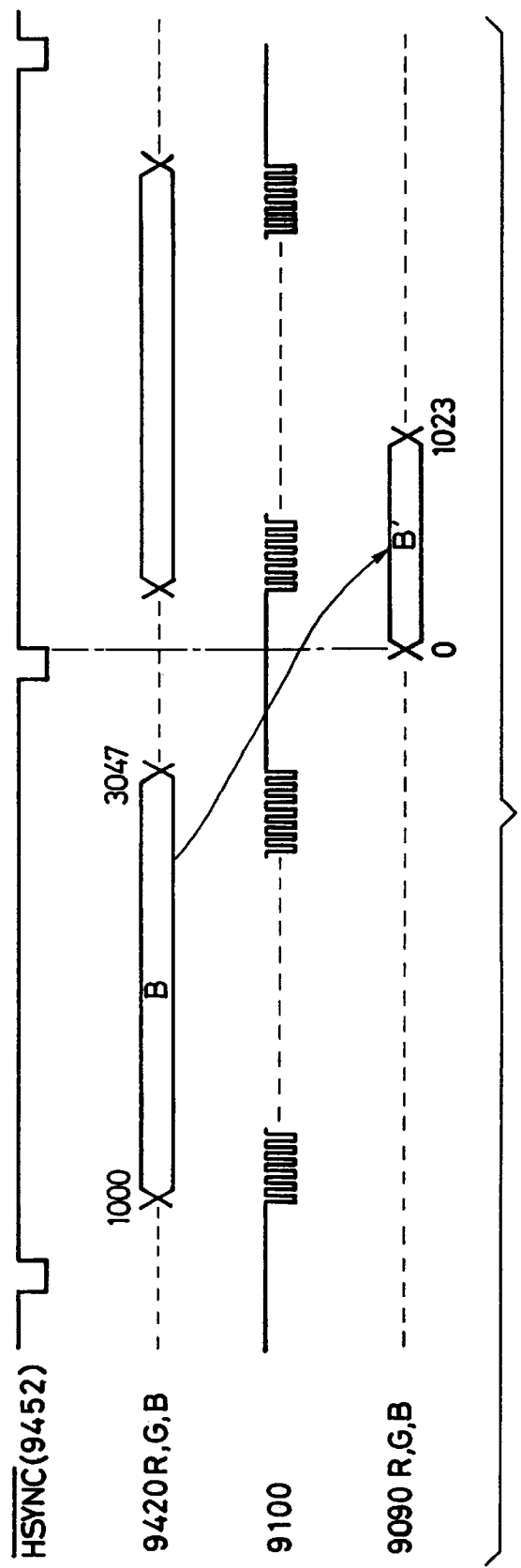
FIG. 14 is a timing chart of the operation of storing data in the FIFO memories in the system controller section during an altered-size process according to the embodiment.

A timing chart which serves to illustrate a case where the magnification change and the trimming are carried out is shown in FIG. 14.

FIG. 14 is a timing chart which serves to illustrate an example in which the R, G, B image data from the respective FIFO memories 4252R, 4252G and 4252B is 50% reduced in size by changing the magnification, the reduced R, G, B image data being then transferred to the respective FIFO memories 4050R, 4050G and 4050B.

As shown in FIG. 14, write data to be supplied to the RAM 4212 (the write-enable signal 9100 output to each of the FIFO memories 4050R, 4050G and 4050B) is set to "1" (denoting the state of write inhibition) within the available region of the image data to achieve a reduction. In the case shown in FIG. 14, the write-enable signal 9100 alternately repeats "0" and "1", thereby effecting a 50% reduction. In this manner, since the write data to be supplied to the RAM 4212 is processed in accordance with the ratio of reduction, it is possible to effect a reduction to an arbitrary magnification within the image storing apparatus 3.

The 50% reduced image data is delayed by a period corresponding to one main scan and is output sequentially in the order of address 0 to address 1023 in synchronization with the $\overline{\text{HSYNC}}$ signal 9452 (as shown at B' in FIG. 14).

In this manner, the size of the desired image can be reduced in the main-scan direction by processing data to be written into the RAM 4212.

Then, transfer of the image data from FIFO memories 4050R, 4050G and 4050B to corresponding FIFO memories 4060R, 4060G and 4060B is effected by the combination of a counter 0 (4080-0) and a control line 9170.

In this transfer step, a change in magnification and trimming in the sub-scan direction are conducted at the same time. The change in magnification and the trimming in the sub-scan direction will be explained below, with reference to the block diagram of FIG. 15 and the timing chart of FIG. 16, respectively, which corresponds to a 50% reduction.

Prior to data transfer from FIFO memories 4050R, 4050G and 4050B to respective FIFO memories 4060R, 4060G and 4060B, the CPU 4360 writes control data into a RAM 4217 over the CPU bus 9610, the control data serving to control writing of image information on the region in the sub-scan direction, which constitutes part of the region specified with the digitizer 16, into respective FIFO memories 4060R, 4060G and 4060B (the control data is supplied as a write enable signal to each of the FIFO memories 4060R, 4060G and 4060B). In a full-size process, such control data is set to "1" with respect to the unavailable image region and to "0" with respect to the available region. In the reduction process, part of the data corresponding to the available region is set to "1", thereby reducing the image to the desired size. A 50% reduction is achieved by alternating data "1" and "0".

Figure 16:
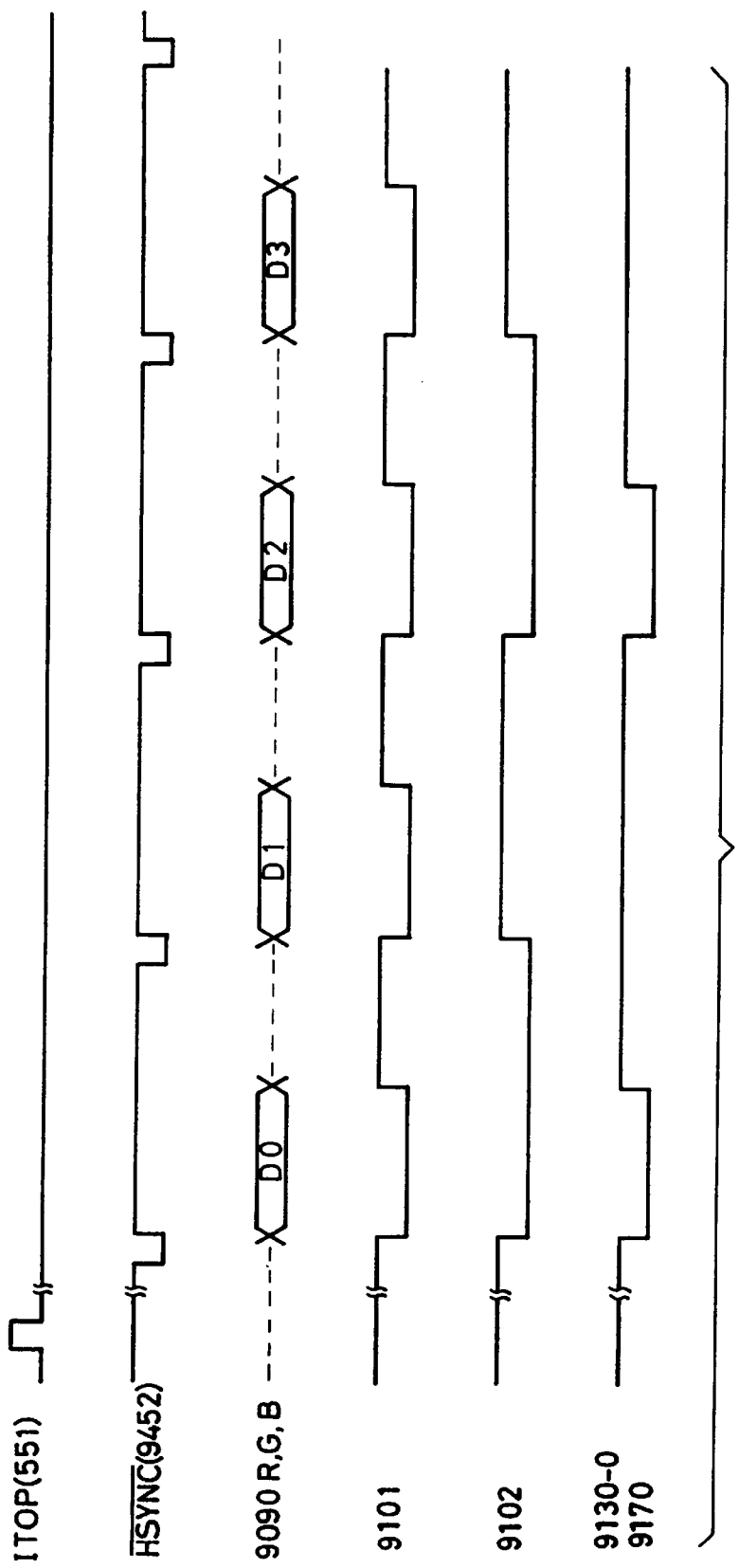
FIG. 16 is a timing chart of the operation of storing data in the image memories in the system controller section during an altered-size process according to the embodiment.

In this 50% reduction process, the write-enable signal 9170 transferred to each of the FIFO memories 4060R, 4060G, and 4060B alternates between "1" and "0" in the available image region, as shown in FIG. 16. In this manner, "D0" and "D2" in FIG. 16 are stored as image data in each of the FIFO memories 4060R, 4060G, and 4060B, but neither "D1" nor "D3" is stored.

As described above, trimming and a change in magnification in the main-scan direction are conducted on the basis of data which is set in the RAM 4212, while trimming and a change in magnification in the sub-scan direction are conducted on the basis of data which is set in the RAM 4217.

It is to be noted that, since the memory capacity of the first embodiment is 2 Mbyte for each color, the image data corresponding to the readout region shown in FIG. 8 is reduced by 50% and is thereby converted into data in a reduced form within the capacity of the memory of the image storing apparatus 3.

Moreover, in the above-described embodiment, the CPU 4360 computes an available region from information on the region in an A3 document which is specified with the digitizer 16, and sets corresponding data into the RAM 4212.

In the above-described embodiment, since the data size of a read-out image is larger than the memory capacity of the image memory provided in the apparatus, the requisite reduction process is carried out to convert the data size of the read-out image into the size which can be stored in the image memory. In this manner, the data on the read-out image is stored in the image memory of the apparatus.

Figure 15:
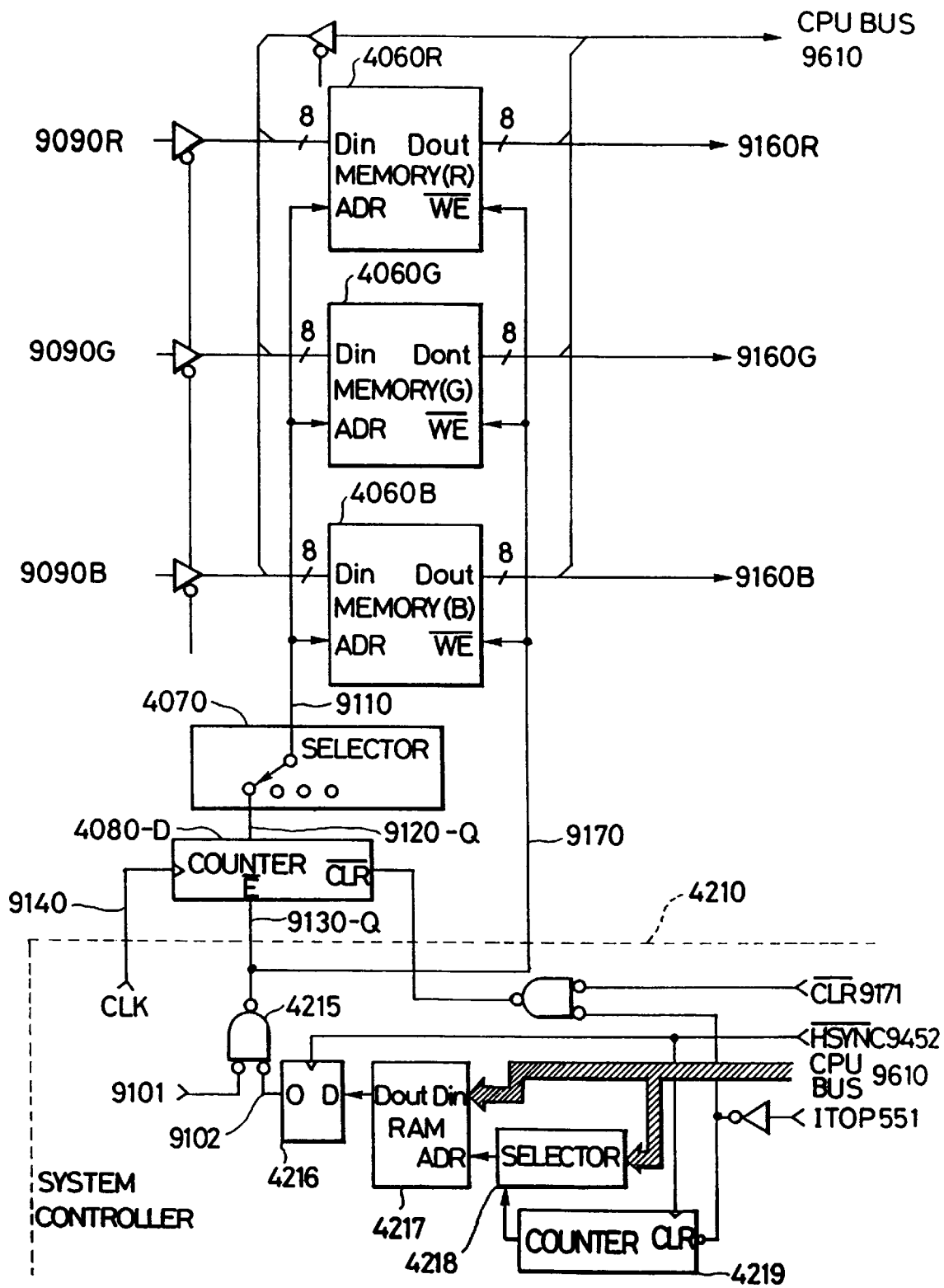
FIG. 15 is a detailed block diagram showing a construction associated with the system controller section and image memories in the image storing apparatus according to the embodiment.

However, if the data size of a read-out image is smaller than the memory capacity of the image memory provided in the apparatus, the $\overline{\text{CLR}}$ signal 9171 shown in FIG. 15 is set to "1" so that a plurality of images can be stored in the image memory at the same time.

Figure 12:
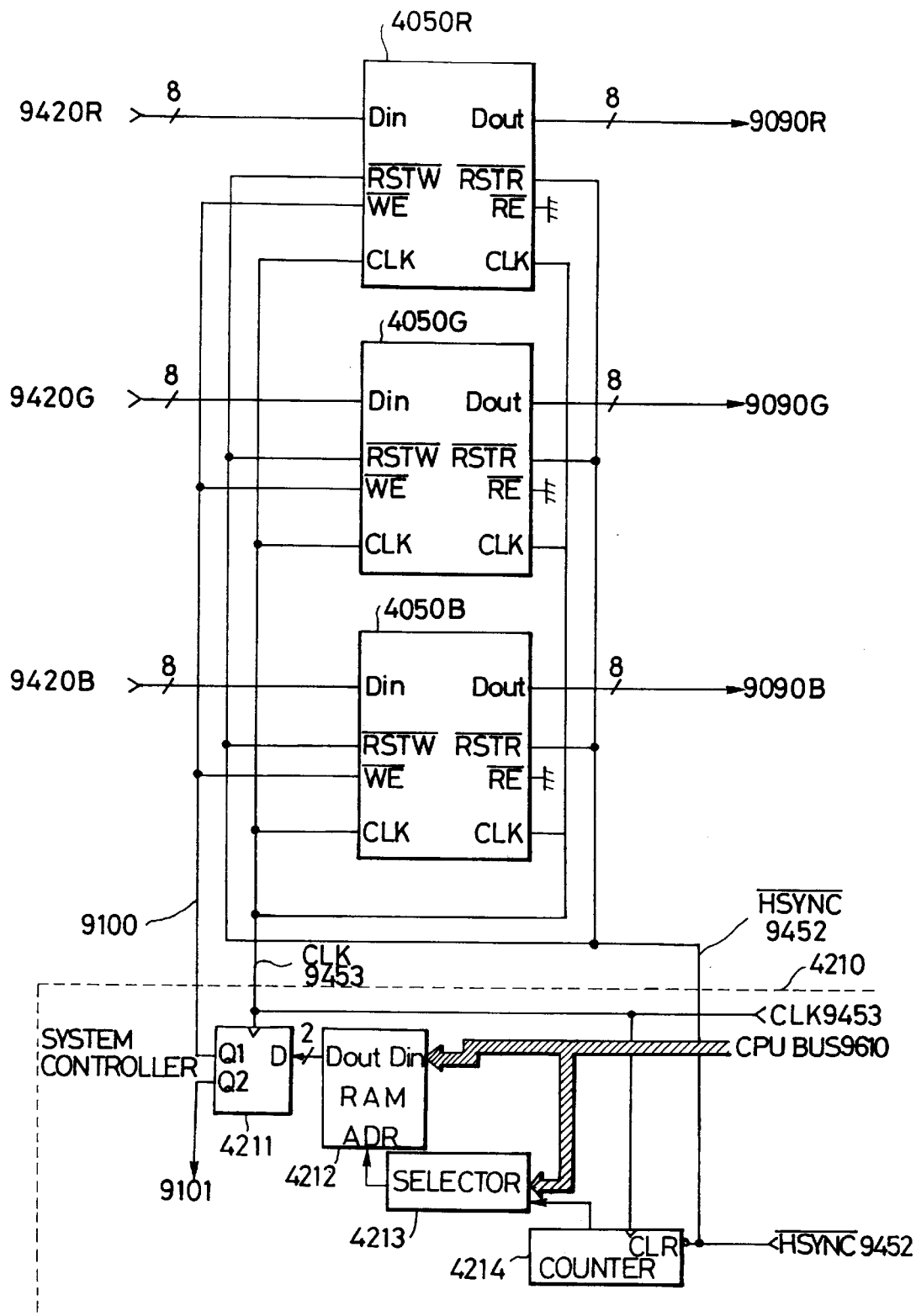
FIG. 12 is a detailed block diagram of a system controller section and FIFO memories in the image storing apparatus according to the embodiment of the present invention.
Figure 13:
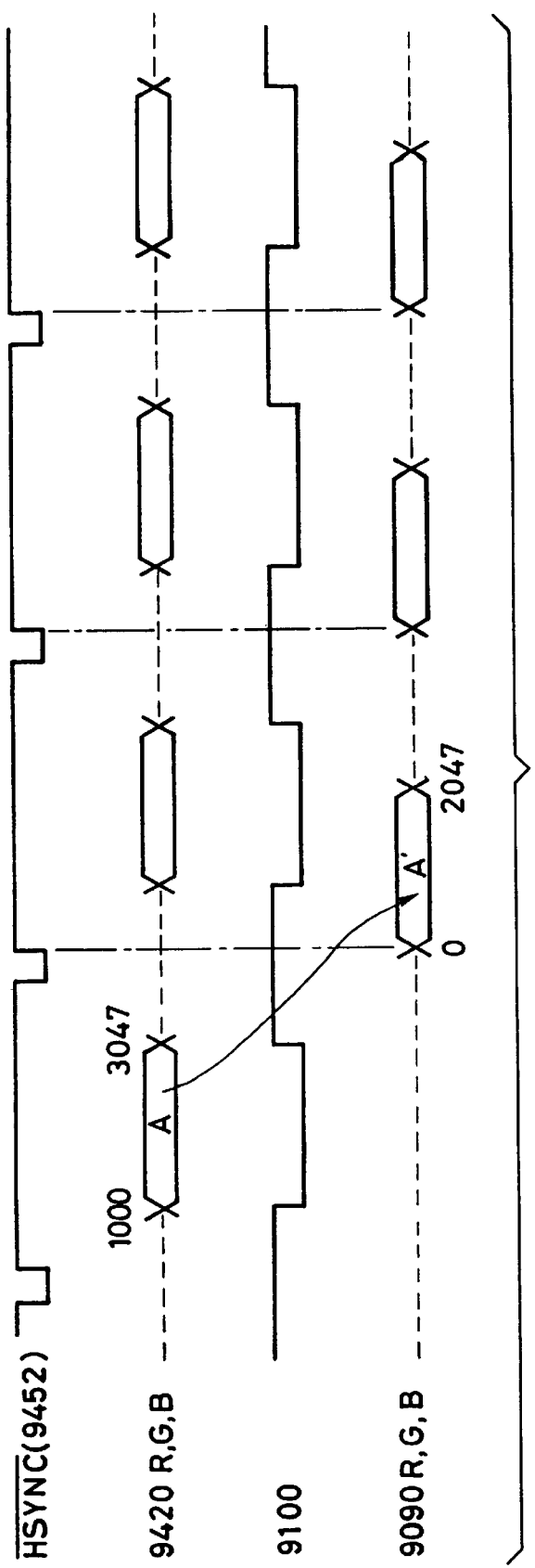
FIG. 13 is a timing chart of the operation of storing data in the FIFO memories in the system controller section during a full-size process according to the embodiment.

In this case, all the write data are set to "0" that are to be written into the RAMs 4212 and 4217 shown in FIGS. 12 and 15 for controlling the operation of writing into the memory image data on a region which has been specified on the digitizer 16, and all the data on the specified region is set to a write-enable state, thereby achieving full-size storage.

In order to store the readout image in the memory while preserving its aspect ratio (the ratio of width to height of a reproduced image), the CPU 4360 computes the number x of available picture elements from the region information transmitted from the digitizer 16 and then obtains z from the maximum capacity y of the image memory by using the following equation:

$$\frac{y}{x} \times 100 = z$$

Thus, (1) if z≧100, all the write data to be written into the RAMs 4212 and 4217 is set to "0", and the available image region is stored in full size; and (2) if z<100, write data corresponding to a z % reduction is written into the RAMs 4212 and 4217 and image data is stored up to the maximum capacity with the aspect ratio preserved.

In the above case (2) as well, data "1" and "0" may be written into the RAMs 4212 and 4217 as required, in accordance with the reduction ratio z.

The following is a detailed description of the process, noted as (2), of storing image information which is reduced with the aspect ratio thereof preserved.

Image data (8 Mbytes for each color) on the readout region defined by a shaded periphery on the A3 document shown in FIG. 8 is stored up to the maximum memory capacity (2 Mbytes for each color) of each of the memories 4060R, 4060G and 4060B.

The points A and B shown in FIG. 8 are specified with the pointing pen 421 of the digitizer 16.

The X-Y coordinates of point A are (1000, 1000), while the X-Y coordinates of point B are (5095, 3047). Both coordinates are transmitted to the video processing unit 12 over the signal line 505. The video processing unit 12 computes the size of the read-out region from the coordinates of the respective points A and B. In this example, the size of the read-out region is approximately 8M picture elements, which is obtained from (5095−1000)×(3047−1000).

Moreover, since the memory capacity of the apparatus is 2 Mbytes for each color, $$\frac{2M}{8M} \times 100 = 25$$

Thus, Z=25 is obtained, and a 25% reduction in the area of the readout region is achieved.

The 25% reduction in the area means a 50% reduction in each of the X and Y direction. Therefore, in order to store the read-out image in the memory without changing the aspect ratio, data corresponding to a 50% reduction is set in each of the RAM 4212 and the RAM 4217.

In the RAM 4212 of FIG. 12, "1" is written into the area of addresses 0 to 999, "0" and "1" are alternately written into the area of addresses 1000 to 3047, and "1" is written in the area from addresses 3048 to 4752.

In the RAM 4217 of FIG. 15, "1" is written into the area of addresses 0 to 999, "0" and "1" are alternately written into the area of addresses 1000 to 5095, and "1" is written in the area from addresses 5096 to 6720.

Prior to storing the readout region shown in FIG. 8, the input of the selector 4213 of FIG. 12 which is connected to the counter 4214 is selected, while the input of the selector 4217 of FIG. 15 which is connected to the counter 4217 is selected.

The counter 4212 is cleared by the $\overline{\text{HSYNC}}$ signal 9452 and counts up in response to the CLK signal 9453. The output of the counter 4212 is latched by the flip-flop 4211, and is then input over the signal line 9100 to the $\overline{WE}$ terminal of each of the FIFO memories 4050R, 4050G and 4050B.

FIG. 14 shows the waveform appearing along the signal line 9100.

When the $\overline{HSYNC}$ signal 9452 is input, information stored at address 0 in the RAM 4212 is output to the signal line 9100 of FIG. 14. When the CLK signal 9453 is input, the counter 4214 counts up and sequentially outputs the stored data.

Since "1" is output to the signal line 9100 of FIG. 14 from addresses 0 to 999 in the RAM 4212, "1" is set to the $\overline{WE}$ input of each of the FIFO memories 4050R, 4050G and 4050B shown in FIG. 12, thereby inhibiting writing to these FIFO memories. Since "1" and "0" are alternately output to the signal line 9100 from addresses 1000 to 3047 in the RAM 4212, the R, G and B image signals from the color reader 1 are sequentially written into the respective FIFO memories 4050R, 4050G and 4050B. From the addresses following address 3047, "1" is output to the signal line 9100 thereby inhibiting writing to the FIFO memories 4050R, 4050G and 4050B.

As described above, the image information from addresses 1000 to 3047, i.e., the signals 9420R, 9420G and 9420B of FIG. 14 are sequentially written into the respective FIFO memories 4050R, 4050G and 4050B. In synchronization with the next application of the $\overline{HSYNC}$ signal 9452, the FIFO memories 4050R, 4050G and 4050B output their respective stored image signals in the form of continuous information (as shown at B' in FIG. 14).

A reduction in the main-scan direction is achieved by controlling the $\overline{WE}$ signals of the FIFO memories 4050R, 4050G and 4050B. In this embodiment, a 50% reduction is effected.

The following is a description of a reduction in the sub-scan direction.

The output signals 9090R, 9090G and 9090B of the FIFO memories 4050R, 4050G and 4050B are respectively input to the memories 4060R, 4060G and 4060B through corresponding tri-state butters.

The counter 4219 shown in FIG. 15 is cleared by the ITOP signal 551 and counts up in synchronization with the $\overline{HSYNC}$ signal 9452. The output of the counter 4219 is input to addresses of the RAM 4217 through the selector 4218.

The output of the RAM 4217 is latched by the flip-flop 4216, and is then supplied through an AND gate 4215 to both the $\overline{WE}$ inputs of the respective memories 4060R, 4060G and 4060B and the $\overline{E}$ input of the counter 4080-D.

As described above, "1" is stored in the the RAM 4217 from address 0 to address 999 and from address 5096 to address 6720, and "1" and "0" are alternately stored in the RAM 4217 from address 1000 to address 5095.

Accordingly, although the output signals 9090R, 9090G and 9090B are continuously input to the input terminals Din of the corresponding memories 4060R, 4060G and 4060B, the $\overline{WE}$ inputs of the memories 4060R, 4060G and 4060B are controlled by the output signal 9170 from the RAM 4217 so that no line along addresses 0 to 999 in the sub-scan direction is stored in the memory 4060R, 4060G or 4060B. Every other line along addresses 1000 to 5095 is stored in the memories 4060R, 4060G and 4060B, thereby effecting a 50% reduction. This 50% reduction is explained below with reference to FIG. 16.

The image-information signals 9090R, 9090G and 9090B, each of which consists of an array of data D0 to D3 as shown in FIG. 16, are input to the respective memories 4060R, 4060G and 4060B. In the meantime, the output 9102 from the RAM 4217 alternates between "1" and "0" in every other line and, therefore, the data D0 and D2 are stored in each of the memories, but neither data D1 nor data D3 are stored in the same.

With respect to the lines along the addresses following 5095, "1" is output from the RAM 4217 so that no image information 9090R, 9090G or 9090B is stored in the memory 4060R, 4060G or 4060B.

As described above, the size of the region specified on the digitizer 16 is compared with the memory capacity of the memory and, if the former is larger than the latter, the required reduction ratio is found out. On the basis of this reduction ratio, data is set into the RAMs 4212 and 4217 so as to provide the same reduction ratio in the X and Y directions.

In accordance with the data output from the RAMs 4212 and 4217 thus set, the $\overline{WE}$ terminals of the FIFO memories 4050R, 4050G and 4050B are controlled with respect to a reduction ratio in the main-scan direction, while the $\overline{WE}$ terminals of the memories 4060R, 4060G and 4060B are controlled with respect to a reduction ratio in the sub-scan direction, whereby the input image data can be stored in the memories 4060R, 4060G and 4060B with the aspect ratio of the original input image preserved.

In accordance with the above-described control, only if the operation of the image storing apparatus 3 alone is controlled, it is possible to achieve a change to an arbitrary magnification while preserving the aspect ratio of an input image under extremely simple control. It is also possible to achieve effective recognition of a readout image. Moreover, it is possible to maximize the efficiency of utilization of the memory capacity.

<Process of Reading from Image Storing Apparatus>

The following is an explanation of the process of reading image data from the memories 4060R, 4060G and 4060B of the image storing apparatus 3 described above.

When an image output from these memories is to be formed as a printed image at the color printer 2, the required inputs such as specifying inputs are primarily provided by means of the aforementioned digitizer 16 shown in FIG. 7.

The key 428 shown in FIG. 7 is an entry key which is used for forming the image data of the memories 4060R, 4060G and 4060B into an image of a size corresponding to the size of the recording paper. A key 429 is an entry key which is used for forming an image at a location specified by means of the coordinate sensor board 420 and the pointing pen of the digitizer 16.

The following explanation refers first to the example of forming an image of a size corresponding to the size of the recording paper and second to the example of forming an image in a region specified on the digitizer.

<Process of Forming Image of Size Corresponding to Size of Recording Paper>

As shown in FIGS. 1A and 1B, the color printer 2 used in this embodiment has two cassette trays 735 and 736, and two kinds of recording paper are set in the respective cassette trays. In the example shown in FIGS. 1A and 1B, A4-size recording paper and A3-size recording paper are set in the upper and lower cassette trays 735 and 736, respectively. A selection between the two kinds of recording paper is performed by providing a selecting input through an LCD touch panel of the operating section 20. The following explanation is given with reference to an example in which a plurality of images are formed on the A4-size recording paper.

First of all, prior to forming an image, on the basis of readout image data which is input from the color reader 1 to the image storing apparatus 3, a set of image data containing, for example, sixteen images 0 to 15 is stored in each of the image memories 4060R, 4060G and 4060B, as shown in FIG. 17.

Then, when the entry key 428 of the digitizer 16 is pressed, a CPU (not shown) detects this key input to automatically set the image-forming position at which each of the images 0 to 15 is to be formed on the A4-size recording paper. When the sixteen images shown in FIG. 17 are to be formed, the individual image-forming positions are set as shown in, for example, FIG. 18.

The above-mentioned image-forming process in this embodiment will be described in greater detail with reference to the block diagrams shown in FIGS. 10A to 10C and the timing chart shown in FIG. 19.

Figure 2B:
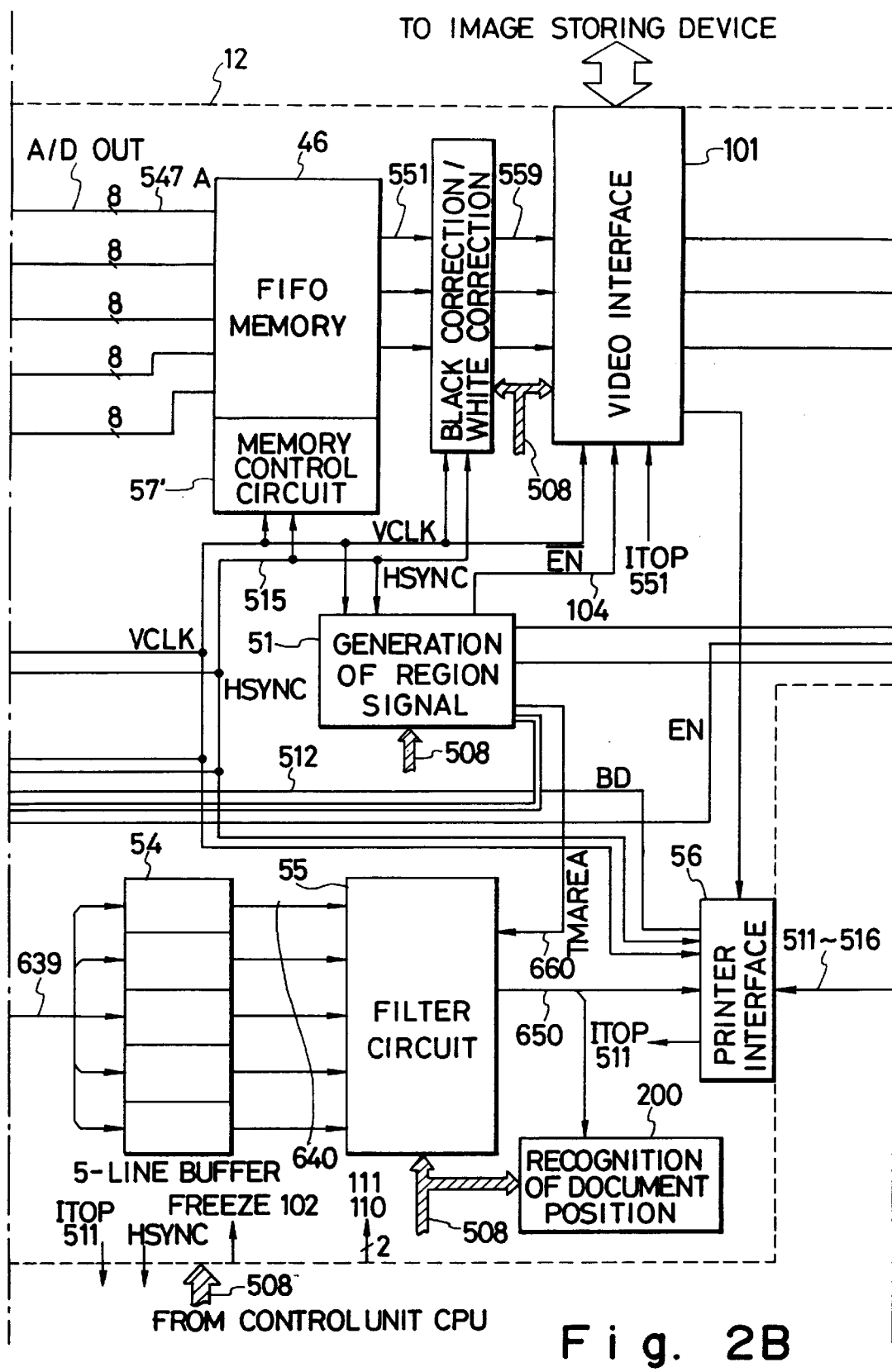
Figure 2C:
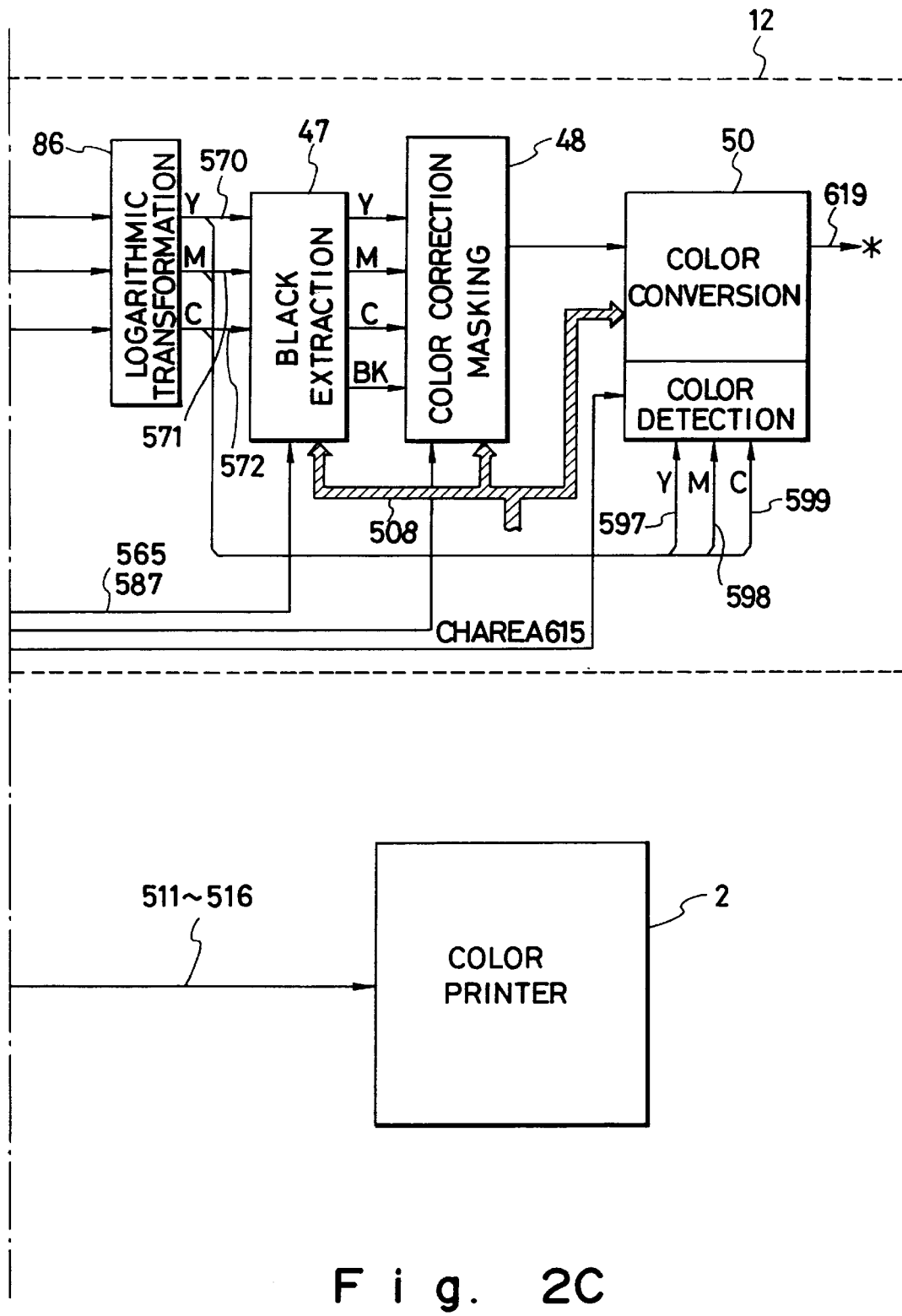

The ITOP signal 511, which is, as shown in FIGS. 2A to 2C, transmitted from the color printer 2 through the printer interface 5 to the color reader 1, is input to the video interface 101 in the video processing unit 12 and is in turn transmitted to the image storing apparatus 3. The image storing apparatus 3 starts the image-forming process in response to the ITOP signal 551.

Each image data transmitted to the image storing apparatus 3 is formed into an image under the control of the system controller 4210 provided in the image storing apparatus 3 as shown in FIGS. 10A to 10C.

Referring to FIGS. 10A to 10C, the output of the counter 0 (4080-0) is selected by a selector 4070 and the memories 4060R, 4060G and 4060B are thus accessed through a memory address line 9110 for reading purposes. The image data stored in each of the memories 4060R, 4060G and 4060B is read out by this access, and image signals 9160R, 9160G and 9160B read from the respective memories 4060R, 4060G and 4060B are transmitted to corresponding look-up tables (LUTs) 4110R, 4110G and 4110B. In each of the LUTs, logarithmic transformation is carried out in order to obtain image data which conforms to the relative spectral sensitivity characteristics of the eyes of human beings. Converted data 9200R, 9200G and 9200B output from the respective LUTs are input to a masking/black extraction/UCR circuit 4120. This masking/black extraction/UCR circuit 4120 effects color correction of the color image signals in the image storing apparatus 3 and also effects UCR/black extraction when black is recorded.

An image signal 9210, supplied from the masking/black extraction/UCR circuit 4120 in which the masking portion, the black extraction portion and the UCR portion are continuously linked, is separated into image signals for the respective color images by a selector 4130. These separated image signals 9250-0 to 9250-3 are input to FIFO memories 4140-0 to 4140-3, respectively. Thus, the individual images which have been sequentially arranged are rendered processible in parallel by the operation of the FIFO memories 4140-0 to 4140-3.

Figure 19:
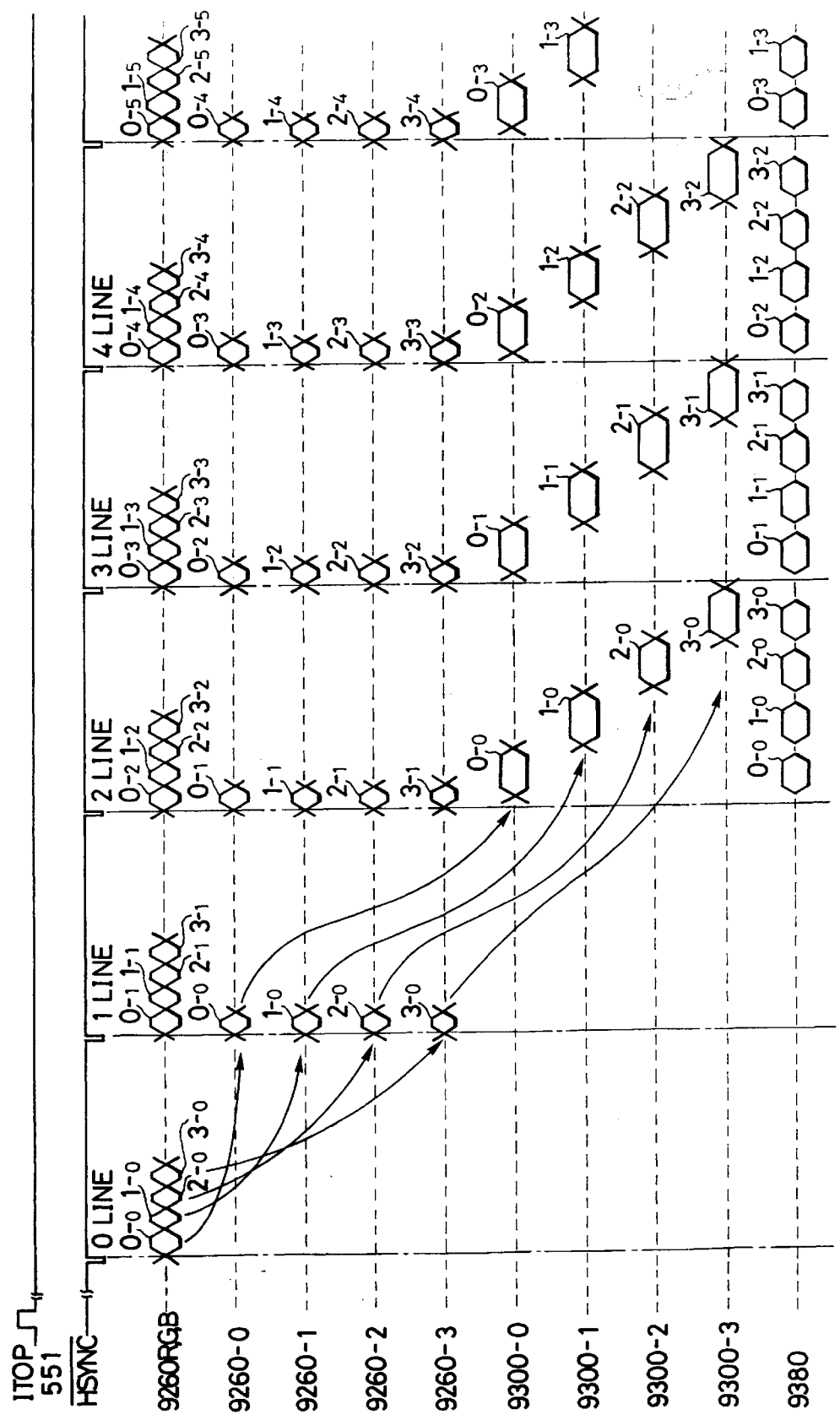
FIG. 19 is a timing chart which serves to illustrate an image-forming process according to the layout of the images shown in FIG. 18.

The relation between the image signals 9160R, 9160G and 9160B read from the respective memories 4060R, 4060G and 4060B and the parallel output image information 9260-0 to 9260-3 from the respective FIFO memories 4140-0 to 4140-3 is shown in the upper part of FIG. 19.

As shown in FIG. 19, all the image information 9260-0 to 9260-3, corresponding to readout image information on the images 0 to 3 along line 0 which are required to form an image for one line in the main-scan direction, is rendered processible in parallel.

The parallel image signals 9260-0 to 9260-3 are input to the next enlargement.interpolation circuits 4150-0 to 4150-3, respectively. The enlargement.interpolation circuits 4150-0 to 4150-3 are controlled by the system controller 4210 so that the layout of the images shown in FIG. 18 can be obtained. In the respective enlargement.interpolation circuits 4150-0 to 4150-3, the image signals 9260-0 to 9260-3 are enlarged and interpolated as shown at signals 9300-0 to 9300-3 in FIG. 19.

Incidentally, in this example, a linear interpolation method is used to effect enlargement.interpolation.

The thus-interpolated signals 9300-0 to 9300-3 are input to a selector 4190, where the respective image data that has been processed in parallel is again converted into a serial image data signal. An image signal 9330, which represents the serial image data obtained by the parallel-to-serial conversion in the selector 4190, is subjected to edge emphasis and smoothing in an edge filter circuit 4180. The thus-obtained signal 9370 is passed through an LUT 4200 and is input to a selector 4230 as a signal 9380.

The selector 4230 is a selector which serves to determine whether the four colors M (magenta), C (cyan), Y (yellow) and BK (black) or the three colors R (red), G (green) and B (blue) are to be output.

In this example, the four colors M, C, Y and BK are output in a field-sequential manner. Accordingly, image data which is available with respect only to the signal line 9410R is selected and output.

The thus-selected image data is input to the selector 4250 and the signal line 9410R is selected by the respective selector 4251R shown in the block diagram of FIG. 11 to output signal 9430R to the connector 4550.

When all the image data corresponding to the images 0 to 3 have been formed, the remaining image data is formed in the order of image 4 to 7, images 8 to 11 and images 12 to 15. Consequently, sixteen images consisting of the images 0 to 15 are formed as shown in FIG. 18.

<Image Formation Based on Arbitrary Layout of Positions>

Figure 18:
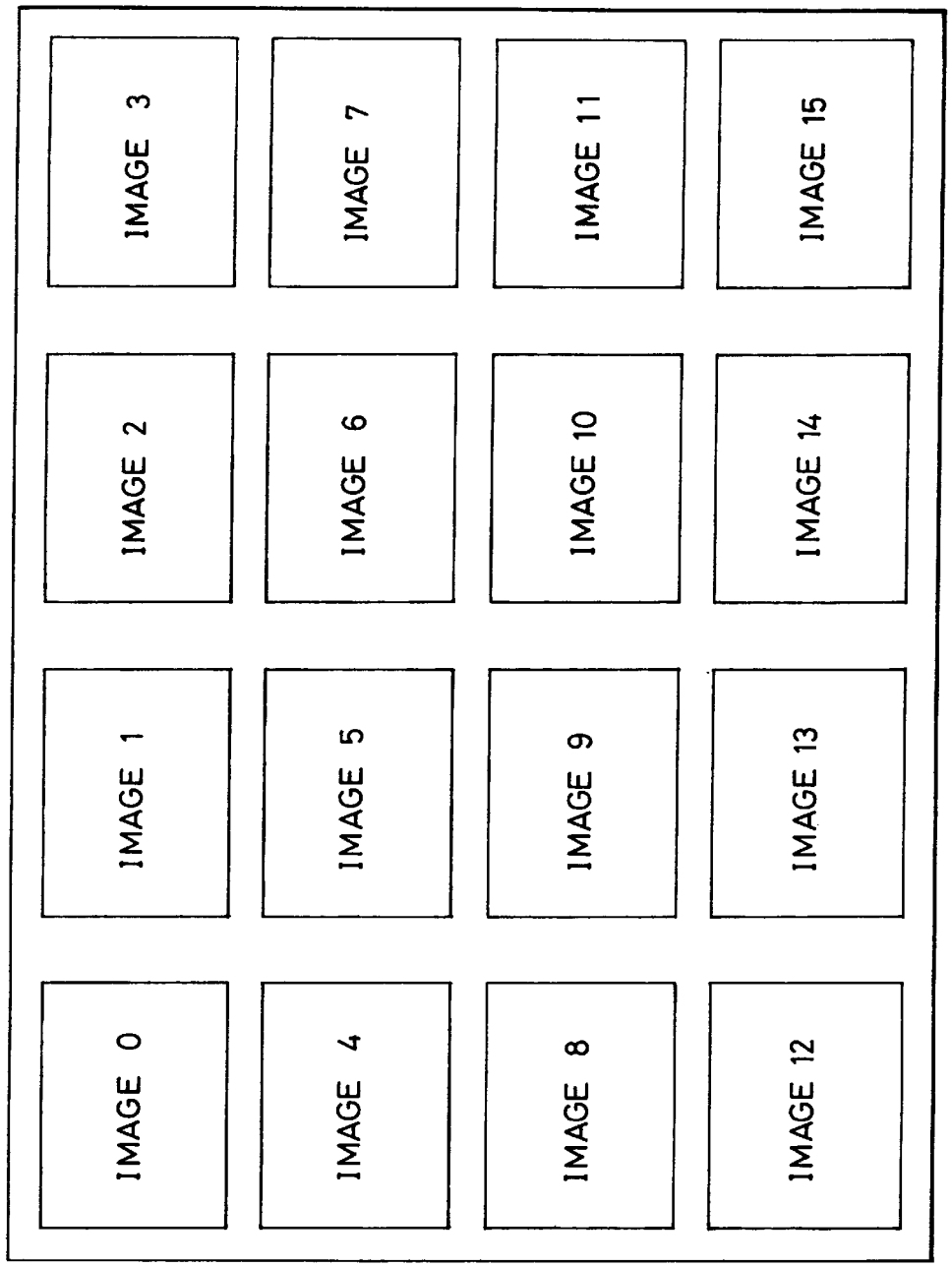
FIG. 18 is a view showing the layout of images formed according to the embodiment.

The foregoing explanation has been given with reference to the image-forming control for automatically laying out images as shown in FIG. 18 for the purposes of image formation. However, this embodiment is not limited to the above-described example, and is also capable of forming images by laying out arbitrary images in arbitrary positions.

Figure 21:
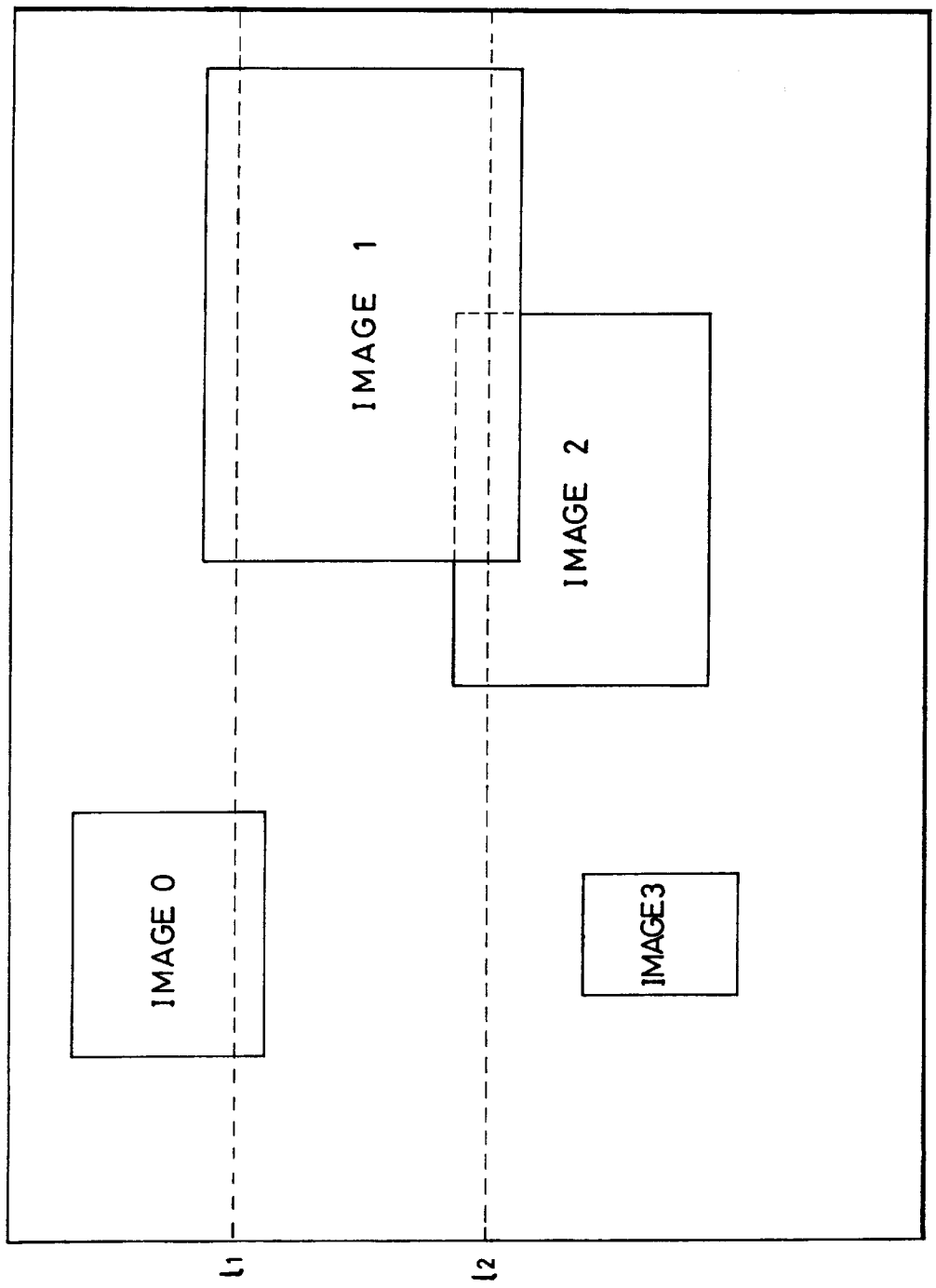
FIG. 21 is a view showing an example in which the image information shown in FIG. 20 is laid out in an arbitrary form.

The following explanation is given with specific reference to a case where the images 0 to 3 shown in FIG. 21 are laid out as illustrated for the purpose of image formation.

Figure 20:
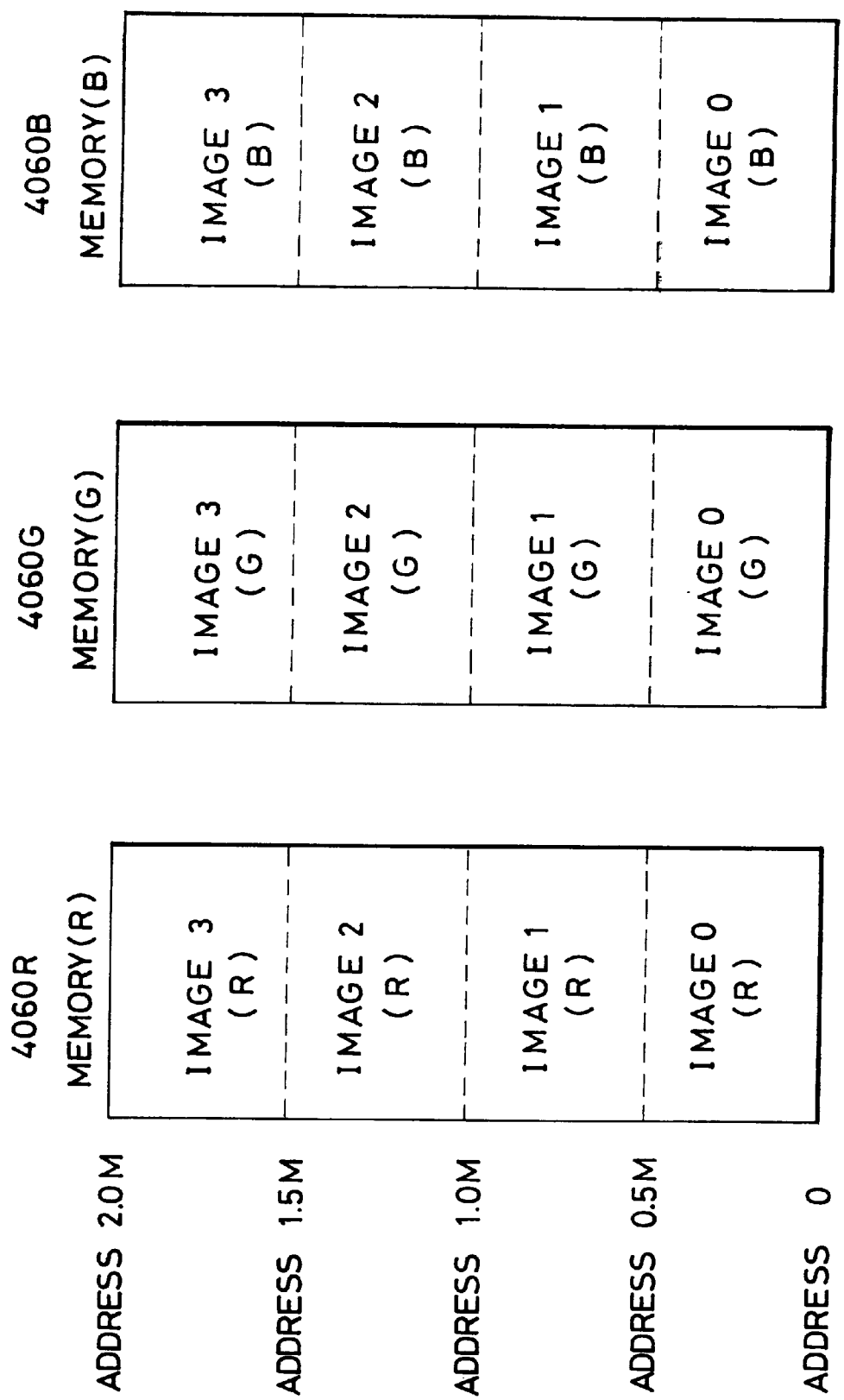
FIG. 20 is a view showing the arrangement of image information stored in each image memory in another example of the image storing apparatus according to the embodiment.

First of all, under control similar to the above-described image-input control provided over the image memories, four pieces of image information read through the color reader 1 are stored in each of the image memories 4060R, 4060G and 4060B, as shown in FIG. 20. Then, when the entry key 429 of the digitizer 16 is pressed, the apparatus is placed in a stand-by state until the specified position at which a readout image is to be formed is input through the digitizer 16.

Then, the desired layout is specified by operating the pointing pen 421 on the coordinate sensor board 420. For example, the desired layout region specified as shown in FIG. 21 is input.

The image-forming process executed in this case will be explained below with reference to the block diagrams of FIGS. 10A to 10C and the timing charts of FIGS. 22 and 23.

Figure 22:
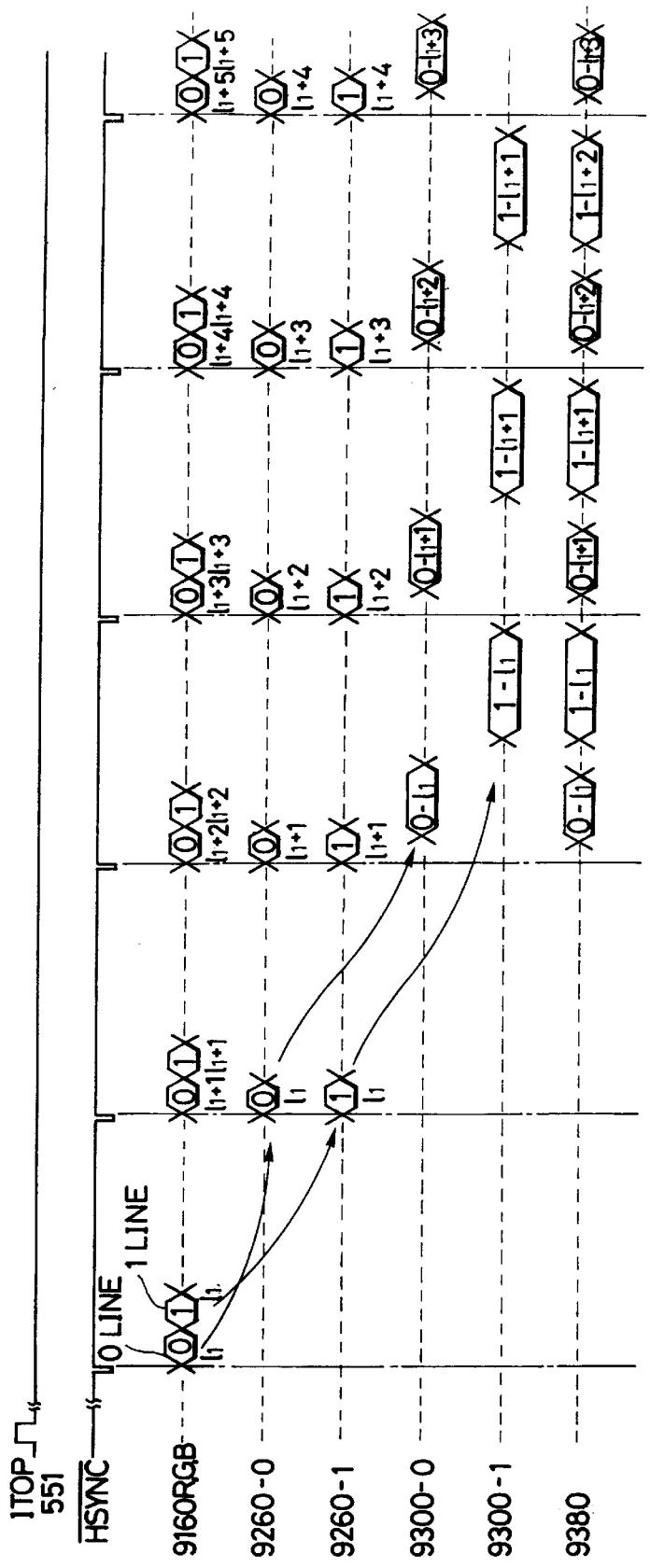
FIG. 22 is a timing chart of the process of forming images along line $l_1$ shown in FIG. 21.
Figure 23:
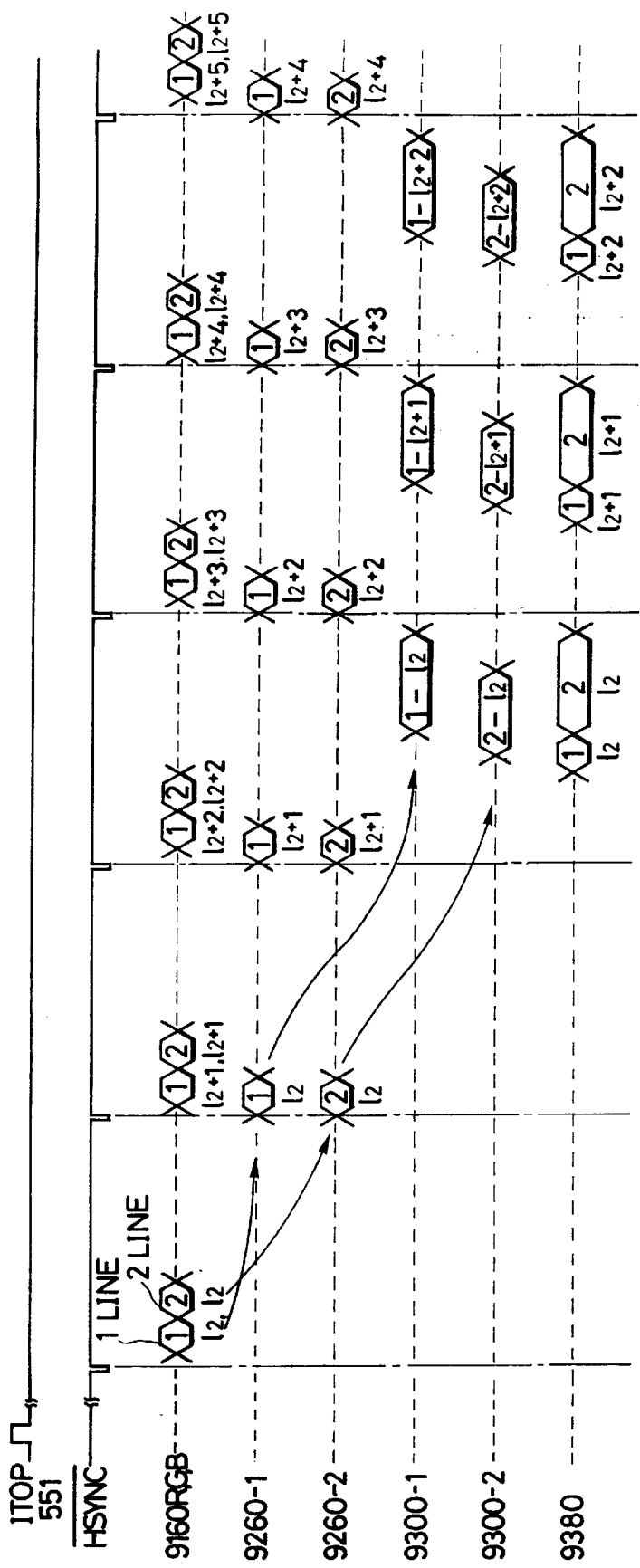
FIG. 23 is a timing chart of the process of forming images along line $l_2$ shown in FIG. 21.

FIG. 22 is a timing chart showing the process of forming images along line $l_1$ shown in FIG. 21, and FIG. 23 is a timing chart showing the process of forming images along line $l_2$ in FIG. 21.

The ITOP signal 551 is output from the printer 2 in a manner similar to the manner described above, and the system controller 4210 starts operation in synchronization with this signal.

In the image layout shown in FIG. 21, image 3 is shown as being rotated through 90 degrees with respect to the original image transmitted from the color reader11.

This image-rotating process is executed in the following procedure. First of all, a direct memory access controller (DMAC) 4380, shown in FIG. 10B, operates to transfer image data from the memories 4060R, 4060G and 4060B to a work memory 4390. Then, t he CPU 4360 executes a known image-rotating process within the work memory 4390 and, thereafter, the DMAC 4380 executes transfer of the image data from the work memory 4390 to the memories 4060R, 4060G and 4060B. In this manner, the image-rotating process is effected.

After images have been laid out and the specified position thereof has been input, position information on each of the images is transmitted to the image storing apparatus 3 through the video processing unit 12 of FIGS. 1A and 1B. When the system controller 4210 has received the position information on the layout of each image, the system controller 4210 outputs operation-enable signals 9320-0 to 9320-3 to the respective enlargement.interpolation circuits 4150-0 to 4150-3 corresponding to the individual color images.

For the arbitrary layout of image-forming positions in this example, the counter 0 (4080-0), a counter 1 (4080-1), a counter 2 (4080-2) and a counter 3 (4080-3) operate in correspondence with, for example, image 0, image 1, image 2 and image 3, respectively.

Control of the formation of images along line $l_1$ shown in FIG. 21 will be described below with reference to FIG. 22.

Figure 29:
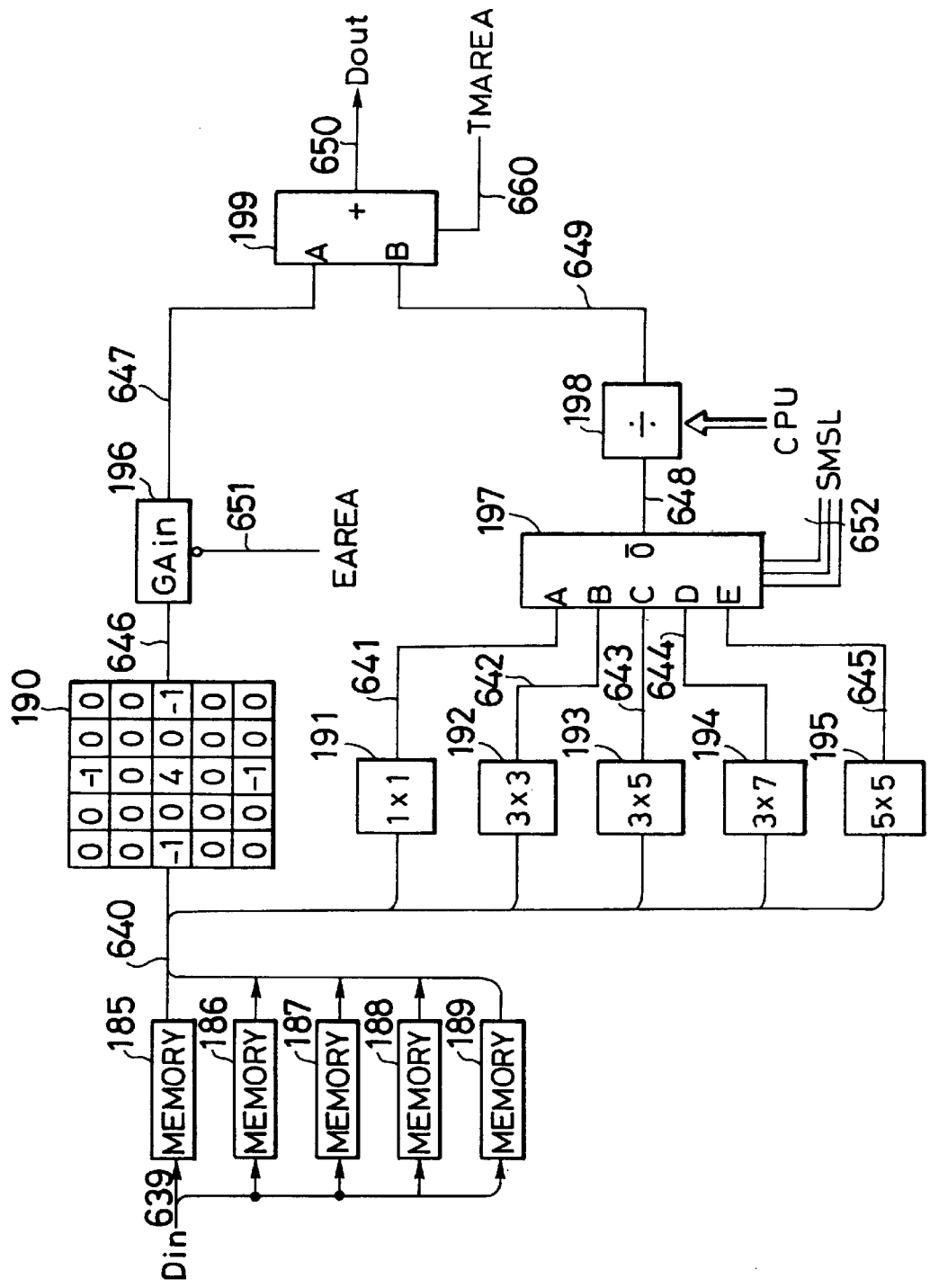
FIG. 29 is a detailed circuit diagram showing an edge filter circuit for use in the embodiment of FIG. 28.
Figure 30:
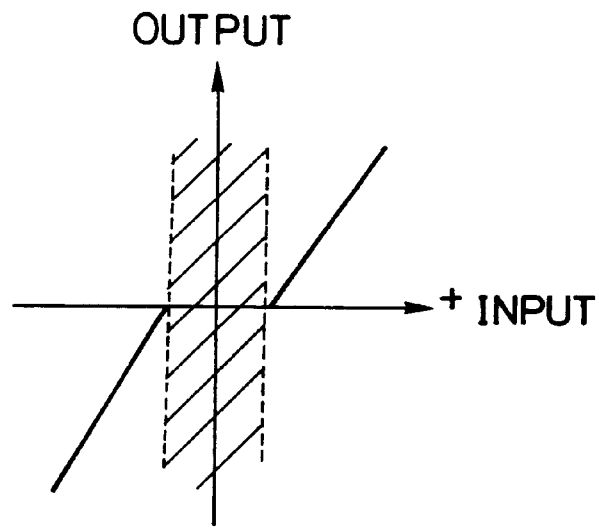
FIGS. 30A and 30B are graphic representations showing the conversion characteristics of the edge filter shown in FIG. 29.
Figure 30:
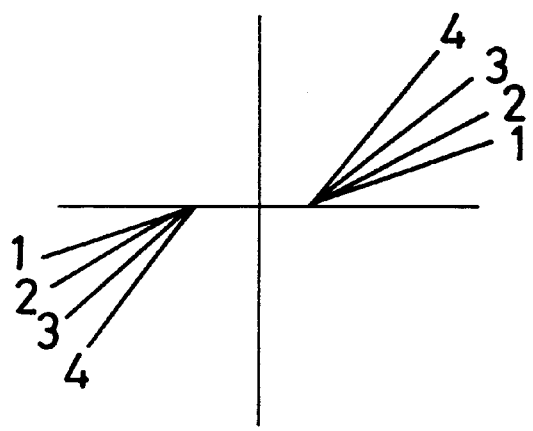

For the reading of image 0 from each of the image memories 4060R, 4060G and 4060B, the image data from address 0 to address 0.5M (the region in which the images 0 shown in FIG. 29 are stored) is read out by the counter 0 (4080-0). Switching of the outputs of the counters 4080-0 to 4080-3 is done with the selector 4070.

Similarly, for the reading of images 1, the image data from address 0.5M to address 1M (the region in which the images 1 shown in FIG. 20 are stored) is read out by the counter 1 (4080-1). The timing of this reading operation is shown as 9160R, 9160G and 9160B in FIG. 22.

Here, the counters 4080-2 and 4080-3 are not operated in response to corresponding counter-enable signals 9130-2 and 9130-3 supplied from the system controller 4210.

The image data on images 0 and images 1 is supplied through the corresponding LUTs 4110R, 4110G and 4110B to the masking/black extraction/UCR circuit 4120, where the field-sequential color signal 9210 is formed. The selector 4130 converts this field-sequential color signal 9210 to parallel signals, separates them into image signals corresponding to the individual color images, and transmit them to the respective FIFO memories 4140-0 and 4140-1. When the operation-enable signals 9320-0 and 9320-1 supplied from the system controller 4210 to the respective enlargement.interpolation circuits 4150-0 and 4150-1 are set to an enable mode, the enlargement.interpolation circuits 4150-0 and 4150-1 set FIFO readout signals 9280-0 and 9280-1 to an enable mode, respectively, thereby starting readout control.

The FIFO memories 4140-0 and 4140-1 start to transfer the image data to the corresponding enlargement.interpolation circuits 4150-0 and 4150-1 in response to the respective signals 9280-0 and 9280-1. Then, the enlargement.interpolation circuits 4150-0 and 4150-1 perform arithmetic operations on layout and interpolation based on the region previously specified on the digitizer 16. This timing is shown as 9300-0 and 9300-1 in FIG. 22.

The data on the images 0 and 1 which have been obtained by the arithmetic operations on the layout and the interpolation are selectively supplied from the selector 4190 to the edge filter circuit 4180. The signal passed through the edge filter circuit 4180 is input to the LUT 4200 as the signal 9380. Since the subsequent process executed from the LUT 4200 to the connector 4550 is similar to the above-described process, the description thereof is omitted.

Then, the timing of forming images along line $_2$ shown in FIG. 21 will be explained with reference to FIG. 23.

The process executed from the image memories 4060R, 4060G and 4060B to the enlargement.interpolation circuits 4150-1 and 4150-2 which is substantially identical to the above-described one.

However, since image 1 and image 2 are output with respect to line 12, the counter 1 (4080-1) and the counter 2 (4080-2), the FIFO memories 4140-1 and 4140-2 as well as the enlargement.interpolation circuits 4150-1 and 4150-2 are actuated. Control over these elements is provided in accordance with a control signal from the system controller 4210.

As shown in FIG. 21, images 1 and 2 overlap each other on line $l_2$. Whether either or both of the images 1 and 2 in this overlapped portion are to be formed as an image can be determined by a control signal 9340 from the system controller 4210.

The specific process of control is similar to the above-described one.

The signal line from the connector 4550 is connected to the color reader 1 by a cable. Accordingly, the video interface 101 of the color reader 1 selectively outputs the image signal 105 from the image storing apparatus 3 to the printer interface 56 along the signal line shown in FIG. 5.

Although the foregoing explanation has been given with reference to the example of processing the four-color outputs M, C, Y and BK, R, G and B parallel outputs can be obtained by controlling the selector 4230 shown in FIG. 10B with respect to the image data output from the image storing apparatus 3. In this case, the video interface 101 of the color reader 1 transfers image data over the signal line shown in FIG. 4.

Figure 24:
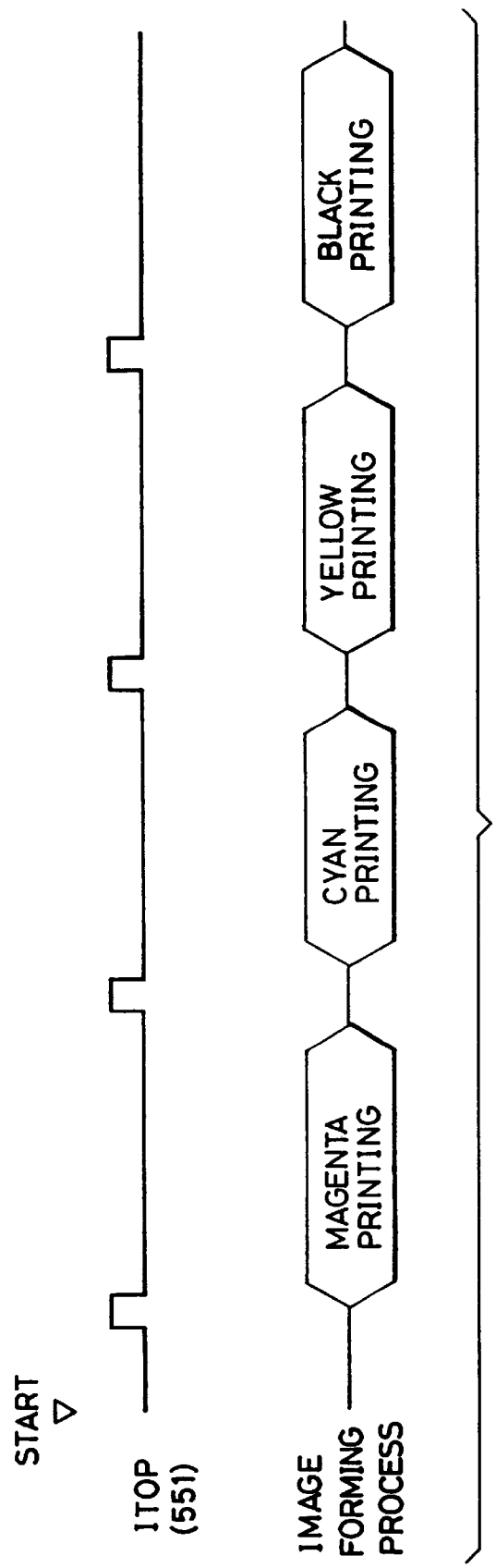
FIG. 24 is a timing chart of an image forming process executed in the embodiment.

The process of transferring image information from the image storing apparatus 3 to the color printer 2 along the signal line shown in FIG. 4 in the embodiment described above will be described in detail below with reference to the timing chart of FIG. 24.

As described above, when the start button of the operating section 20 is pressed, the operation of the printer 2 is started and transportation of recording paper is thereby started. Then, when the leading end of the recording paper reaches one end of the image-forming section, the video interface 101 outputs the ITOP signal 551. This ITOP signal 551 is transmitted through the color reader 1 to the image storing apparatus 3. The image storing apparatus 3 reads out the image data stored in each of the image memories 4060R, 4060G and 4060B under set conditions, and executes the above-described processes such as enlargement, interpolation and so on. Thereafter, the thus-processed image data is transferred to the video processing unit 12 of the color reader 1. The video interface 101 of the video processing unit 12 changes processing methods to be executed in the video interface 101 in accordance with the kind of data transmitted (R, G, B) or (M, C, Y, BK).

In this example, since the color image signals M, C, Y and BK are output in a field-sequential manner, the above-described operation is repeated four times in the order of M, C, Y and BK, thereby forming the desired image.

<Printer Section>

Finally, the construction of the color printer 2 for printing out the image signal processed in the video processing unit 12 in the above-described manner will be described below with reference to FIGS. 1A and 1B.

In the construction of the printer 2 shown in FIGS. 1A and 1B, a scanner, denoted by 711, includes a laser output part for converting an image signal supplied from the color reader 1 into a light signal, a polygon mirror 712 having a polygonal form (e.g., an octagonal form), a motor (not shown) for rotating the polygon mirror 712, an f/θ lens (focusing lens) 713, and so on. A reflection mirror, denoted by 714, is arranged to change the optical path, shown by a dot-dashed line in FIGS. 1A and 1B, of the laser beam emitted from the scanner 711, and a photosensitive drum is denoted by 715.

The laser beam emitted from the laser output part is reflected by the polygon mirror 712, and is made to scan the surface of the photosensitive drum 715 in a linear manner (in the form of raster scan) by way of the f/θ lens 713 and the reflection mirror 714, thereby forming a latent image corresponding to the original image.

The printer 2 also includes a primary charger 717, a whole-image exposure lamp 718, a cleaner portion 723 for recovering the remaining toner which has not been transferred, and a pre-transfer charger 72, and these elements are arranged around the photosensitive drum 715. The printer 2 further includes a developer unit 726 for developing an electrostatic latent image formed on the surface of the photosensitive drum 715, and the developer unit 726 is provided with development sleeves 731Y (for yellow), 731M (for magenta), 731C (for cyan) and 731BK (for black), these development sleeves being arranged to effect development in direct contact with the photosensitive drum 715, toner hoppers 730Y, 730M, 730C and 730BK for storing spare toner, and screws 732 for transferring a developer. These sleeves 731Y to 731BK, the toner hoppers 730Y to 730BK, and the screw 732 constitute the development unit 726, and these elements are disposed around the rotary shaft P of the development unit 726.

For example, if an image of yellow toner is to be formed, the yellow toner image is developed in the position shown in FIGS. 1A and 1B. If an image of magenta toner is to be formed, the development unit 726 is rotated about the shaft P to locate the development sleeve 731M in a magenta development section in contact with the photosensitive member 715. In the case of development of a cyan or black image, the development unit 726 may be similarly rotated about the shaft P shown in FIGS. 1A and 1B.

The printer 2 also includes a transfer drum 716 for transferring the toner image formed on the photosensitive drum 715 onto recording paper, an actuator board 719 for detecting the rotational position of the transfer drum 716, a position sensor 720 for detecting whether or not the transfer drum 716 has moved to the home position by moving toward and away from the actuator board 719, a transfer drum cleaner 725, a paper pressure roller 727, a de-charger 728, and a transfer charger 729. The elements 719, 720, 725, 727 and 729 are disposed around the transfer drum 716.

The printer 2 is arranged to receive the paper feed cassettes 735 and 736 for accommodating recording paper (sheets) are loaded into the printer 2. The printer 2 is provided with paper feed rollers 737 and 738 for feeding the recording paper from the respective cassettes 735 and 736, and timing rollers 739, 740 and 741 for adjusting the timing of feeding and transportation of the recording paper. When the recording paper has been fed and transported by way of these elements, the leading end of the recording paper is guided toward the transfer drum 716 by a paper guide 749 and is then wound around the transfer drum 716 with the leading end retained by a gripper which will be described later. The process in turn proceeds to an image-forming step.

A drum rotating motor, denoted by 550, serves to synchronously rotate the photosensitive drum 715 and the transfer drum 716. A peeling member 750 serves to peel the recording paper from the transfer drum 716 after the image-forming step has been completed, and a transporting belt 742 serves to transport the peeled paper. An image fixing section 743 serves to fix the image on the paper transported by the transporting belt 742. In the image fixing section 743, the rotational force of a motor 747 mounted on a motor mounting portion 748 is transmitted to a pair of heat pressure rollers 744 and 745 through a transmission gear 746. While the paper is being transported in the gap between the heat pressure rollers 744 and 745, the image is fixed on the paper.

The printout process of the printer 2 having the above-described construction will be described below with reference to the timing chart of FIG. 24 as well.

To begin with, when the first ITOP signal 551 comes, a Y latent image is formed on the photosensitive drum 715 by a laser beam. This Y latent image is developed by the development unit 731Y and is then transferred onto the paper wound around the transfer drum 716, and magenta printing is effected. Then, the development unit 726 is made to rotate around the shaft P.

When the next ITOP signal 551 comes, an M latent image is formed on the photosensitive drum 715 by a laser beam, and cyan printing is conducted in a manner similar to the above-described one. Such an operation is performed with respect to C and BK in response to the following ITOP signals 551, so that yellow printing and black printing are effected. When the image-forming step has been completed in this manner, the paper is peeled from the photosensitive drum 715 by the peeling member 750. Then, the image on the paper is fixed in the image fixing section 743 and a sequence of color-image printing steps is thus completed.

Figure 27:
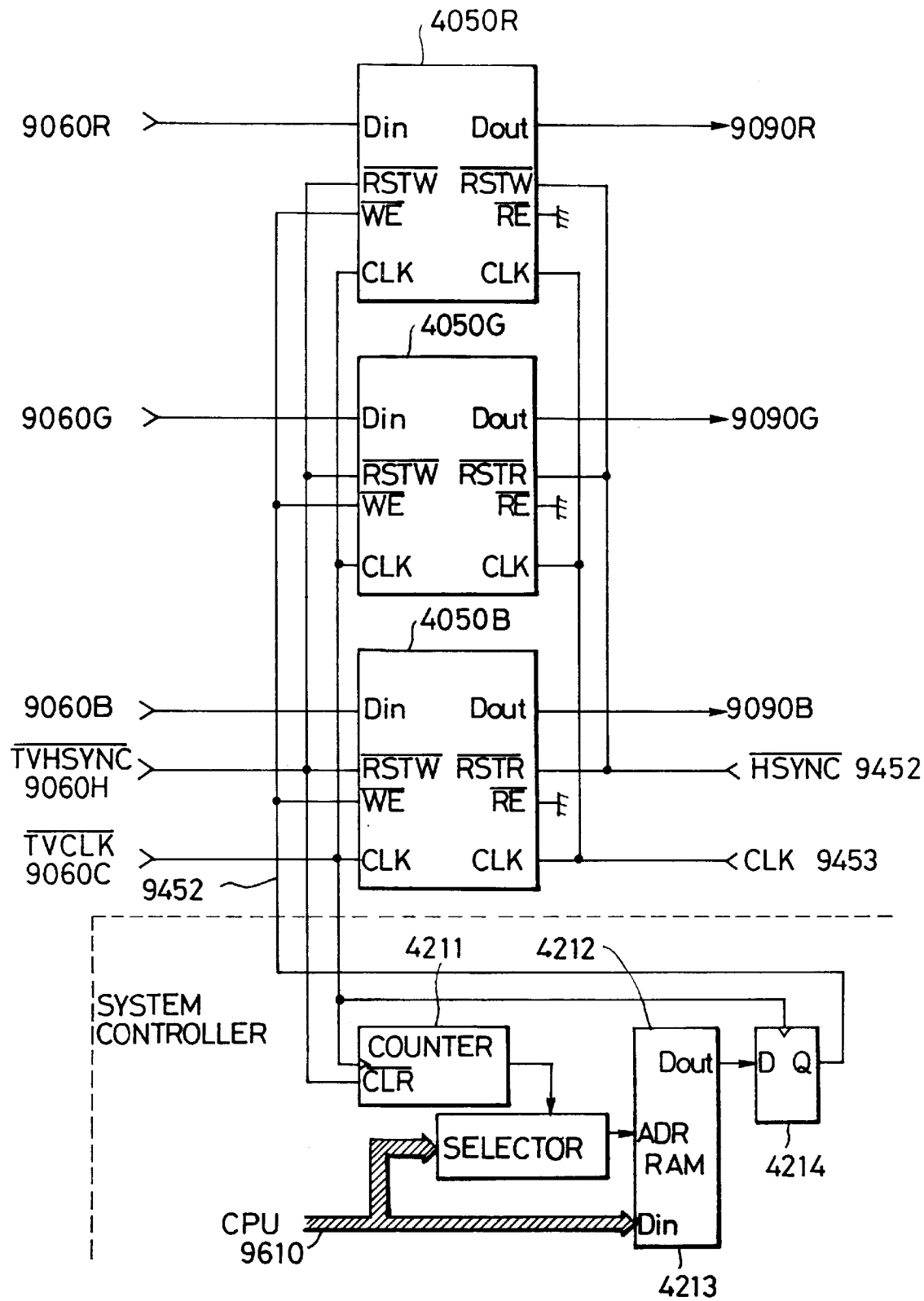
FIG. 27 is a detailed block diagram of a system controller section and FIFO memories in the image storing apparatus according to the embodiment of FIGS. 25A and 25B.
Figure 28A:
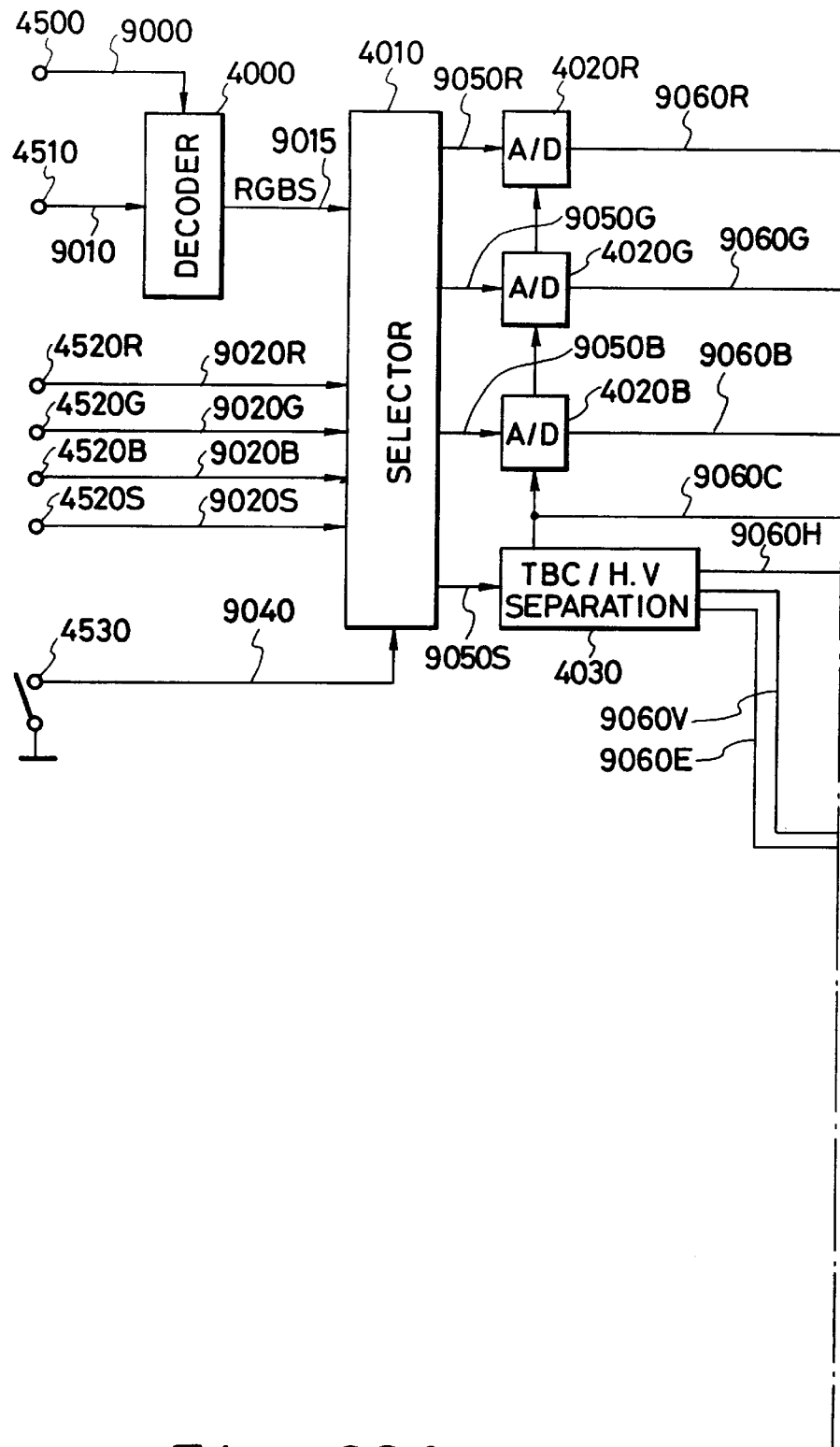
FIGS. 28A to 28D are system diagrams showing still another embodiment of the present invention.
Figure 28B:
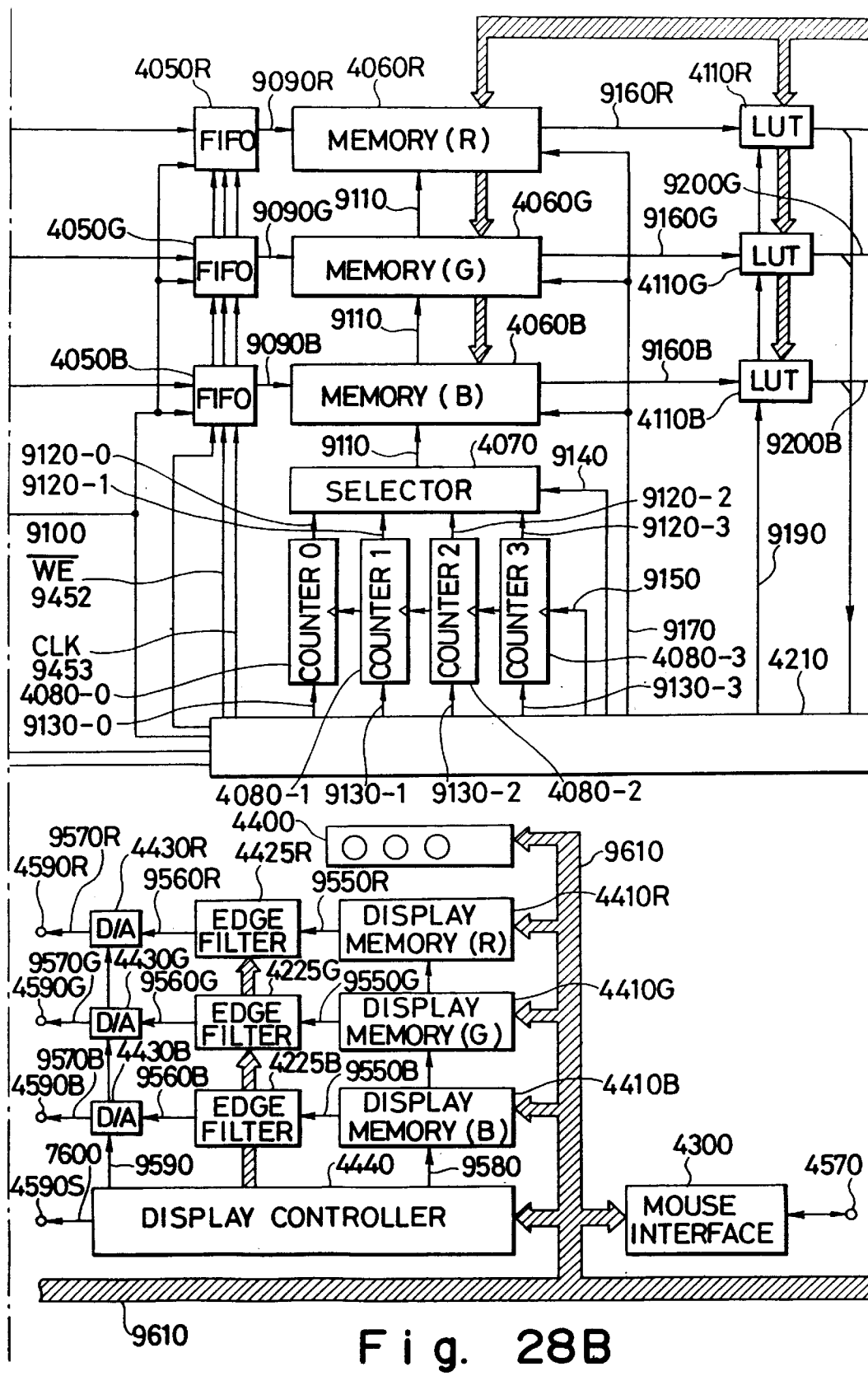
Figure 28C:
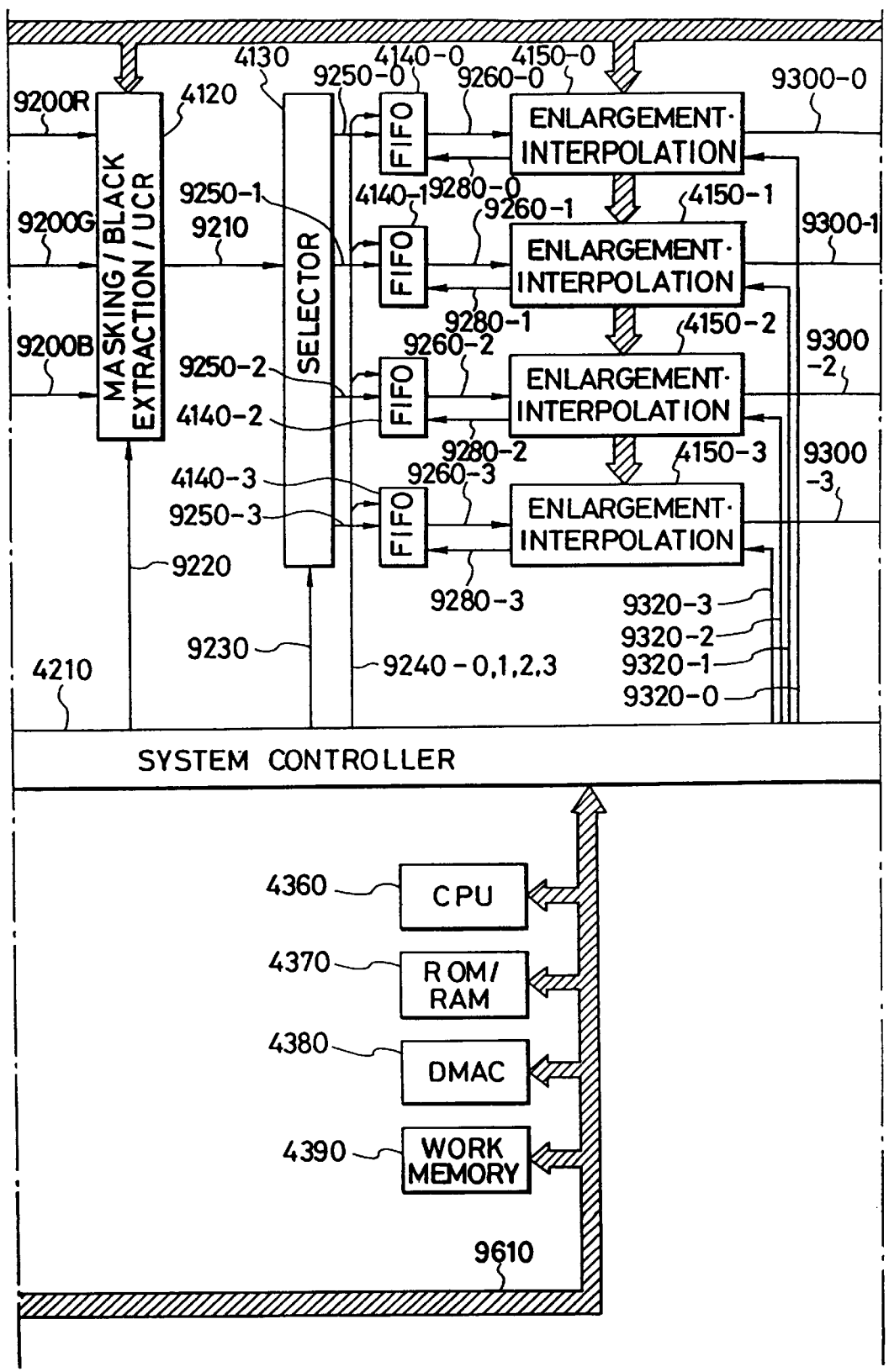
Figure 28D:
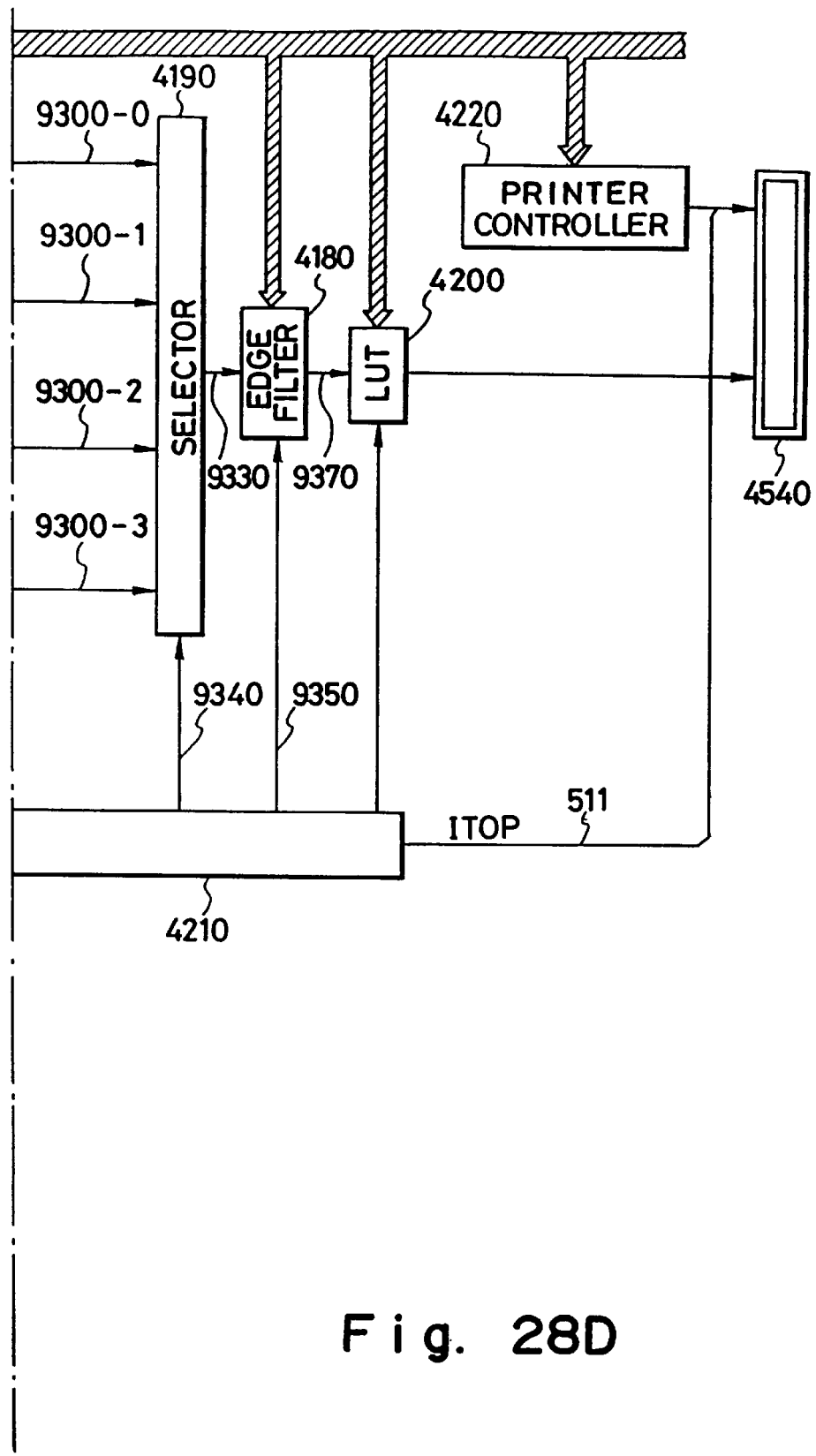

A second embodiment of the present invention will be described below with reference to FIGS. 25 to 27.

Figure 25A:
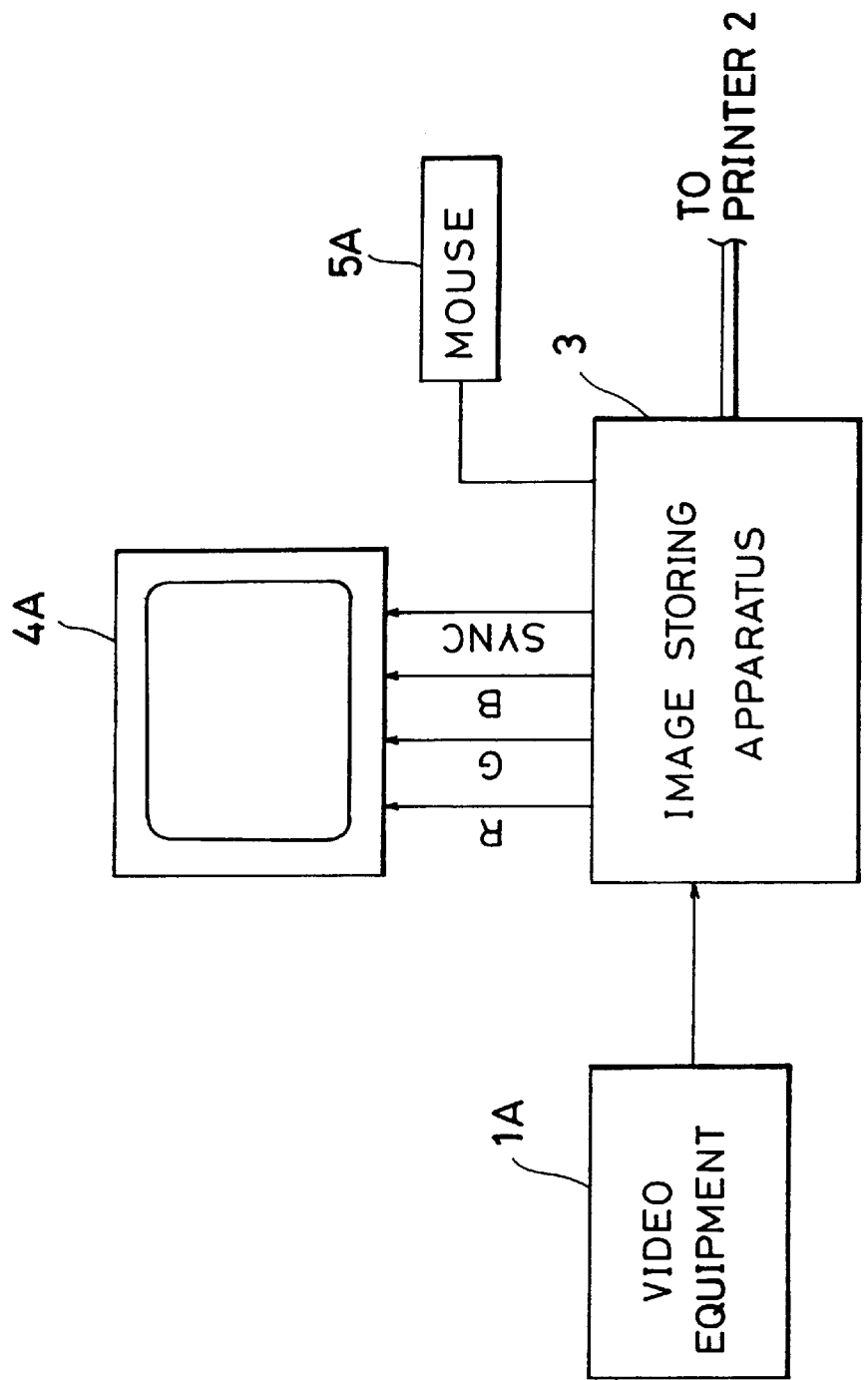
FIGS. 25A and 25B are together a system diagram of another embodiment of the present invention.
Figure 25B:
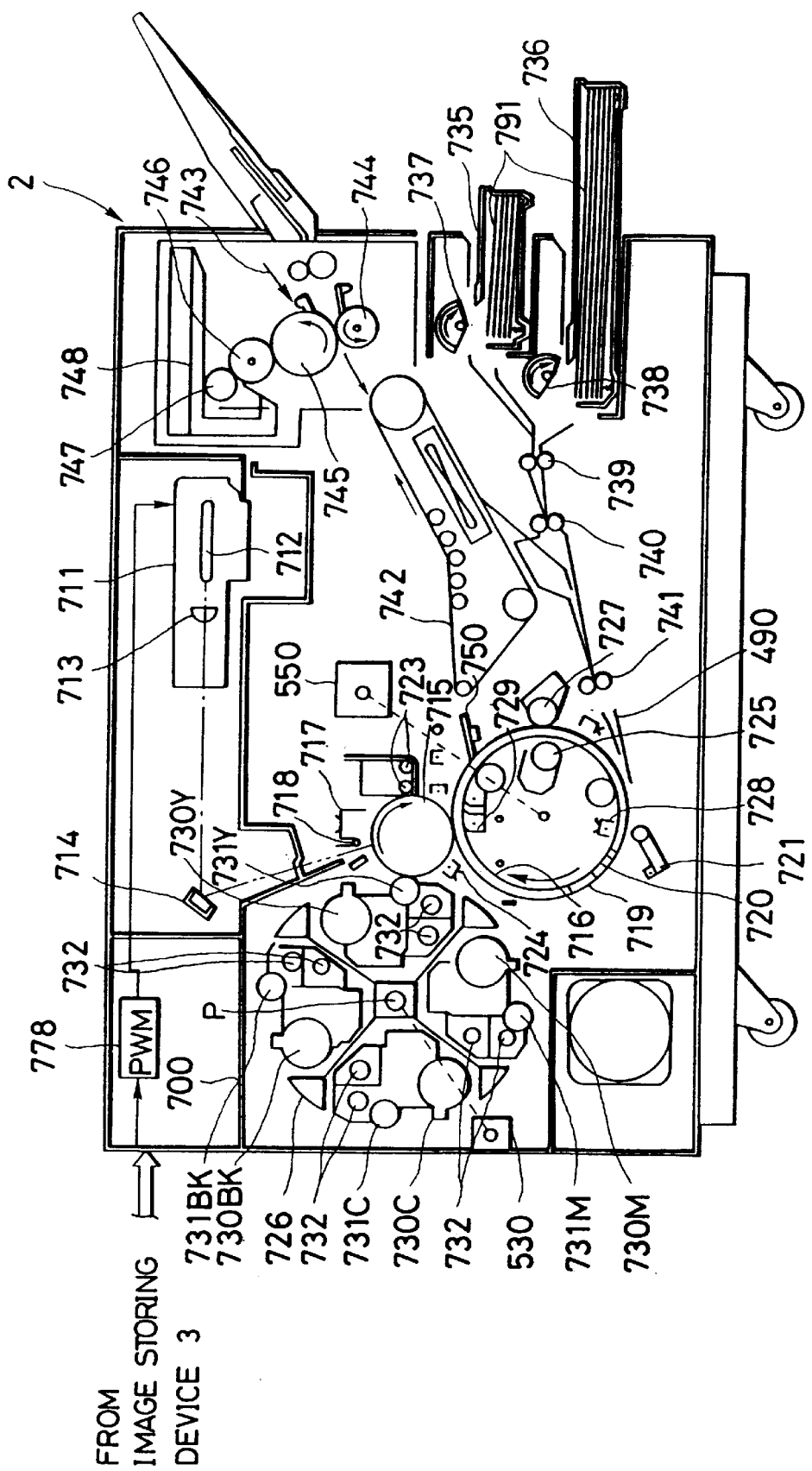
Figure 26A:
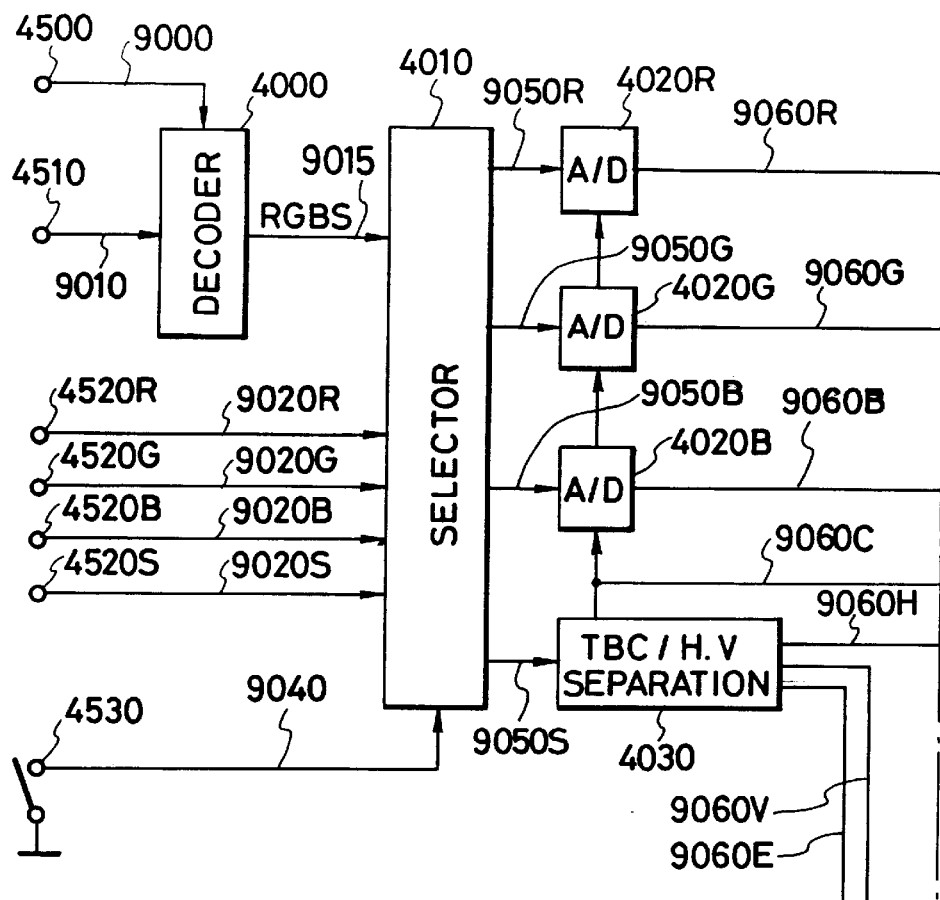
FIGS. 26A to 26D are block diagrams showing the image storing apparatus according to the embodiment of FIGS. 25A and 25B.
Figure 26B:
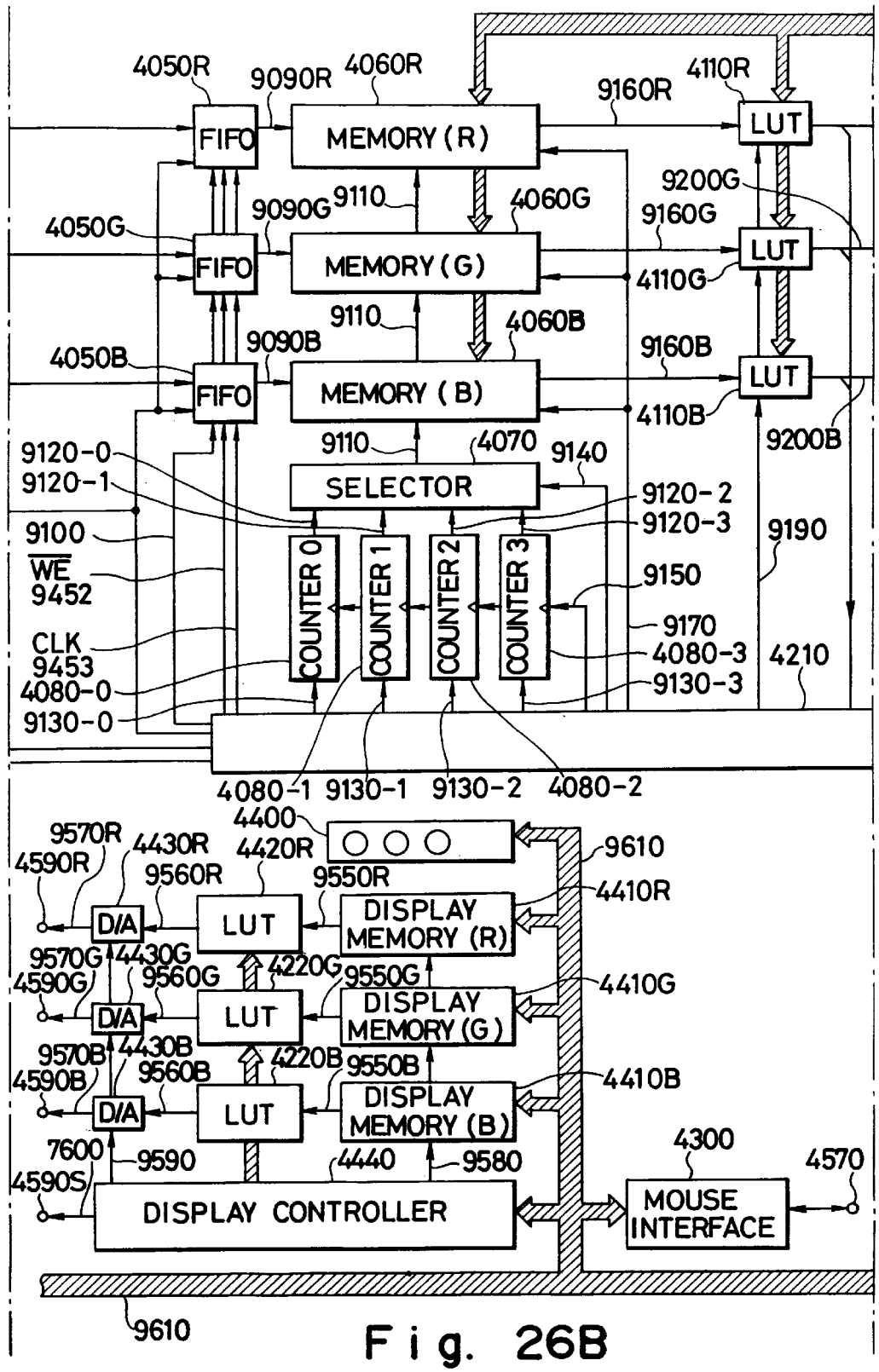
Figure 26C:
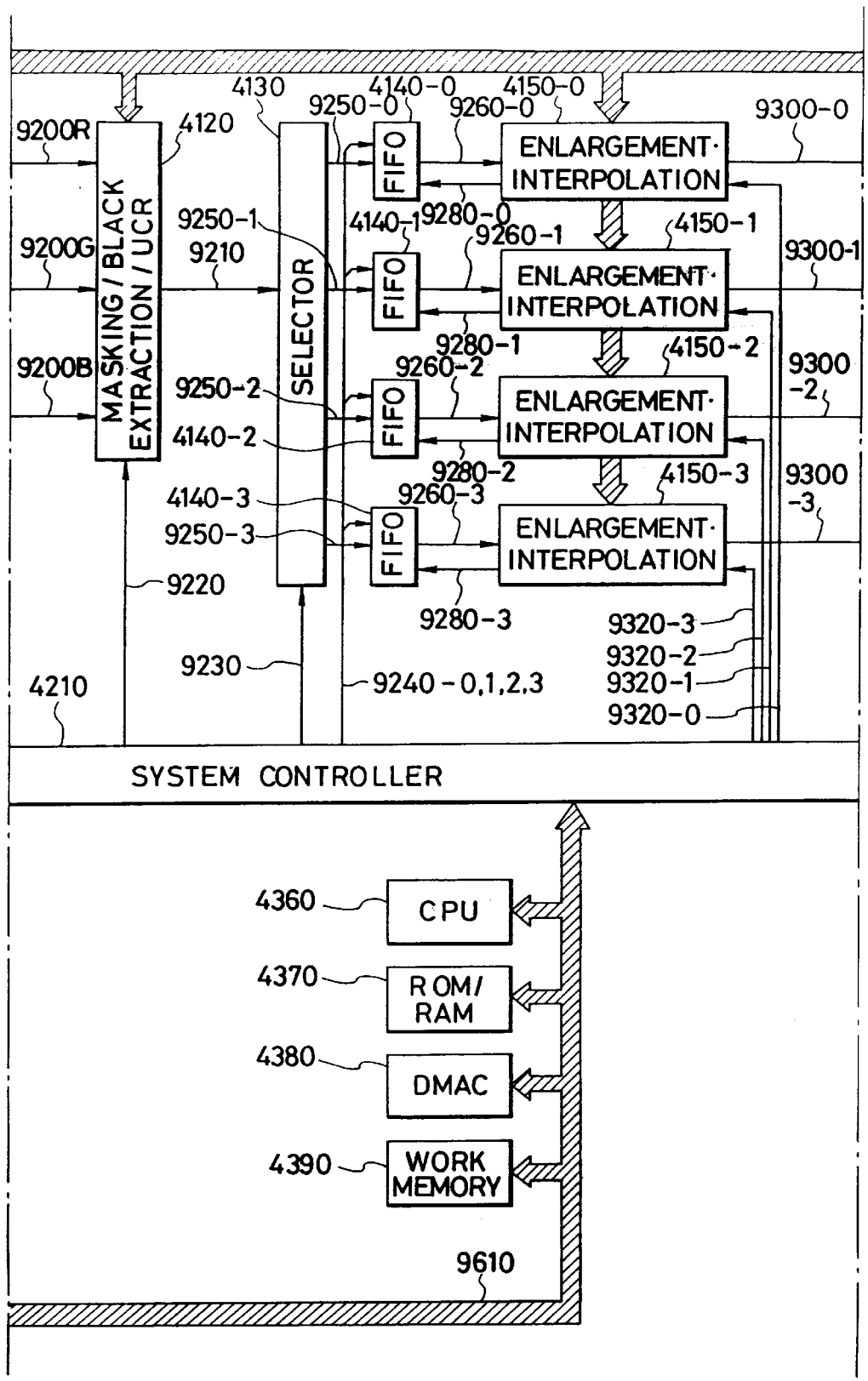
Figure 26D:
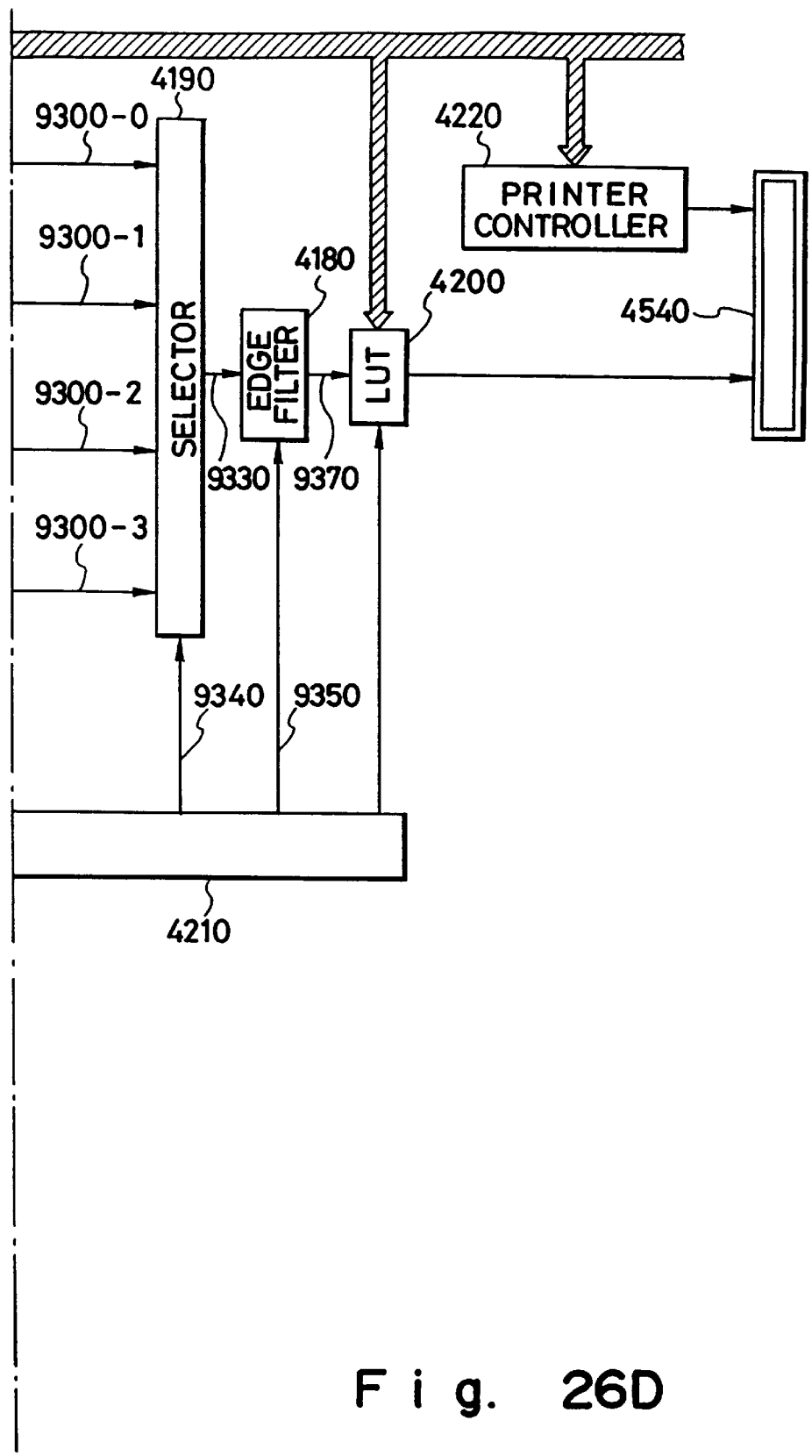

FIGS. 25A and 25B is a block diagram showing the construction of a video image forming system according to the second embodiment of the present invention.

The system according to the second embodiment is arranged, as shown in FIGS. 25A and 25B, to store a video image output from a video equipment 1A in the image storing apparatus 3 so as to output the stored image from the image storing apparatus 3 to the monitor 4A or the color printer 2. The image storing apparatus 3 also serves to effect handling of an input image.

<Control of Fetching of Video Image>

To begin with, control of fetching of a video image from the video equipment 1A to the image storing apparatus 3 will be described below with reference to FIGS. 26A to 26D which are block diagrams showing the image storing apparatus 3.

In FIGS. 26A to 26D, the same reference numerals are used to denote the like or corresponding elements which are shown in FIGS. 10A to 10C.

A video image output from the video equipment 1 is input to a decoder 4000 through an analog interface 4500 in the form of an NTSC composite signal 9000. The decoder 4000 decodes the signal 9000 to separate it into four signals 9015R, 9015G, 9015B and 9015S which are separate R, G and B signals and a composite SYNC signal, respectively.

In addition, the decoder 4000 receives a Y (luminance)/C (chrominance) signal 9010 through an analog interface 4500 and decodes it in a manner similar to the manner used in the decoding of the above NTSC composite signal 9000. Signals 9020R, 9020G, 9020B and 9020S are input to the selector 4010 in the form of separate R, G and B signals and a composite SYNC signal, respectively.

A switch 4530 is a switch which is operated to control the selector 4010 to select either the input signals 9020R to 9020S or the input signals 9015R to 9015S. If the switch 4530 is open, it controls the selector 4010 to select the signals 9020R to 9020S, while, if closed, it controls the selector 4010 to select the signals 9015R to 9015S.

Signals 9050R, 9050G and 9050B, which are selected as separate R, G and B signals, respectively, by the selector 4010, are subjected to analog-to-digital conversion by corresponding A/D converters 4020R, 4020G and 4020B.

A composite SYNC signal 9050S, which is simultaneously selected by the selector 4010, is input to a TBC/HV seperator circuit 4030, which generates a clock signal 9060C, a horizontal synchronizing signal 9060H and a vertical synchronizing signal 9060V from the composite SYNC signal 9050. These synchronizing signals are supplied to the system controller 4210.

Of these signals output from the TBC/HV separator circuit 4030 according to the second embodiment, the TVCLK signal 9060C is a clock signal of 12.27 MHz, the $\overline{\text{TVHSYNC}}$ signal 9060H is a clock having a pulse width of 63.5 μs, and the $\overline{\text{TVVSYNC}}$ signal 9060V is a clock having a pulse width of 16.7 μs.

The FIFO memories 4050R, 4050G and 4050B are reset by the $\overline{\text{TVHSYNC}}$ signal 9060H, and writing of data 9060R, 9060G and 9060 B into the respective memories is started with address 0 in synchronization with the TVCLK signal 9060C. The writing to the FIFO memories 4050R, 4050G and 4050B is effected when the system controller 4210 applies a $\overline{\text{WE}}$ signal 9452 to them.

The control, utilizing the $\overline{\text{WE}}$ signal 9452, of writing to the FIFO memories 4050R, 4050G and 4050B will be explained in detail below with reference to the block diagram shown in FIG. 27.

In this embodiment, the video equipment 1A is a still video recorder according to the NTSC standard. Accordingly, if a video image supplied from the video equipment 1 is digitized, the required capacity per frame amounts to 640 picture elements (H(×480 picture elements (V). To provide such a capacity per frame, the CPU 4360 of the image storing apparatus 3 writes "0s" for 640 picture elements in the main-scan direction into the RAM 4213. Then, the selector 4212 is made to select the input from the selector 4212 so that the data from the RAM 4213 can be used as data for controlling the $\overline{\text{WE}}$ signal to be applied to the FIFO memories 4050R, 4050G and 4050B, as in the case of the first embodiment described above. When the CPU 4360 writes "0" into the RAM 4213, signals output from the respective A/D converters 4020R, 4020G and 4020B, i.e., the data 9060R, 9060G and 9060B on an image for one main scan are stored in the FIFO memories 4050R, 4050G and 4050B, respectively, thereby effecting full-size storage.

When an input video image is to be stored in the FIFO memories 4050R, 4050G and 4050B in a reduced form, data which corresponds to an available image region and which is written to the RAM 4213 is set to "1" in accordance with the desired reduction ratio, thereby enabling a reduction in the main scan direction.

Control of data transfer from the FIFO memories 4050R, 4050G and 4050B to the respective memories 4060R, 4060G and 4060B is similar to control of data writing from the color reader 1 to the memories 4060R, 4060G and 4060B which has been described in connection with the first embodiment.

A reduction in the sub-scan direction is likewise enabled by setting predetermined data to the RAM 4217 shown in FIG. 15.

The second embodiment is explained with reference to the video equipment 1 of the type which conforms to the NTSC standard and which processes a digital image whose aspect ratio is 4:3 (the ratio of the size in the main-scan direction to the size in the sub-scan direction). However, it is possible to accommodate the second embodiment to a 16:9 aspect ratio which will be adopted in the HDTV standard expected to be a future television standard, only by rewriting the contents of the RAM 4213 of FIG. 27 and the RAM 4217 of FIG. 15.

Also, the data size of one frame under the NTSC standard is approximately 0.3 Mbytes with respect to 2 Mbytes which is the memory capacity of the present embodiment. Accordingly, in accordance with the embodiment, it is possible to store images for six frames. Storage of images for six frames is enabled by setting the $\overline{\text{CLR}}$ signal 9171 to "0".

In the case of one frame which consists of 1840 picture elements (in the main-scan direction(×1035 picture elements (in the sub-scan direction) in accordance with the HDTV standard, image information for one frame can be stored in a 2 Mbyte memory by setting the $\overline{\text{CLR}}$ signal 9171 to "0".

In addition, it is possible to accommodate the above embodiment to video equipment 1A of a high-band format. Specifically, it is possible to increase the number of picture elements to be read out in the main-scan direction by enhancing the frequency of the TVCLK signal output from the TBC/HV separator circuit of the above embodiment.

The video image data stored in the memories 4060R, 4060G and 4060B are read out by the DMAC 4380, and are then transferred to and stored in corresponding display memories 4410R, 4410G and 4410B. The video image data stored in the display memories 4410R, 4410G and 4410B are transferred as signals 9550R, 9550G and 9550B to LUTs 4420R, 4420G and 4420B, respectively, and signals 9560R, 9560G and 9560B output from the LUTs 4420R, 4420G and 4420B are transferred to D/A converters 4430R, 4430G and 4430B, respectively. The D/A converters 4430R, 4430G and 4430B convert the signals 9560R, 9560G and 9560B into an analog R signal 4590R, an analog G signal 4590G and an analog B signal 4590B, respectively, in synchronization with an SYNC signal 4590S supplied from a display controller 4440.

The display controller 4440 outputs an SYNC signal 9600 in synchronization with the output timing of these analog signals. The analog R signal 4590R, the analog G signal 4590G, the analog B signal 4590B, and the SYNC signal 4590S are supplied to the monitor 4 so that the contents stored in the image storing apparatus 3 can be displayed as a reproduced image.

Moreover, in the second embodiment, a image which is displayed can be trimmed by operation of a mouse 5A connected to a mouse interface 4300 by a signal line 4570.

On the basis of information on a region which an operator has specified with the mouse 5A, the CPU 4360 transfers image information on only the specified available region from the display memories 4410R, 4410G and 4410B to the respective image memories 4060R, 4060G and 4060B, thereby effecting trimming.

If the required data is set into the RAM 4213 and the RAM 4217 in a manner similar to that used in the first embodiment in accordance with the specified-region information supplied from the mouse 5A and image data from the still video recorder which constitutes the video equipment 1 is input to the image storing apparatus 3, it is possible to store data on the trimmed image in the image memories 4060R, 4060G and 4060B.

Reference numeral 4400 denotes an adjustment member used for adjusting the color tone of a color image displayed on the monitor 4A. The CPU 4360 picks up the resistance (setting) of the adjustment member 4400, and sets correction data for output adjustment into the LUTs 4420R, 4420G and 4420B. When an image is to be recorded with the color printer 2, in order to make the colors displayed on the monitor 4A coincide with the colors of the image to be recorded with the color printer 2, correction data for output adjustment to be set into the LUT 4200 is changed in accordance with the setting of the adjustment member 4400.

In a case where a plurality of images are stored on each of the image memories 4060R, 4060G and 4060B, even when the images are to be recorded with the color printer 2, the layout of each of the images can be changed by means of the monitor 4A and the mouse 5A.

In the case of recording of a plurality of images, an operator causes the monitor 4A to display an image corresponding to the desired size of recording paper and, while viewing the display provided on the monitor 4A, operates the mouse 5A to input position information representing the layout of the images, thereby enabling the layout of the images to be recorded with the color printer 2.

Control of the reading of stored information from the image memories 4060R, 4060G and 4060B into the color printer 2 and control of the recording operation of the color printer are substantially the same as those used in the first embodiment described above, and therefore the description thereof is omitted.

The video image data stored in the memories 4060R, 4060G and 4060B are read out by the DMAC 4380, and are then transferred to and stored in the corresponding display memories 4410R, 4410G and 4410B. The video image date stored in the display memories 4410R, 4410G and 4410B are transferred as the signals 9550R, 9550G and 9550B to the LUTs 4420R, 4420G and 4420B, respectively, and the signals 9560R, 9560G and 9560B output from the LUTs 4420R, 4420G and 4420B are transferred to D/A converters 4430R, 4430G and 4430B, respectively. The D/A converters 4430R, 4430G and 4430B convert the signals 9560R, 9560G and 9560B into the analog R signal 4590R, the analog G signal 4590G and the analog B signal 4590B, respectively, in synchronization with the SYNC signal 4590S supplied from the display controller 4440.

The display controller 4440 output the SYNC signal 9600 in synchronization with the output timing of these analog signals. The analog R signal 4590R, the analog G signal 4590G, the analog B signal 4590B, and the SYNC signal 4590S are supplied to the monitor 4 so that the contents stored in the image storing apparatus 3 can be displayed as a reproduced image.

Moreover, in the second embodiment, an image which is displayed can be trimmed by operation of the mouse 5A connected to a mouse interface 4300 by a signal line 4570.

On the basis of information on a region which an operator has specified with the mouse 5A, the CPU 4360 transfers image information on only the specified available region from the display memories 4410R, 4410G and 4410B to the respective image memories 4060R, 4060G and 4060B, thereby effecting trimming.

If the required data is set into the RAM 4213 and the RAM 4217 in a manner similar to that used in the first embodiment in accordance with the specified-region information supplied from the mouse 5A and image data from the still video recorder which constitutes the video equipment 1 is input to the image storing apparatus 3, it is possible to store data on the trimmed image in the image memories 4060R, 4060G and 4060B.

Reference numeral 4400 denotes an adjustment member used for adjusting the color tone of a color image displayed on the monitor 4A. The CPU 4360 picks up the resistance (setting) of the adjustment member 4400, and sets correction data for output adjustment to the LUTs 4420R, 4420G and 4420B. When an image is to be recorded with the color printer 2, in order to make the colors displayed on the monitor 4A coincide with the colors of the image to be recorded with the color printer 2, correction data for output adjustment to be set into the LUT 4200 is changed in accordance with the setting of the adjustment member 4400.

In a case where a plurality of images are stored in the image memories 4060R, 4060G and 4060B, even when the images are to be recorded with the color printer 2, the layout of each of the images can be changed by means of the monitor 4A and the mouse 5A.

In the case of recording of a plurality of images, an operator causes the monitor 4A to display an image corresponding to the size of recording paper and, while viewing the display provided on the monitor 4A, operates the mouse 5A to input position information representing the layout of the images, thereby enabling the layout of the images to be recorded with the color printer 2.

Control of the reading of stored information from the image memories 4060R, 4060G and 4060B to the color printer 2 and control of the recording operation of the color printer are substantially the same as those used in the first embodiment described above, and therefore the description thereof is omitted.

A third embodiment of the present invention will be described below in detail with reference to FIGS. 28A to 30B.

The entire construction of the third embodiment is substantially the same as that of the second embodiment shown in FIGS. 25A and 25B, and the detailed description thereof is therefore omitted for the sake of eliminating any redundant explanation.

The construction of the image storing apparatus 3 of the third embodiment is shown in FIGS. 28A to 28D. In these figures, the like reference numerals are used to denote the like or corresponding elements which are shown in FIGS. 26A to 26D.

In the third embodiment, edge filters 4425R, 4425G and 4425B are provided in place of the LUTs 4420R, 4420G and 4420B, respectively. The CPU bus 9610 is connected to the edge filter circuit 4180. In addition, the ITOP signal 511 is input to the system controller 4210.

<Image Forming Process (Image Output from Memory)>

The image forming process executed in the third embodiment will be described below with reference to FIGS. 28A to 28D.

The ITOP signal 511 sent from the color printer 2 is transmitted to the system controller 4210 through the connector 4540.

When an image forming process is started in response to the ITOP signal 551, each image information is controlled by the system controller 4210. The output of the counter 0 (4080-0) is selected by the selector 4070 and the memories 4060R, 4060G and 4060B are thus accessed through the memory address line 9110 so that the stored image data based on the address information is read out. The image signals 9160R, 9160G and 9160B read from the respective memories 4060R, 4060G and 4060B are transmitted to the corresponding LUTs 4110R, 4110G and 4110B. In each of these LUTs, logarithmic transformation is carried out in order to obtain image data which conforms to the relative spectral sensitivity characteristics of the eyes of human beings. The converted data 9200R, 9200G and 9200B output from the respective LUTs are input to the masking/black extraction/UCR circuit 4120. This masking/black extraction/UCR circuit 4120 effects color correction of the color image signals within the image storing apparatus 3 and also effects UCR/black extraction when black is recorded.

The image signal 9210, supplied from the masking/black extraction/UCR circuit 4120 in which the masking portion, the black extraction portion and the UCR portion are continuously linked, is separated into image signals for the respective color images by the selector 4130. These separated image signals 9250-0 to 9250-3 are input to the FIFO memories 4140-0 to 4140-3, respectively. Thus, the individual images which have been sequentially arranged becomes processible in parallel by the operation of the FIFO memories 4140-0 to 4140-3.

The parallel image signals 9260-0 to 9260-3 are input the next enlargement-interpolation circuits 4150-0 to 4150-3, respectively. The enlargement.interpolation circuits 4150-0 to 4150-3 are controlled by the system controller 4210 so as to provide a predetermined layout. In the respective enlargement.interpolation circuits 4150-0 to 4150-3, the image signals 9260-0 to 9260-3 are enlarged and interpolated as shown by the signals 9300-0 to 9300-3 in FIG. 19.

The thus-interpolated signals 9300-0 to 9300-3 are input to the selector 4190, where the respective image data which have been processed in parallel are again converted into a serial image data signal.

The image signal 9330, which represents the serial image data obtained by the parallel-to-serial conversion in the selector 4190, is subjected to edge emphasis and smoothing in the edge filter circuit 4180. The signal 9330 thus obtained is output to the color printer 2 through the connector 4540, so that the image-forming process is effected.

The edge filter circuit 4180 will be described in detail with reference to FIG. 29.

Referring to FIG. 29, buffer memories 185 to 189 each have a capacity for one line in the main-scan direction, and constitute an FIFO arrangement which stores image signals for 5 lines sequentially and cyclically and which simultaneously produces parallel outputs. 190 denotes a quadratic differential spatial filter of the type which is commonly widely used in order to detect an edge component. The output 646 of the quadratic differential spatial filter 190 is amplified by a gain circuit (GAin) 196 in accordance with the gain characteristics shown in FIG. 30A. The portion of the output 646 which corresponds to a shaded portion in FIG. 30A is clamped to zero in order to eliminate small-level components, i.e., noise components, from components output as a result of edge emphasis.

The output of each of the buffer memories 185 to 189 for five lines are also sequentially input to smoothing circuits 191 to 195. The respective smoothing circuits 191 to 195 effect the averaging of picture-element blocks of five different sizes which range from 1×1 to 5×5, as shown in FIG. 29.

Of the outputs 641 to 645 of the respective smoothing circuits 191 to 195, the desired smoothed signal is selected by a selector 197. Incidentally, a smoothing selection signal SMSL 651 is output from an I/O port of the CPU 4360. Reference numeral 198 denotes a division section, and if a smoothing of 3×5 is selected, the CPU 4360 sets "15" into the division section 198 for averaging purposes. If a smoothing of 3×5 is selected, the CPU 4360 sets "21" into the division section 198 for averaging purposes.

The gain circuit 196 is arranged in the form of a look-up table (LUT), and consists of a RAM into which data is written by the CPU 4360. When the input signal EAREA 651 is set to its low level, the output of the grain circuit 196 is set to "0".

Edge-emphasis control and smoothing control in the third embodiment are associated with the operation of the adjustment member 4400 for adjustment of image quality. As the operator actuates the adjustment member 4400 in the direction in which image sharpness increases, the CPU 4360 rewrites the contents of the gain circuit 196 so that the conversion characteristic of the gain circuit 196 can assume the one shown in FIG. 30B. If the operator actuates the adjustment member 4400 in the direction in which image sharpness decreases, the selector 197 sequentially selects a block size in the order of 3×3, 3×5, 3 ×7, and 5×5 in accordance with the switching signal SMSL 652.

At the center C, a smoothing of 1×1 is selected, and the EAREA signal 651 which is the input signal of the gain circuit 196 is set to a low level. The output of the gain circuit 196 is set to "0" so that an input Din is provided at the output of an adder 199 as an output Dout which undergoes neither smoothing nor edge emphasis.

In accordance with the arrangement and construction of the embodiment, moire which may be experienced with a halftone dot document can be suppressed by smoothing and also the sharpness of characters or line drawings can be improved by edge emphasis.

<Control of Image Output to Color Monitor 4>

An image output from the memories 4060R, 4060G and 4060B to the color monitor 4A will be explained below.

The video image data stored in the memories 4060R, 4060G and 4060B are read out by the DMAC 4380, and are then transferred to and stored in the corresponding display memories 4410R, 4410G and 4410B. The video image data stored in the display memories 4410R, 4410G and 4410B are input to the respective edge filter circuits 4425R, 4425G and 4425B. The construction and operation of each of the edge filter circuits 4425R, 4425G and 4425B are similar to those of the edge filter circuit 4180 shown in FIG. 19 and the detailed description is therefore omitted.

The operations of the edge filter circuits 4425R, 4425G and 4425B are also associated with that of the adjustment member 4400 for adjustment of image quality. The CPU 4360 reads out information from the adjustment member 4400, performs arithmetic operations on the readout information, and sets the required data into the edge filter circuits 4425R, 4425G and 4425B through the CPU bus 9610. In this manner, the edge filter circuits 4425R, 4425G and 4425B can be operated in association with the behavior of the adjustment member 4400.

The outputs of the respective edge filter circuits 4425R, 4425G and 4425B are transmitted to the corresponding D/A converters 4430R, 4430G and 4430B, where they are converted into the analog R signals 4590R, the analog G signal 4590G and the analog B signal 4590B in synchronization with an SYNC signal 4590S supplied from a display controller 4440. The thus-obtained analog signals are output from the D/A converters 4430R, 4430G and 4430B.

As described above, in accordance with the present invention, when the size of an image represented by image information read from the image storing memory is larger than the size of the recording paper, it is possible to easily reduce the readout image information to a suitable magnification and it is also possible to produce a printout in suitable size with no undesirable omission in information.

Accordingly, it is possible to select recording paper of a desired size irrespective of such factors as the original size of an input image for the purpose of producing a printout.

Moreover, when image information input from the color reader 1 or the video equipment 1A is to be printed out on recording paper, the image information to be printed out can be set to an arbitrary size and the position at which the image information is to be printed out can be arbitrarily specified. In this manner, it is possible to freely lay out images to be recorded on the recording paper, whereby the image information can be output in an appropriately arranged form.

As described above, in accordance with the present invention, since an operator can adjust an image to the desired quality while viewing the quality of the image displayed on a display means, it is possible to automatically produce a printout of quality which conforms to the adjustment. Accordingly, adjustment of the image quality of printout images is facilitated to a remarkable extent, and it is also possible to prevent waste of natural resources.

Moreover, in accordance with one embodiment described above, even if the memory capacity necessary to accommodate readout image information is greater than the capacity of image storing memory or even if the size of a readout image is larger than the size of recording paper, it is possible to easily reduce the readout image information to a suitable magnification and it is also possible to produce a printout in suitable size with no undesirable omission in information.

Accordingly, it is possible to select recording paper of the desired size irrespective of such factors as the original size of the input image for the purpose of producing a printout.

Moreover, when image information input from the color reader 1 or the video equipment 1A is to be printed out on recording paper, the image information to be printed out can be set to an arbitrary size and the position at which the image information is to be printed out can be arbitrarily specified. In this manner, it is possible to freely lay out images to be recorded on the recording paper, whereby the image information can be output in an appropriate form.

As described above, in accordance with the present invention, it is possible to provide an image forming apparatus capable of forming an image in an arbitrarily specified size at an arbitrarily specified position on an image-forming medium.

What is claimed is:

1. An image forming apparatus of the type which is arranged to receive color image information from memory means that stores plural images represented by color image information in a picture unit, then to read out the color image information form the memory means, and to form an image on an image-forming medium, said image forming apparatus comprising:

detecting means for detecting the size of an image stored in the memory mean;

specifying means for specifying the size and the layout of a color image to be formed on the image-forming medium;

magnification changing means for changing the size of the color image information read from the memory means to a required magnification in accordance with the size specified by said specifying means and the size detected by said detecting means; and color-image forming means for laying out the color image information, the size of which has been changed to the required magnification by said magnification changing means in accordance with a position specified by said specifying means, thereby forming a color image of the image-forming medium, wherein said magnification changing means has a plurality of magnification changing circuits which can operate in parallel and can independently set magnification ratios.

2. An image forming apparatus according to claim 1, wherein the color image information is color image information arranged according to a broadcasting standard.

3. An image forming apparatus according to claim 1, further comprising display means for displaying color image information and display controlling means for controlling said display means to cause it to display the color image information such that the layout of the displayed color image information corresponds to the layout of the image information to be printed out onto the image-forming medium, said specifying means being arranged to allow specifying operation to be carried out while information displayed on said display means is being viewed.

4. An image forming apparatus according to claim 1, wherein said color-image forming means comprises a frame sequential color printer.

5. An image forming method for an image forming apparatus of the type which is arranged to receive color image information from memory means that stores plural images represented by color image information in a picture unit, then to read out the color image information from the memory means, and to form an image on an image-forming medium, said method comprising the steps of:

detecting the size of an image stored in the memory means;

specifying the size and the layout of a color image to be formed on the image-forming medium;

changing the size of the color image information read from the memory means to a required magnification in accordance with the size specified in said specifying step and the size detected in said detecting step; and laying out the color image information, the size of which has been changed to the required magnification in said magnification changing step in accordance with a position specified in said specifying step, to form a color image on the image-forming medium, wherein, in said changing step, sizes of the plural pictures represented by color image information which are different from each other are independently changed in parallel by using a plurality of magnification changing circuits.

6. An image forming method according to claim 5, wherein the color image information is color image information arranged according to a broadcasting standard.

7. An image forming method according to claim 5, further comprising a step of displaying color image information and a step of controlling displaying in said displaying step to display the color image information such that the layout of the displayed color image information corresponds to the layout of the image information to be printed out onto the image-forming medium, said specifying step being performed in such manner as to allow specifying information to be carried out while information displayed in said displaying step is being viewed.

8. An image forming method according to claim 5, wherein a frame sequential color printer is used in said color-image forming step.

9. An image forming apparatus of the type which is arranged to receive color image information from memory means that stores plural images represented by color image information in a picture unit, then to read out the color image information from the memory means, and to form an image on an image-forming medium, said method comprising the steps of:

detecting the size of an image stored in the memory means;

specifying the size and the layout of a color image to be formed on the image-forming medium; and changing the size of the color image information read from the memory means to a required magnification in accordance with the size specified in said specifying step and the size detected in said detecting step, wherein, in said changing step, sizes of the plural pieces of color image information are changed in parallel by using a plurality of magnification changing circuits and can independently set magnification ratios.

10. An image forming apparatus according to claim 9, wherein the color image information is color image information arranged according to a broadcasting standard.

11. An image forming apparatus according to claim 9, further comprising display means for displaying color image information and display controlling means for controlling said display means to cause it to display the color image information such that the layout of the displayed color image information corresponds to the layout of the image information to be printed out onto the image-forming medium, said specifying means being arranged to allow a specifying operation to be carried out while information displayed on said display means is being viewed.

12. An image forming method for an image forming apparatus of the type which is arranged to receive color image information from memory means that stores plural images represented by color image information in a picture unit, then to read out the color image information from the memory means, and to form an image on an image-forming medium, said method comprising the steps of:

detecting the size of an image stored in the memory means;

specifying the size and the layout of a color image to be formed on the image-forming medium; and changing the size of the color image information read from the memory means to a required magnification in accordance with the size specified in said specifying step and the size detected in said detecting step, wherein, in said changing step, sizes of the plural images represented by color image information which are different from each other are independently changed in parallel by using a plurality of magnification changing circuits.

13. An image forming method according to claim 12, wherein the color image information is color image information arranged according to a broadcasting standard.

14. An image forming method according to claim 12, further comprising a step of displaying color image information and a step of controlling displaying in said displaying step to display the color image information such that the layout of the displayed color image information corresponds to the layout of the image information to be printed out onto the image-forming medium, said specifying step being performed in such manner as to allow specifying operation to be carried out while information displayed in said displaying step is being viewed.

15. An image forming apparatus of the type which is arranged to receive image information from memory means that stores plural images represented by color image information in a picture unit, then to read out the color image information from the memory means, and to form an image on an image-forming medium, said apparatus comprising:

detecting means for detecting the size of an image stored in the memory means;

magnification changing means for changing the size of a read-out image to a required magnification in accordance with the result of detection provided by said detecting means; and image forming means for forming on the image-forming medium the readout image, the size of which has bene chanted to the required magnification by said magnification changing means, wherein said magnification changing means has a plurality of magnification changing circuits which can operate in parallel and can independently set magnification ratios.

16. An image forming apparatus according to claim 15, wherein said image forming means comprises a frame sequential color printer.

17. An image forming method for an image forming apparatus of the type which is arranged to receive image information from memory means that stores plural images represented by color image information in a picture unit, then to read out the color image information from the memory means, and to form an image on an image-forming medium, said method comprising the steps of:

detecting the size of an image stored in the memory means;

changing the size of a readout image to a required magnification in accordance with the result of detection provided in said detecting step; and forming on the image-forming medium the read-out image, the size of which has been chanted to the required magnification in said magnification changing step, wherein, in said changing step, sizes of the plural images represented by color image information which are different from each other are independently changed in parallel by using a plurality of magnification changing circuits.

18. An image forming method according to claim 17, wherein a frame sequential color printer is used in said image forming step.

19. An image forming apparatus of the type which is arranged to receive image information from memory means that stores plural images represented by color image information in a picture unit, then to read out the color image information from the memory means, and to form an image on an image-forming medium, said apparatus comprising:

detecting means for detecting the size of an image stored in the memory means; and magnification changing means for changing the size of a read-out image to a required magnification in accordance with the result of detection provided by said detecting means, wherein said magnification changing means has a plurality of magnification changing circuits which can operate in parallel and can independently set magnification ratios.

20. An image forming method forming apparatus of the type which is arranged to receive image information from memory means that stores plural images represented by color image information in a picture unit, then to read out the color image information from the memory means, and to form an image on an image-forming medium, said method comprising the steps of:

detecting the size of an image stored in the memory means; and changing the size of a readout image to a required magnification in accordance with the result of detection provided in said detecting step, wherein, in said changing step, sizes of the plural images represented by color image information which are different from each other are independently changed in parallel by using a plurality of magnification changing circuits.

* * * * *

UNITED STATES PATENT AND TRADEMARK OFFICE
CERTIFICATE OF CORRECTION

PATENT NO.   : 6,088,138
DATED        : July 11, 2000
INVENTOR(S)  : Sakai et al.

It is certified that error appears in the above-identified patent and that said Letters Patent is hereby corrected as shown below:

Drawings,
Figure 2A, the item numbered "57" should read -- SYSTEM CONTROL PULSE GENERATOR --.

Column 1,
Line 51, "for" should read -- for an --.

Column 2,
Line 60, "is a" should read -- are --;
Line 62, "diagram" should read -- diagrams --;
Line 67, "embodiment:" should read -- embodiment; --.

Column 3,
Line 13, "the," should read -- the --.

Column 4,
Line 42, "glas" should read -- glass --;
Lines 58 and 61, "readout" should read -- read-out --.

Column 5,
Line 37, "FIGS. 2B and 2C." should read -- FIGS. 2A, 2B and 2C. --

Column 6,
Line 18, "readout" should read -- read-out --.

Column 7,
Line 54, "select" should read -- selects --.

Column 9,
Line 65, "readout" should read -- read-out --.

Column 10,
Line 5, "$\frac{Y}{X} \times 100 = \approx$" should read -- $\frac{Y}{X} \times 100 = Z$ --.

Column 13,
Line 61, "readout" should read -- read-out --.

Column 14,
Line 62, "a long" should read -- along --.

UNITED STATES PATENT AND TRADEMARK OFFICE
CERTIFICATE OF CORRECTION

PATENT NO. : 6,088,138
DATED : July 11, 2000
INVENTOR(S) : Sakai et al.

It is certified that error appears in the above-identified patent and that said Letters Patent is hereby corrected as shown below:

Column 15,
Line 3, "readerll." should read -- reader 11. --;
Line 8, "t he" should read -- the --;
Line 51, "transmit" should read -- transmits --.

Column 16,
Line 16, "12," should read -- $1_2$, --.

Column 18,
Line 41, "is a" should read -- are --, and "diagram" should read -- diagrams --.

Column 19,
Line 42, "(H(x480" should read -- (H)x480 --.

Column 20,
Line 22, " (x1035" should read -- ) x 1035 --;
Line 54, "a" should read -- an --.

Column 23,
Line 22, "enlargement-interpolation" should read -- enlargement•interpolation --.

Column 25,
Line 44, "form" (first occurrence) should read -- from --.

Column 27,
Line 67, "bene" should read -- been --.

Signed and Sealed this

Twenty-third Day of October, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,088,138
DATED : July 11, 2000
INVENTOR(S) : Sakai et al.

It is certified that error appears in the above-identified patent and that said Letters Patent is hereby corrected as shown below:

Drawings,
Figure 2A, the item numbered "57" should read -- SYSTEM CONTROL PULSE GENERATOR --.

Column 1,
Line 51, "for" should read -- for an --.

Column 2,
Line 60, "is a" should read -- are --;
Line 62, "diagram" should read -- diagrams --; and
Line 67, "embodiment:" should read -- embodiment; --.

Column 3,
Line 13, "the," should read -- the --.

Column 4,
Line 42, "glas" should read -- glass --; and
Lines 58 and 61, "readout" should read -- read-out --.

Column 5,
Line 37, "FIGS. 2B and 2C." should read -- FIGS. 2A, 2B and 2C. --

Column 6,
Line 18, "readout" should read -- read-out --.

Column 7,
Line 54, "select" should read -- selects --.

Column 9,
Line 65, "readout" should read -- read-out --.

Column 10,
Line 5, "$\frac{Y}{x} \times 100 = \sim$" should read -- $\frac{Y}{x} \times 100 = z$ --.

Column 13,
Line 61, "readout" should read -- read-out --.

Column 14,
Line 62, "a long" should read -- along --.

UNITED STATES PATENT AND TRADEMARK OFFICE
CERTIFICATE OF CORRECTION

PATENT NO. : 6,088,138
DATED : July 11, 2000
INVENTOR(S) : Sakai et al.

It is certified that error appears in the above-identified patent and that said Letters Patent is hereby corrected as shown below:

Column 15,
Line 3, "reader11." should read -- reader 11. --;
Line 8, "t he" should read -- the --; and
Line 51, "transmit" should read -- transmits --.

Column 16,
Line 16, "12," should read -- $1_2$, --.

Column 18,
Line 41, "is a" should read -- are --, and "diagram" should read -- diagrams --.

Column 19,
Line 42, "(H(x480" should read -- (H)x480 --.

Column 20,
Line 22, "(x1035" should read -- ) x 1035 --; and
Line 54, "a" should read -- an --.

Column 23,
Line 22, "enlargement-interpolation" should read -- enlargement·interpolation --.

Column 25,
Line 44, "form" (first occurrence) should read -- from --.

Column 27,
Line 67, "bene" should read -- been --.

UNITED STATES PATENT AND TRADEMARK OFFICE
CERTIFICATE OF CORRECTION

PATENT NO. : 6,088,138
DATED : July 11, 2000
INVENTOR(S) : Sakai et al.

It is certified that error appears in the above-identified patent and that said Letters Patent is hereby corrected as shown below:

<u>Column 28,</u>
Lines 1 and 22, "chanted" should read -- changed --; and
Line 57, "readout" should read -- read-out --.

Signed and Sealed this

Fifteenth Day of January, 2002

Attest:

Attesting Officer

JAMES E. ROGAN
*Director of the United States Patent and Trademark Office*